United States Patent
Kanukurthy et al.

(10) Patent No.: US 11,291,255 B2
(45) Date of Patent: Apr. 5, 2022

(54) PERSONAL PROTECTIVE EQUIPMENT SYSTEM USING OPTICAL ARTICLES FOR INTEGRATED MONITORING, ALERTING, AND PREDICTIVE SAFETY EVENT AVOIDANCE

(71) Applicant: 3M INNOVATIVE PROPERTIES COMPANY, St. Paul, MN (US)

(72) Inventors: Kiran S. Kanukurthy, Cottage Grove, MN (US); Steven T. Awiszus, Woodbury, MN (US); Caroline M. Ylitalo, Stillwater, MN (US); John A. Wheatley, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 193 days.

(21) Appl. No.: 16/346,763

(22) PCT Filed: Feb. 19, 2018

(86) PCT No.: PCT/US2018/018642
§ 371 (c)(1),
(2) Date: May 1, 2019

(87) PCT Pub. No.: WO2018/152475
PCT Pub. Date: Aug. 23, 2018

(65) Prior Publication Data
US 2020/0046040 A1    Feb. 13, 2020

Related U.S. Application Data

(63) Continuation of application No. PCT/US2017/053632, filed on Sep. 27, 2017.
(Continued)

(51) Int. Cl.
*A41D 13/01*   (2006.01)
*G06K 19/06*   (2006.01)
(Continued)

(52) U.S. Cl.
CPC ............ *A41D 13/01* (2013.01); *A62B 17/00* (2013.01); *F16P 3/142* (2013.01); *G02B 5/124* (2013.01);
(Continued)

(58) Field of Classification Search
CPC ......... G06K 19/0614; G06K 19/06037; G06K 2019/0629; G06K 19/07762; A41D 13/01;
(Continued)

(56) References Cited

U.S. PATENT DOCUMENTS 9,639,725 B1 *   5/2017   Maricic ................ G06Q 10/087
11,023,818 B2 *   6/2021   Awiszus ................... A62B 7/00
(Continued)

FOREIGN PATENT DOCUMENTS

EP   1975650    10/2008
JP   2009-20813   *  1/2009
(Continued)

OTHER PUBLICATIONS

International Search report for PCT International Application No. PCT/US2018/018642 dated May 23, 2018, 5 pages.

*Primary Examiner* — Daniel I Walsh
(74) *Attorney, Agent, or Firm* — Steven A. Bern; Christopher D. Karlen

(57) ABSTRACT

In some examples, a system includes: at least one light capture device; an article of personal protective equipment (PPE) that includes a plurality of retroreflective elements embodied on a surface of the article of PPE in a spatially defined arrangement, each retroreflective element of the plurality of retroreflective elements having at least two different retroreflective properties; a computing device communicatively coupled to the at least one light capture device, wherein the computing device is configured to: receive, from the at least one light capture device, retroreflected light
(Continued)

that indicates at least two different retroreflective properties of at least one retroreflective element of the plurality of retroreflective elements; determine, based at least in part on each of the at least two different retroreflective properties, a safety event; and perform at least one operation based at least in part on the safety event.

16 Claims, 35 Drawing Sheets

Related U.S. Application Data

(60) Provisional application No. 62/564,101, filed on Sep. 27, 2017, provisional application No. 62/563,746, filed on Sep. 27, 2017, provisional application No. 62/461,177, filed on Feb. 20, 2017, provisional application No. 62/461,173, filed on Feb. 20, 2017, provisional application No. 62/461,041, filed on Feb. 20, 2017.

(51) Int. Cl.
*F16P 3/14* (2006.01)
*G02B 5/124* (2006.01)
*A62B 17/00* (2006.01)
*G06K 19/077* (2006.01)

(52) U.S. Cl.
CPC ... *G06K 19/0614* (2013.01); *G06K 19/06037* (2013.01); *G06K 19/07762* (2013.01); *G06K 2019/0629* (2013.01)

(58) Field of Classification Search
CPC ......... A41D 13/00; A41D 13/12; F16P 3/142; G02B 5/124; A62B 17/00
See application file for complete search history.

(56) References Cited

U.S. PATENT DOCUMENTS

| | | | |
|---|---|---|---|
| 2002/0152533 A1* | 10/2002 | Lesley | A41D 13/012/102 |
| 2002/0155276 A1* | 10/2002 | Owusu | G02B 5/124 428/323 |
| 2008/0000976 A1 | 1/2008 | Thomas | |
| 2012/0146789 A1* | 6/2012 | De Luca | H04N 3/38 340/540 |
| 2013/0274587 A1* | 10/2013 | Coza | A61B 5/002 600/409 |
| 2014/0307076 A1* | 10/2014 | Deutsch | F16P 3/147 348/77 |
| 2015/0347717 A1* | 12/2015 | Dalal | G16H 20/30 434/258 |
| 2016/0106174 A1* | 4/2016 | Chung | A42B 3/0433 340/539.13 |
| 2016/0265762 A1* | 9/2016 | Yoshida | H02J 50/12 |
| 2017/0372216 A1* | 12/2017 | Awiszus | A61F 9/068 |
| 2017/0374436 A1* | 12/2017 | Awiszus | G06F 16/24568 |
| 2018/0108236 A1* | 4/2018 | Kanukurthy | G06Q 10/0635 |
| 2019/0033454 A1* | 1/2019 | Mankovskii | G01S 17/86 |
| 2019/0037934 A1* | 2/2019 | Swank | G08B 21/02 |
| 2019/0175961 A1* | 6/2019 | Awiszus | A42B 3/225 |
| 2020/0046040 A1* | 2/2020 | Kanukurthy | G06K 19/06065 |
| 2020/0064433 A1* | 2/2020 | Finlay | H04B 1/385 |
| 2020/0279116 A1* | 9/2020 | Ylitalo | G06K 9/2063 |
| 2020/0341180 A1* | 10/2020 | Chen-Ho | G02B 5/124 |
| 2021/0052427 A1* | 2/2021 | Awiszus | A62B 18/00 |

FOREIGN PATENT DOCUMENTS

| | | |
|---|---|---|
| JP | 2012-195018 | 10/2012 |
| WO | WO 2013-149142 | 10/2013 |
| WO | WO 2016-109620 | 7/2016 |
| WO | WO 2018-064198 | 4/2018 |
| WO | WO 2018-064203 | 4/2018 |
| WO | WO 2018-064212 | 4/2018 |
| WO | WO 2018-151761 | 8/2018 |

\* cited by examiner

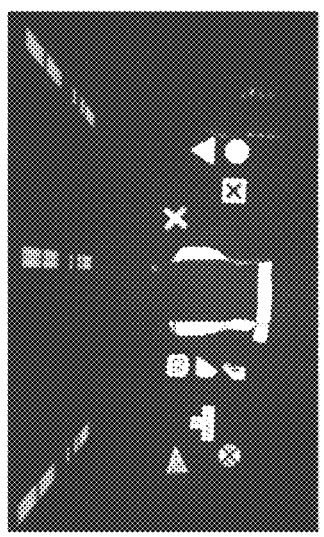
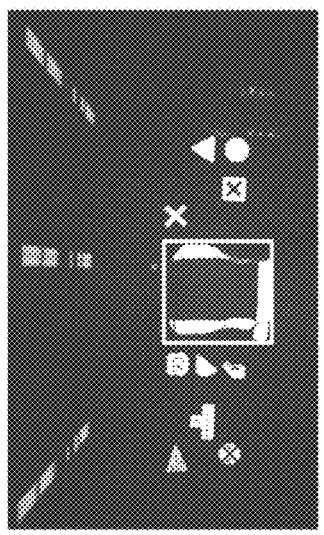
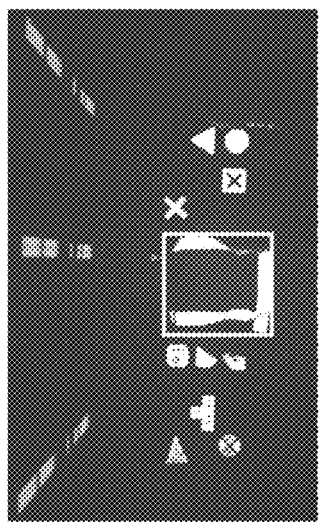
FIG. 8A
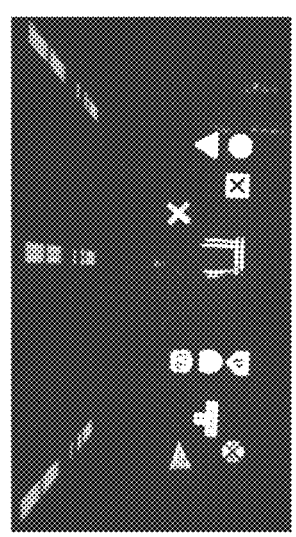
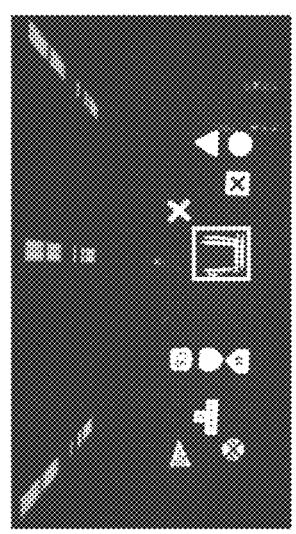
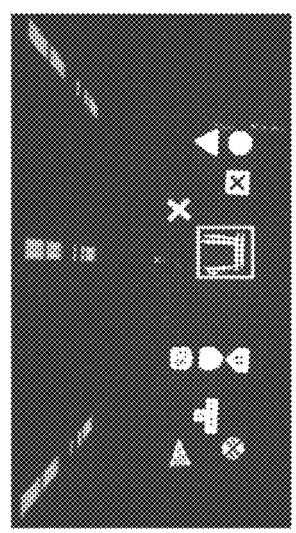
FIG. 8B

| | | | | L | XL | LC | RC | DP | Abs | L | XL | LC | RC | DP | Abs |
|---|---|---|---|---|---|---|---|---|---|---|---|---|---|---|---|
| | | | | λ1 | | | | | | λ2 | | | | | |
| Emitter | One wavelength emission | λ1 | L | 1 | 2 | 3 | 4 | 5 | 6 | | | | | | |
| | | | LC | 7 | 8 | 9 | 10 | 11 | 12 | | | | | | |
| | | | RC | 13 | 14 | 15 | 16 | 17 | 19 | | | | | | |
| | Two wavelength emission | λ1 | L | 20 | 21 | 22 | 23 | 24 | 25 | 26 | 27 | 28 | 29 | 30 | 31 |
| | | | LC | 32 | 33 | 34 | 35 | 36 | 37 | 38 | 39 | 40 | 41 | 42 | 43 |
| | | | RC | 44 | 45 | 46 | 47 | 48 | 49 | 50 | 51 | 52 | 53 | 54 | 55 |
| | | λ2 | L | 56 | 57 | 58 | 59 | 60 | 61 | 62 | 63 | 64 | 65 | 66 | 67 |
| | | | LC | 68 | 69 | 70 | 71 | 72 | 73 | 74 | 75 | 76 | 77 | 78 | 79 |
| | | | RC | 80 | 81 | 82 | 83 | 84 | 85 | 86 | 87 | 88 | 89 | 90 | 91 |

Retroreflected Light

*FIG. 23*

Using the Optical Signature Language

| Transceiver | Retroreflector | Assigned Meaning |
|---|---|---|
| Sends left circular | Returns right circular | TR-300 Respirator |
| Sends left circular at wavelengths $\lambda a$ and $\lambda b$ | Returns right circular at $\lambda a$ only | TR-600 Respirator |
| Sends left circular at wavelengths $\lambda a$ and $\lambda b$ | Returns right circular at $\lambda b$ only | TR-800 Respirator |
| Sends left circular | Returns left circular | Mining Environment |
| Sends left circular at wavelengths $\lambda a$ and $\lambda b$ | Returns left circular at $\lambda a$ only | Pharmeceutical Environment |
| Sends left circular at wavelengths $\lambda a$ and $\lambda b$ | Returns left circular at $\lambda b$ only | Confined Space Environment |

FIG. 24

PERSONAL PROTECTIVE EQUIPMENT SYSTEM USING OPTICAL ARTICLES FOR INTEGRATED MONITORING, ALERTING, AND PREDICTIVE SAFETY EVENT AVOIDANCE

RELATED APPLICATIONS

This application is claims the benefit of U.S. Application No. 62/461,041 filed Feb. 20, 2017, U.S. Application No. 62/461,177 filed Feb. 20, 2017, U.S. Application No. 62/461,173 filed Feb. 20, 2017, PCT Application No. PCT/US2017/053632 filed Sep. 27, 2017, U.S. Application No. 62/563,746 filed Sep. 27, 2017, and U.S. Application No. 62/564,101 filed Sep. 27, 2017, the entire content of each of which are incorporated herein by reference.

TECHNICAL FIELD

The present disclosure relates to the field of personal protective equipment. More specifically, the present disclosure relates to personal protective equipment and optical articles.

BACKGROUND

Personal protective equipment (PPE) may be used to protect a user (e.g., a worker) from harm or injury from a variety of causes in a work environment. For example, fall protection equipment is important safety equipment for workers operating at potentially harmful or even deadly heights. To help ensure safety in the event of a fall, workers often wear safety harnesses connected to support structures with fall protection equipment, such as lanyards, energy absorbers, self-retracting lifelines (SRLs), descenders, and the like. As another example, when working in areas where there is known to be, or there is a potential of there being, dusts, fumes, gases or other contaminants that are potentially hazardous or harmful to health, it is usual for a worker to use a respirator or a clean air supply source. While a large variety of respiratory devices are available, some commonly used devices include powered air purifying respirators (PAPR) and a self-contained breathing apparatus (SCBA). Other PPE include those for hearing protection (ear plugs, earmuffs), vision protection (safety spectacles, goggles, welding mask or other face shields), head protection (e.g., visors, hard hats, or the like), and protective clothing.

Optical articles, such as retroreflective articles, may redirect light incident on the article back toward its source. Systems that interact with optical articles include computer vision systems, or optical systems. These types of systems may acquire, analyze, and extra data from images. Applications of these systems include robotics, face recognition, image search, machine vision, remote sensing, surveillance, autonomous vehicles, and object detection to name a few.

SUMMARY

Systems and techniques of this disclosure relate to determining or otherwise detecting a safety event based on retroreflected light from an article of personal protective equipment (PPE) that includes a retroreflective element with at least two different properties. For example, the retroreflective element with at least two different properties may be attached to or otherwise embodied on an article of PPE. A computing device may store an association between each property and a value. In one example, a first property of right-circular polarized light may be associated with a particular type of PPE, and a second property of left-circular polarized light may be associated with a particular environment. In response to a light capture device detecting the first and second properties, a computing device may use the values (type of PPE and environment) associated with first and second properties to determine a safety event. For example, the safety event may indicate an incompatibility between the type of PPE and the environment (e.g., that includes one or more hazards), which could impair the worker's health. Rather than relying on mechanical fit between PPE and components or worker attentiveness to safety requirements, systems and techniques of the disclosure automatically detect retroreflected light that indicates at least two different retroreflective properties of the retroreflective element to detect the safety event. By automatically detecting the safety event using these properties, a computing device may pre-emptively, more accurately, and/or more quickly identify safety events that may affect a worker's safety or safety, the operation or use of PPE, and/or conditions of the work environment. Moreover, in some examples, detection of the safety event may cause a change in operation of a vehicle, PPE, or computing device that prevents or mitigates harm to a worker.

In some examples, a system includes, at least one light capture device; an article of personal protective equipment (PPE) that includes a plurality of retroreflective elements embodied on a surface of the article of PPE in a spatially defined arrangement, each retroreflective element of the plurality of retroreflective elements having at least two different retroreflective properties; a computing device communicatively coupled to the at least one light capture device, wherein the computing device is configured to: receive, from the at least one light capture device, retroreflected light that indicates at least two different retroreflective properties of at least one retroreflective element of the plurality of retroreflective elements; determine, based at least in part on each of the at least two different retroreflective properties, a safety event; and perform at least one operation based at least in part on the safety event.

In some examples, a method includes: receiving, from at least one light capture device, retroreflected light that indicates at least two different retroreflective properties of at least one retroreflective element of a plurality of retroreflective elements, wherein an article of personal protective equipment (PPE) includes the plurality of retroreflective elements embodied on a surface of the article of PPE in a spatially defined arrangement, each retroreflective element of the plurality of retroreflective elements having at least two different retroreflective properties; determining, by a computing device and based at least in part on each of the at least two different retroreflective properties, a safety event; and performing at least one operation based at least in part on the safety event.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 8A-8B depict an exemplary system for image processing in some embodiments in the presently disclosed system.

FIGS. 23-29 illustrate an optical signature retroreflector and associated techniques for using the retroreflector, in accordance with techniques of this disclosure.

DETAILED DESCRIPTION

Figure 1A:
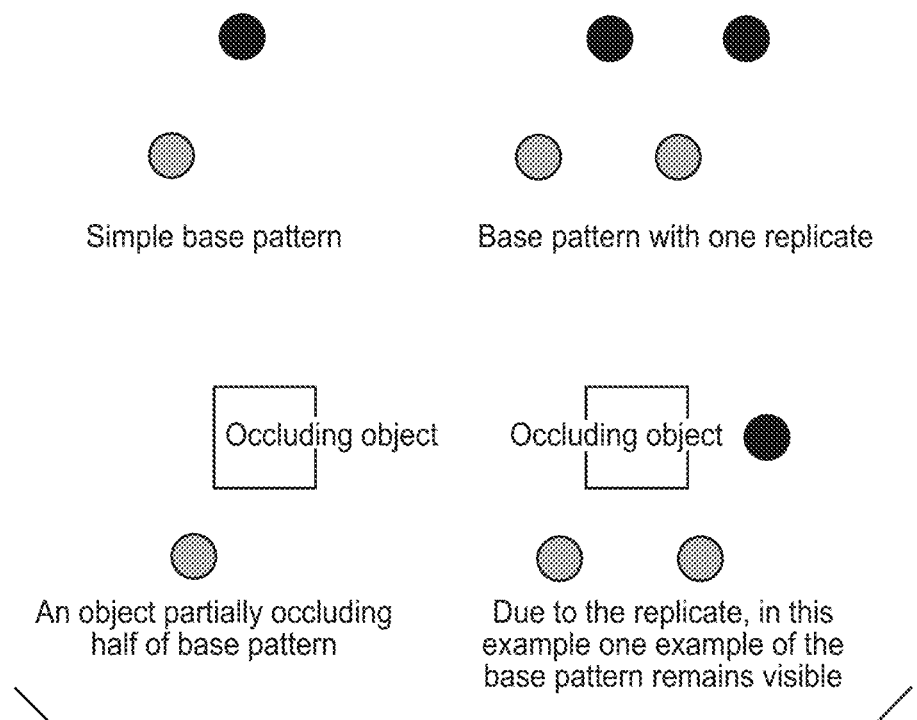
FIGS. 1A-1M illustrate various patterns of retroreflective elements included in the presently disclosed optical articles.
Figure 1B:
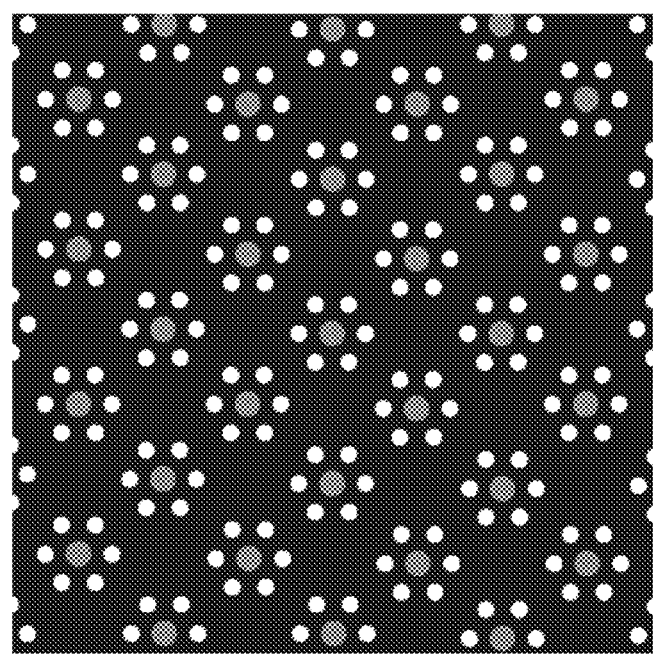
Figure 1C:
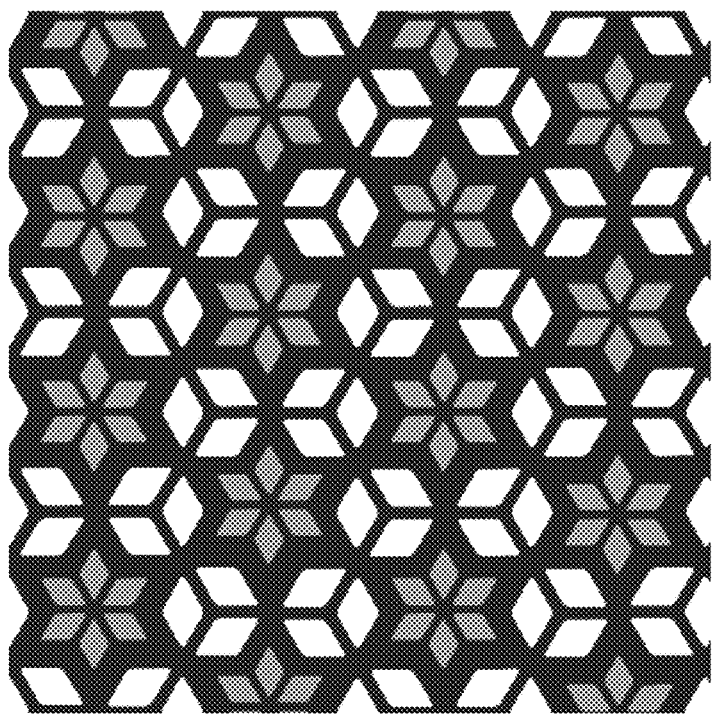
Figure 1D:
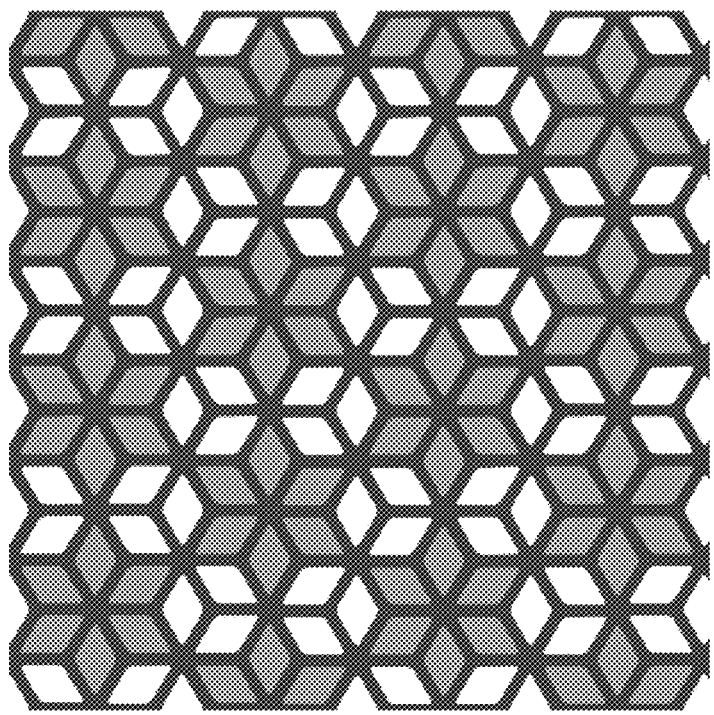
Figure 1E:
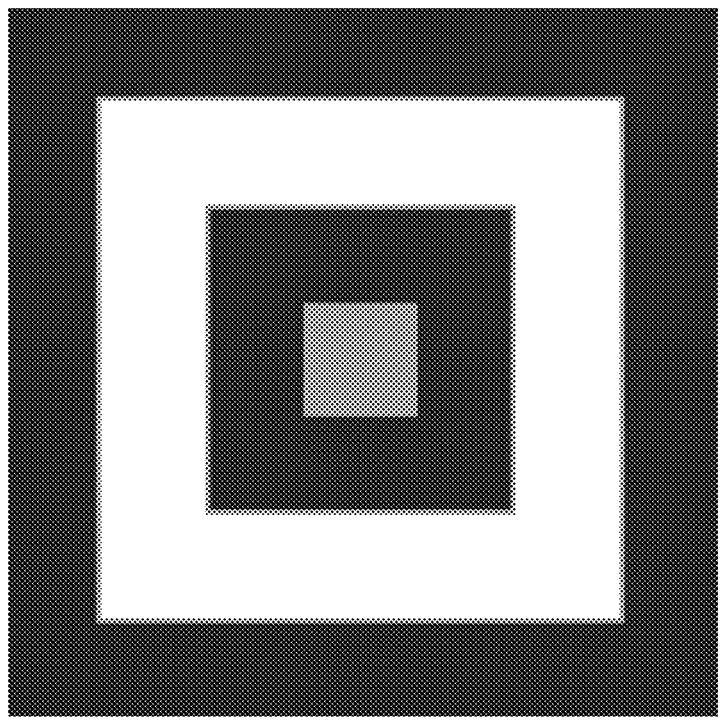
Figure 1F:
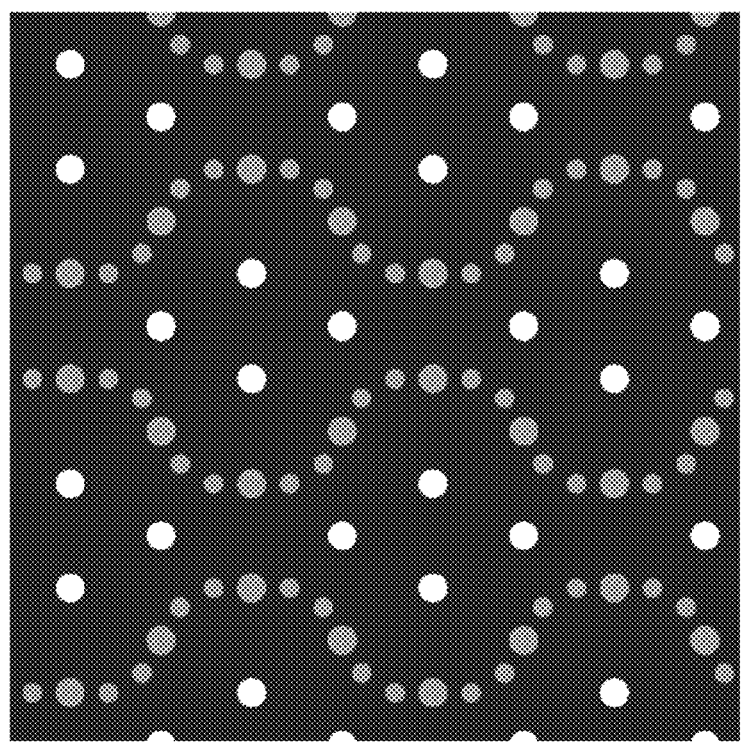
Figure 1G:
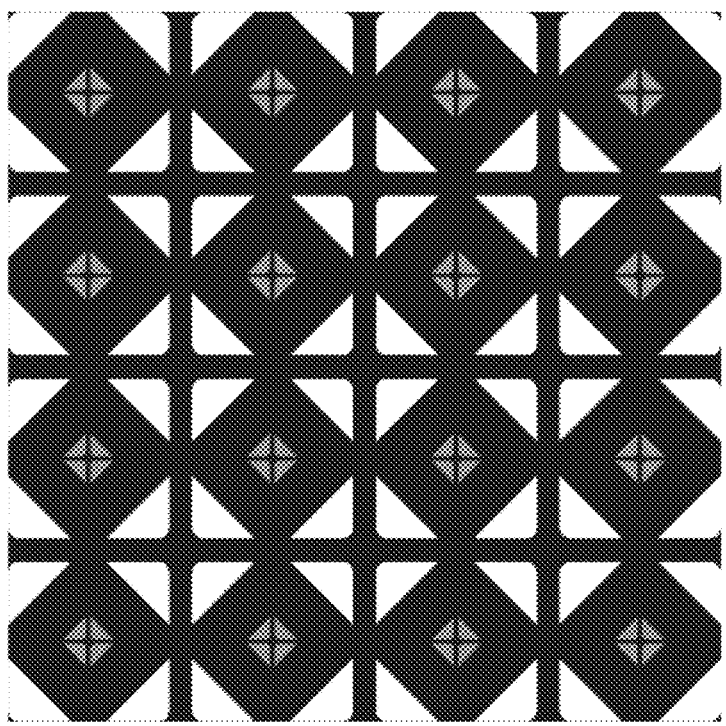
Figure 1H:
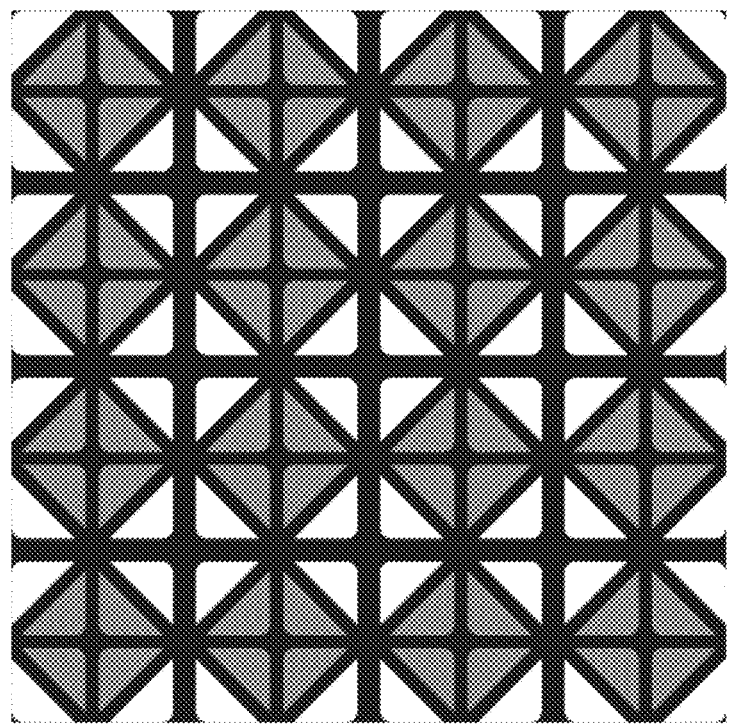
Figure 1I:
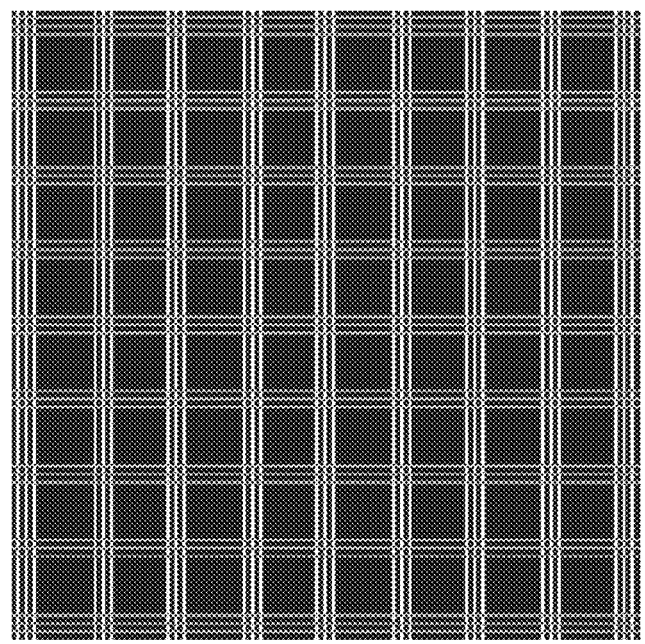
Figure 1J:
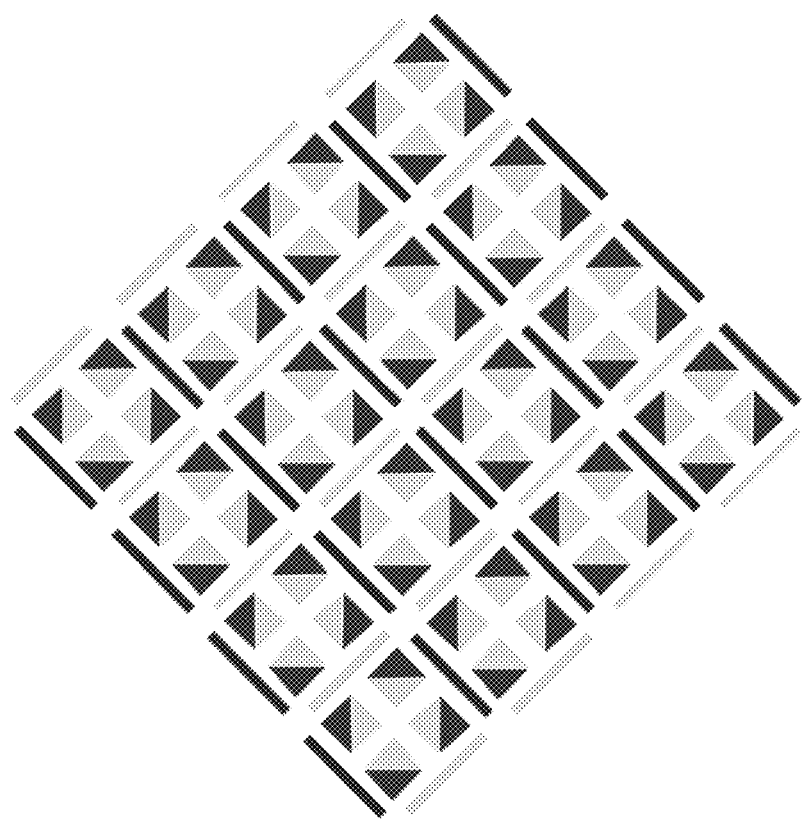
Figure 1K:
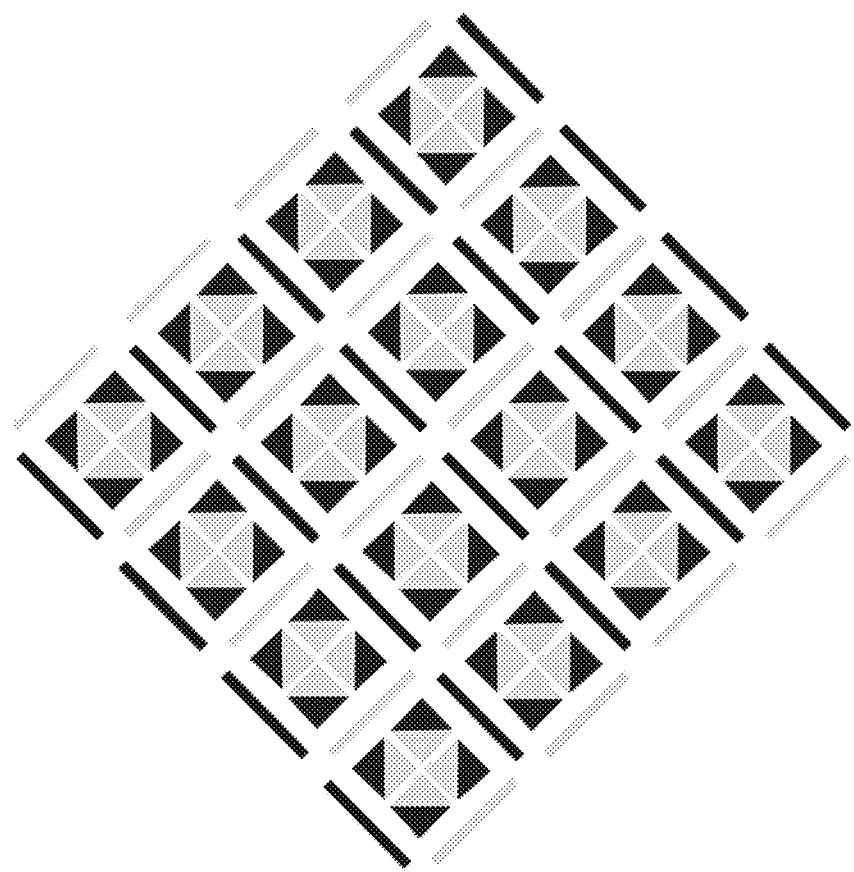
Figure 1L:
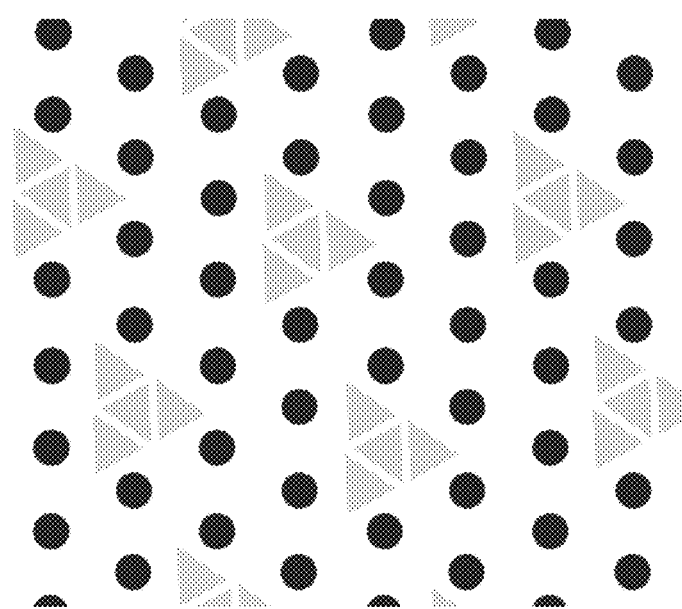
Figure 1M:
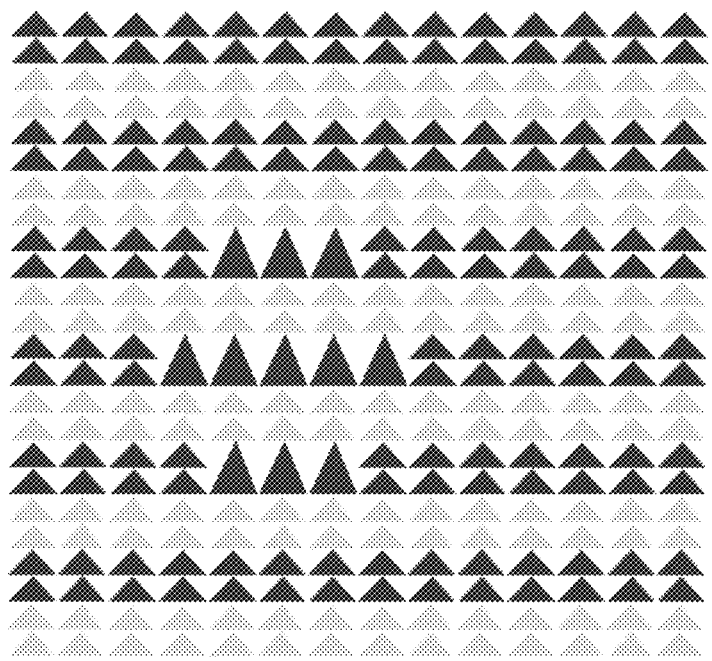

FIG. 1A illustrates an effect of occlusion and pattern replication. The upper-left quadrant illustrates a sample base pattern of retroreflective elements. In this example, if both of the circles are visible, the illustrated pattern is identifiable by a computing device when captured in an image. The upper-right quadrant illustrates the same base pattern with one replication. In the lower-left quadrant of FIG. 1A, a white object has occluded one of the elements in the pattern. In this case, the occlusion results in an inability to detect the pattern. In the lower-right quadrant, once again, a white object is occluding one of the elements of the pattern, but due to the replication sufficient elements remain for detection of a pattern of the optical article by a computing device, such a vision detection system which may be implemented by one or more of PPEMS 6, articles of PPE 13, or any other computing devices. Various patterns of retroreflective elements can be used in the present disclosure, such as the exemplary designs shown in FIGS. 1B-1M.

In some examples, a vision detection system implemented in a computing device as described in this disclosure may include a classifier. The classifier may check a number of retroreflective elements in the pattern against a minimum required number of retroreflective elements and determine that a pattern containing at least one more element than the specified minimum number is detectable under partial occlusion.

The present disclosure also provides that a plurality of retroreflective elements can have the same or different shapes. Useful shapes for individual retroreflective elements includes, but are not limited to, circles, stars, squares, polygons, curved and irregular shapes, and the like. These individual retroreflective elements can be arranged in a mathematical way of arranging shapes such that the arrangement can be detected independent of the individual component shapes and the individual component shapes may add additional information. Mathematical arrangement refers to a scheme for sizing and spacing apart the components of the resulting optical article.

Retroreflective elements or resulting optical articles may be either standalone or may be repeating to increase robustness to partial occlusion. If the elements or articles are small, repetition may be provided for robust detection. If the optical article is large it is likely to be robust to partial occlusion due to a subset being visible.

Any number of the component shapes may be engineered to selectively reflect light of different wavelengths and/or polarization. For example, retroreflective elements with properties sufficient to meet regulatory standards (e.g., ANSI compliant material), and a subset of the optical article may be constructed such that it has special optical properties (e.g., wavelengths and/or polarization reflected). In such examples, a system (such as a computer vision system) can discriminate between sections of the optical article with special optical properties and the rest of the optical article or objects on which it is mounted. One example of the utility of such a construction may be determining that regulatory compliant gaps in the retroreflective elements must be less than xmm, and the computer vision system detects gaps greater than X mm. In some instances, the construction of the retroreflective elements may allow the computer vision system to only identify a subset of the retroreflective elements, but the system may determine this is sufficient to meet standards because the resulting optical article is reflective to light in a spectrum that is detectable by humans.

In some embodiments, a number of unique retroreflective elements in the optical article may be robust to deformation and perspective changes up to the point where retroreflective elements become completely occluded or they begin to merge together versus density of bright pixels. The spacing and feature size of the retroreflective elements (or shapes) comprising the optical article may account for over-glow. In some examples, a construction of the present disclosure may include retroreflective elements that are constructed of more than one level of reflective material, which may reduce effect of over-glow. For example, the outer edge of the retroreflective elements may be constructed from lower $R_A$ material as compared to the internal portion of the retroreflective elements. In some embodiments, a minimum measured difference in $R_A$, such as at least a difference of 5%, 10%, 20%, 50% or more, is useful.

Retroreflective elements can be manufactured by any number of methods including but not limited to: screen printing, weaving, stitching, and the like.

In some embodiments, the optical article is a deformable optical article. In some instances, the deformation may be caused by shrinkage, expansion, or both. In some instances, the deformation causes a spacing change between at least two of the retroreflective elements. In some instances, the deformation is reversible.

In some instances, the aforementioned retroreflective property changes in response to a change in condition. For example, a change in condition that could cause a change in at least one of the retroreflective properties of the plurality of retroreflective elements could be a change in thermal, moisture, mechanical deformation, or radiation. Thermal changes could be changes in ambient temperature, for example. Exemplary moisture changes include changes in ambient humidity or the presence of precipitation in an environment in which the optical article is being used. Mechanical deformation could include, for example, wrinkling of a garment on which the optical article is mounted.

In some instances, the retroreflective elements are individually sized and separated from one another such that each individual retroreflective element is resolvable at pre-defined distances or ranges of distances from the optical article.

In some instances, the spatially defined arrangement comprises geometric arrangement in which the retroreflective elements are positioned within a distance from their neighboring retroreflective elements, and wherein the retroreflective elements have a periodicity from one element to another within the spatially defined arrangement. In some instances, the periodicity is a regular periodicity. In some instances, the periodicity is an irregular periodicity. In some instances, the spatially defined arrangement is rotationally insensitive.

In some instances, a number of geometric arrangements that are specified per spatially defined arrangement may dependent on a specified quality of fit. In some instances, the retroreflective elements are positioned from their nearest neighboring retroreflective elements by a characteristic distance. In some instances, the retroreflective elements have a characteristic ratio of size to distance to neighboring retroreflective elements that is invariant with viewing angle.

In some instances, the optical article further comprises a printed layer disposed on the outer surface of at least a portion of the retroreflective elements. In some instances, the retroreflective properties are detectable in the infrared spectrum. In some instances, the optical article is disposed on a substrate selected from at least one of infrastructure, wearables, and vehicles.

In some examples, a fabric comprises the articles described in this disclosure. The present disclosure also includes a system comprising any of the aforementioned articles, an optical system, and an inference engine (e.g., implemented in a combination of hardware and/or software) for interpreting and classifying the plurality of retroreflective elements, wherein the optical system feeds data to the inference engine. In some instances, the article is disposed on at least one of infrastructure, targets, wearables, and vehicles.

In some instances, the optical system is part of a vehicle. In some examples, the vehicle uses the information as an input to an autonomous driving module. In some instances, the vehicle uses the information to provide human language feedback to the driver. In some instances, the vehicle uses the information to provide at least one of haptic, audible or visual feedback to the driver. In some examples, the information causes the autonomous driving module to cause the vehicle to change one or more operations (e.g., braking, turning, moving forward, moving backward, changing suspension characteristics, or any other operation that may be performed by a vehicle).

In some instances, the data-coded plurality of retroreflective elements is visible in the infrared spectrum to a computer vision system. In some instances, the information related to the data-coded plurality of retroreflective articles comprises at least one of road workers expected, pedestrians expected, construction workers expected, students expected, emergency responder workers expected.

In some instances, an inference engine is locally stored as a component of the optical system, while in other examples the inference engine is distributed remoted from the optical system. In some instances, the optical system communicates with the inference engine using a wireless communication protocol. In some embodiments, the inference engine and the optical system can perform one or more operations based on patterns as described in the present disclosure.

The presently disclosed system may be useful for various applications. For example, the presently disclosed system may use the presently disclosed optical article for the purpose of simplifying and enhancing detection capabilities of a system, such as a computer vision pedestrian detection, which allows for the system to determine location, identification, and/or pose of an individual wearing a garment, accessory or other objects on which the optical article is disposed. The data-coded content in the plurality of retroreflective elements may aid in simplification of the task of pedestrian detection by reducing the number of distractors that the optical system needs to evaluate by thresholding the image based on properties of the optical (such as, for example, intensity and/or color spectrum of the light returned) and evaluating those segmented regions for meaningful shapes (or patterns) based on the design of the garment, accessory or other article on which the optical article is disposed and likely poses of the wearer.

Figure 2A:
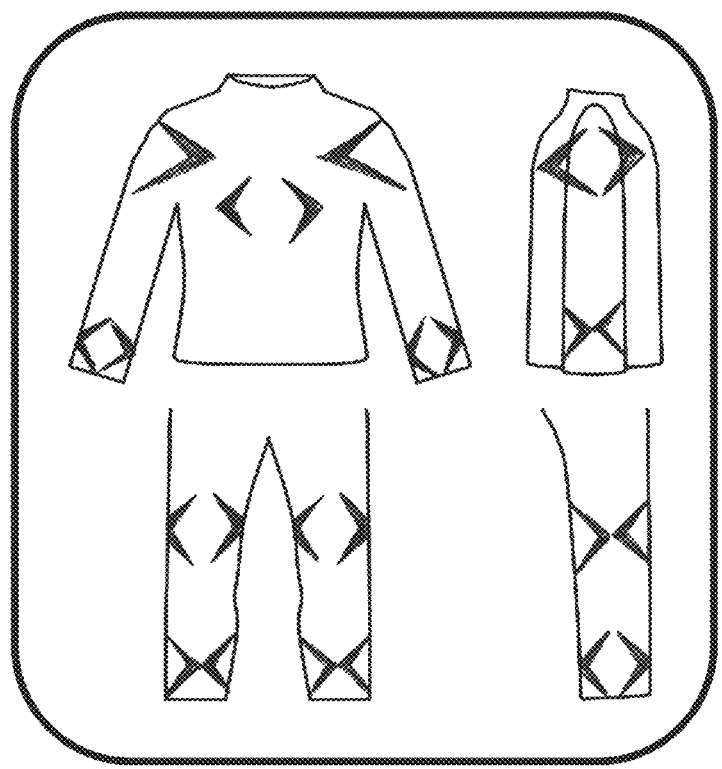
FIGS. 2A-2B illustrate the presently disclosed optical articles disposed on objects.
Figure 2B:

The presently disclosed system may include at least one camera, a light source (such as, for example, vehicle headlights, or other visible, NIR, or FIR light sources), and the presently disclosed optical articles. The presently disclosed system utilizes the pattern of light returned from the optical article to identify the object on which the optical article is disposed, infer pose, position, likelihood of intersection, etc. Some examples may include a garment design, such as those illustrated in FIGS. 2A-2B. In these example, a frontal view of the garment has a different number and pattern of visible optical articles having a plurality of retroreflective elements than a profile view of the garment. If the optical articles on the garment are of a known size (for example, if the chevrons in this case are all 6 inches in length) then the system could infer relative distance and position of the wearer from the camera based on projected size and position.

Figure 3:
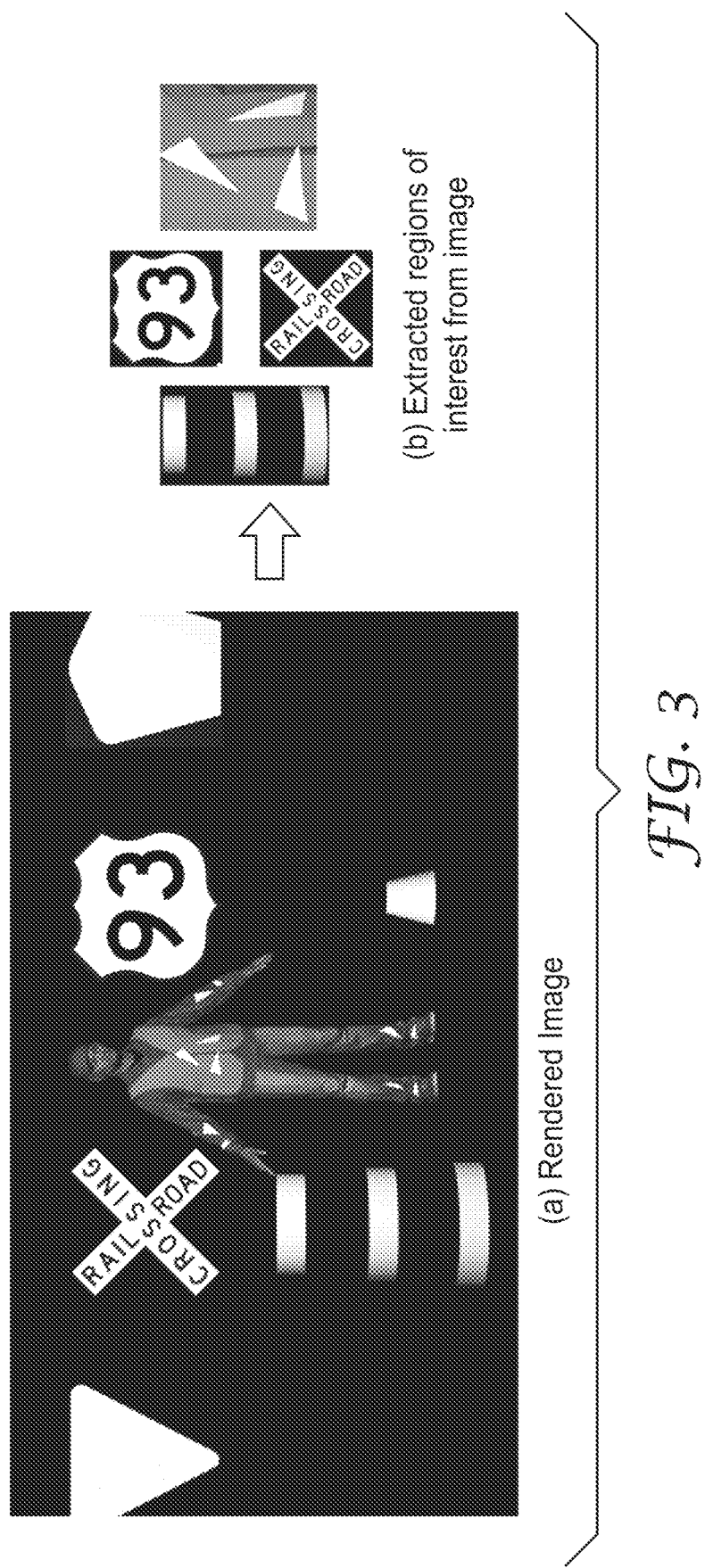
FIG. 3 illustrates a rendered image of an environment including the shape in presence of distractors produced by automatic extraction of the regions of interest (ROI) for the shapes from a synthetically generated image according to some embodiments of the presently disclosed system.

In some examples, a computing device as described in this disclosure may determine the saliency of design shapes, such as optical articles and a plurality of retroreflective elements included therein, for an application environment without having to collect real world data (images/videos) of such shapes. A computing device may perform one or more of the following operations illustrated in FIG. 3.

In some examples, the computing device may be pre-configured or pre-loaded with one or more shapes of interest, such as optical articles and a plurality of retroreflective elements included therein. For the application environment, a set of distractor shapes or objects (e.g., shapes of interest) which commonly occur in the environment is known e.g. for a highway application may be stored by the computing device. The set of distractor shapes can include highway information sign, speed limit sign, cones, barrels, and the like.

A design shape (such as optical articles and a plurality of retroreflective elements included therein) placed on an object of interest (such as infrastructure, garments, accessories, and the like) and distractor set may be used by a computing device to generate a synthetic dataset of images and/or videos. This includes, but is not limited to, a computing device that uses a 3D model of the environment to produce a rendering of the object in that environment. Using such techniques, the computing device may generate data which can simulate effects like lighting effects, viewpoint variations, environment clutter, object motion, and the like. FIG. 3A illustrates a sample rendered image of a highway worker wearing a high visibility garment with an exemplary optical article of the present disclosure as the design shape in the frontal portion of his garment.

The regions of interest (ROI) corresponding to the design shape (e.g., optical articles and a plurality of retroreflective elements included therein) and the distractor are extracted from the images. FIG. 3B illustrates one such example of ROIs extracted from a rendered image. This process can be automated using knowledge about a 3D model provided for the rendering of the environment, the computing device may extract ROIs from a rendered image. For each extracted ROI, features characterizing their properties like appearance, shape, texture, geometry are computed e.g. shape context, histogram of oriented gradients, area, etc.

Figure 4:
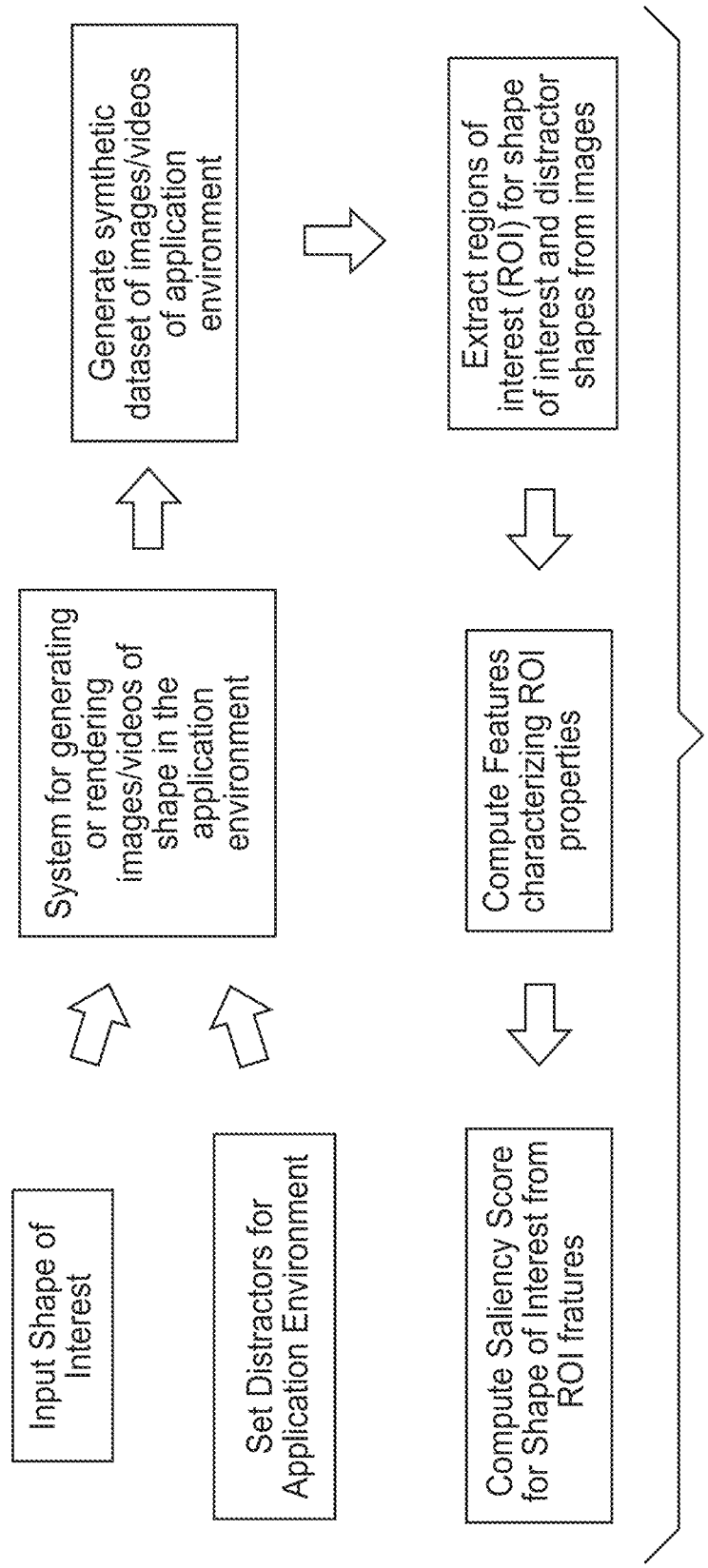
FIG. 4 depicts a flowchart describing the steps for evaluating the saliency of an input shape using synthetically generated data according to some embodiments of the presently disclosed system.

The computed features are then input into a set of operations, an example of which is shown in FIG. 4 illustrates example operations to generate, based on features (e.g., shapes of interest and/or distractors), the saliency score for the design shape (e.g., optical articles and a plurality of retroreflective elements included therein) against the set of distractor shapes. The saliency evaluation generates a quantitative score for the design shape's uniqueness amongst the set of distractors.

Figure 6A:
FIGS. 6A-6C depicts exemplary modifications to a carrier pattern.
Figure 6B:
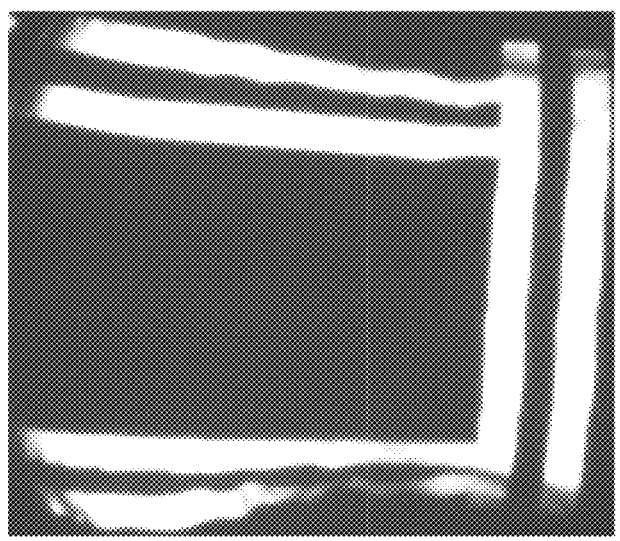
Figure 6C:
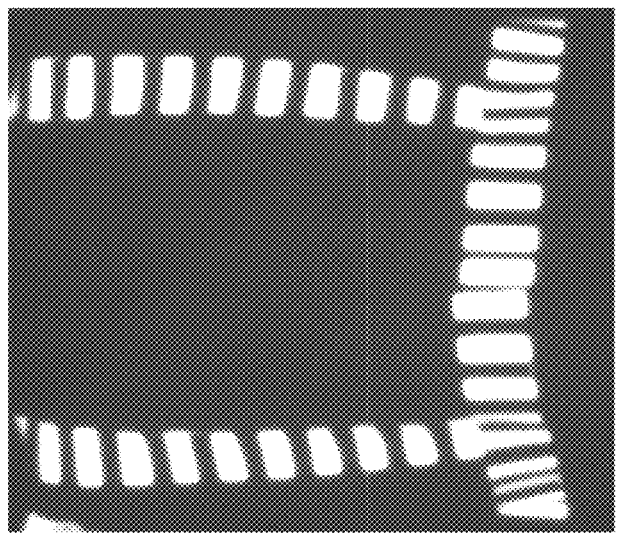

In some examples, techniques of this disclosure may modify retroreflective shapes (such as optical articles and a plurality of retroreflective elements included therein) on objects of interest (such as infrastructure, garments, accessories, and the like) to provide additional information. In some instances, the object of interest is also referred to as a carrier pattern. Exemplary objects of interest, or carrier patterns, may include a high-visibility safety vest worn by workers in work-zones, barrels used in roadside construction zones to mark navigation limits, and other infrastructure, garments, accessories, and the like. Various operations are described with respect to FIGS. 6A-6C.

Figure 5:
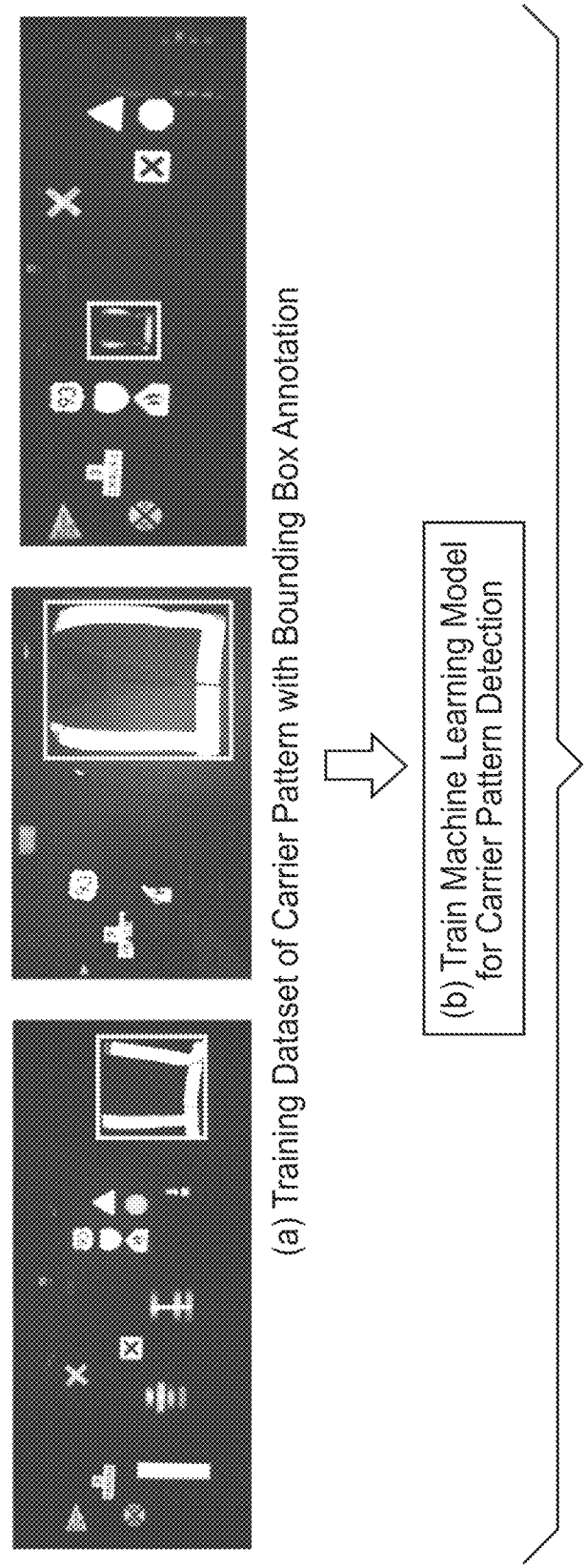
FIG. 5 depicts an image of the object of interest (carrier pattern).

In FIG. 5, annotated images of the carrier pattern for the environment may collected by a computing device. These include the images of objects from varying distances, poses and viewpoints. As an example, FIG. 5 includes examples of retroreflective vests worn by individual workers in work-zones.

In some examples, a computing device includes a machine learning model that is trained to classify image patches as a carrier pattern or not a carrier pattern. To train this model, image patches of the carrier pattern and the background (image patches which do not include the carrier pattern) are provided. By applying the training set to the model, the probabilities of the model may be modified to correctly classify an image pattern as a carrier pattern or not a carrier pattern. The computing device may generate or determine image features characterizing the appearance of these image patches like a histogram of oriented gradients (HOG) or shape context are computed. These features are then used to train a classifier model e.g. Support Vector Machine (SVM) or Decision Trees. In some examples, the computed features are inputted to a model for an image patch and the output may be (but not limited to) yes/no answer or different ranges of probabilities/scores for presence of the carrier pattern in the input image patch.

Given a carrier pattern and based on the requirements of the system for the environment, modifications are made to the retroreflective shape of the carrier pattern. Examples are provided in FIGS. 6A-6C where the H-shape used in safety vests is partially modified to produce 2 additional sub-categories of the pattern. The modifications are not just limited to size and could include changes to the color of the pattern also.

Images of the different sub-categories may be collected and stored by a computing device in a data collection experiment or through a synthetic data generation component that synthetically generates images of different sub-categories. In some examples, a computing device may collect and store images of the different sub-categories individually, and may use one or more clustering techniques known to one of skill in the art to discover instances where the carrier pattern image already include instances of the sub-category.

Figure 7:
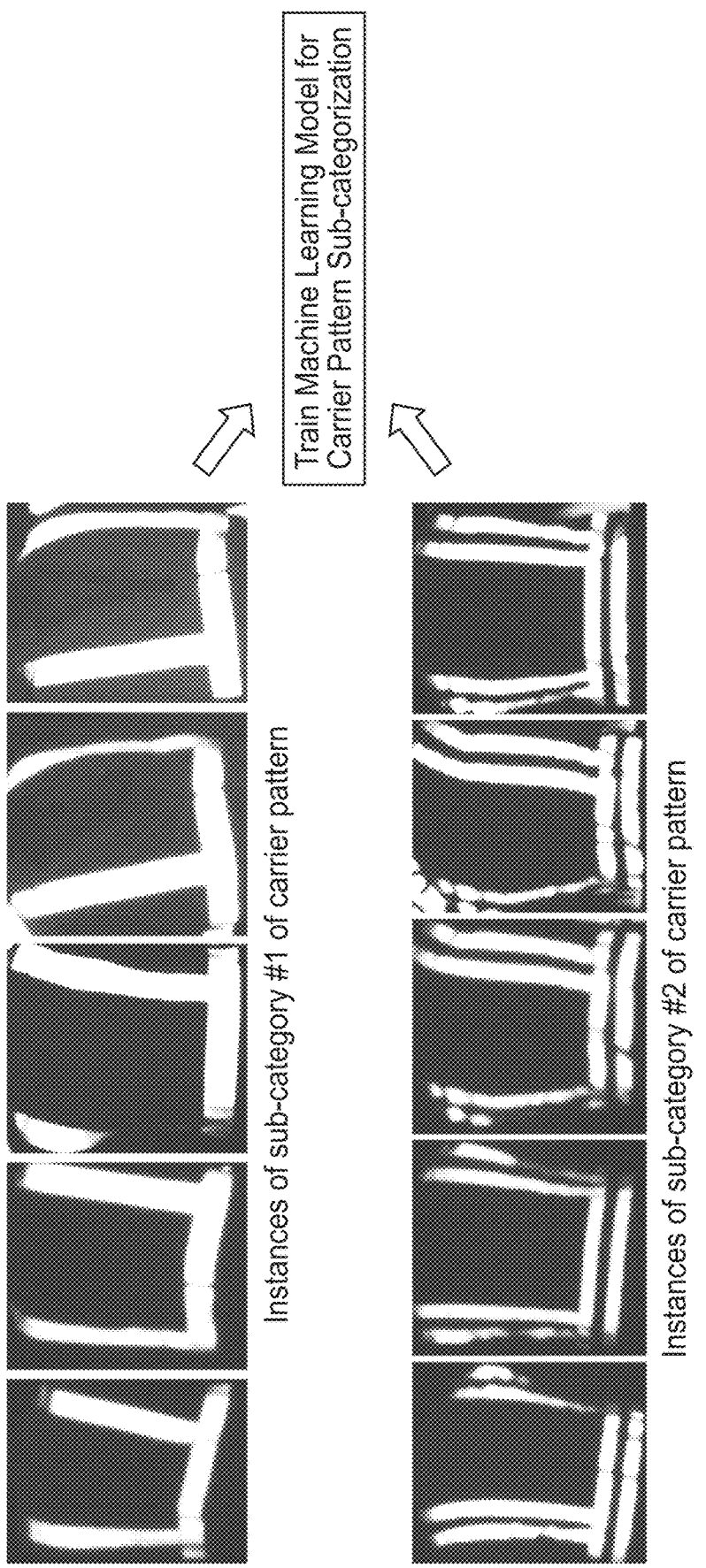
FIG. 7 depicts images of instances of different subcategories of the carrier pattern.

In some examples, a sub-categorization classifier may be trained by a computing device using instances of the different sub-categories as shown in FIG. 7. At runtime, the computing device may first identify the presence of the carrier pattern. Having detected the carrier pattern in an image patch, the computing device may process the image patch to identify the sub-category present in the image. Example are provided in FIGS. 8A-8B.

Figure 9:
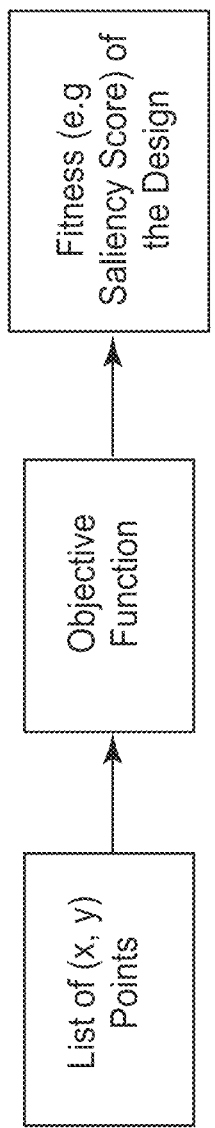
FIG. 9 illustrates an evaluation process for possible shape arrangements in some embodiments of the presently disclosed system.

In some examples, a computing device may implement techniques that 1) initialize the boundary of a shape of an optical article that is placed on an object of interest, such as a garment and 2) define an objective function that measures the usefulness or fit of that boundary configuration. One or more of these techniques may search the space of possible geometries and determine a geometry that optimizes that objective function. FIG. 9 illustrates operations for evaluating each possible geometry (parameterized as a set of [x, y] points). In some embodiments, the operations are executed as a genetic algorithm and a numerical gradient-based optimization algorithm. Each of these algorithms may use a different technique to generate sample geometries, evaluate them, and attempt to further generate new arrangements with improved evaluation scores as described in this disclosure.

Figure 10:
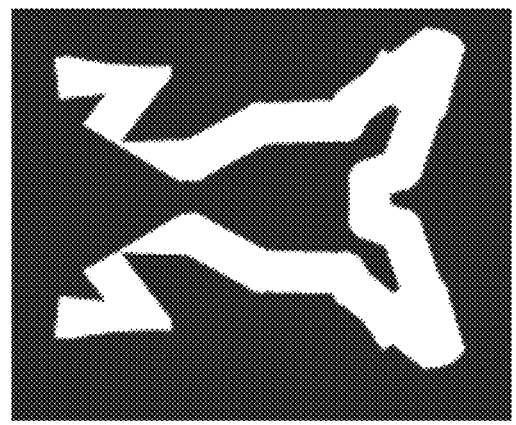
FIG. 10 illustrates a design with a fit (or saliency) score produced in some embodiments in the presently disclosed system.
Figure 11:
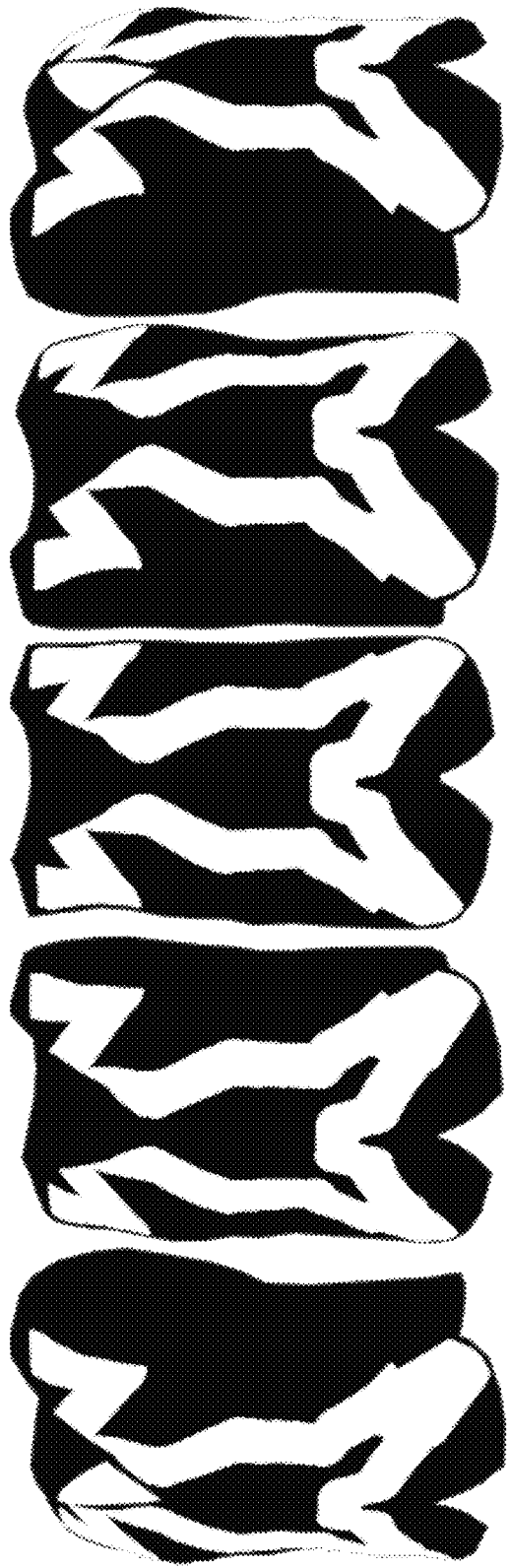
FIG. 11 illustrates the design from FIG. 10, rendered onto 3D vest model in some embodiments in the presently disclosed system.

In some embodiments, a plurality of retroreflective elements are positioned in configurations that produce designs, such as garment designs, which are highly salient to a system, such as systems used by motorists (see FIG. 10). An objective function implemented by a computing device assesses the saliency of a design by applying that design as a texture to a 3D model of a vest (i.e. the kind of vest worn by a construction worker). A 3D Modeling application (i.e. Blender) implemented in a computing device may be used to produce several different views of this 3D model (see FIG. 11). The resulting views are fed into a clustering algorithm, as well as a set of 'distractor' shapes. The distractor shapes depend on an application space. In some embodiments, distractor shapes are objects that can be confused as the object of interest in the presently disclosed systems and methods. The clustering algorithm groups these inputs into clusters.

In some embodiments, clustering techniques may accurately sort each of these designs into one cluster and each of the distractor shapes into the other cluster. This results in a fitness of 1.0. Fitness can be quantified by 'Silhouette Score', which measures the quality of a set of clusters, based on known ground truth labels. In other words, Silhouette Score is used to measure how well the clustering algorithm performs. There are other potentially useful methods of quantifying the quality of a set of clusters.

In some embodiments, a SciPy optimization toolkit for Python can be used to produce a design, where an objective function that generated circular shapes is used. The SciPy function is called scipy.optimize.minimize( ). This function is supplied with 1) a list of [x, y] points that define the starting configuration of the boundary of the polygonal shape of the design (such as an optical article using a plurality of retroreflective elements), 2) an objective function that quantifies the cost of a particular configuration of this design, with lower values being better 3) a specification for an optimization method to use for the optimization, and 4) a list of shape or size constraints.

In some embodiments, the Optimization Method is chosen from a list of options in the documentation (e.g. Sequential Least Squares Programming). The Constraints may be defined to constrain any or all of the constraints listed in FIG. 12.

In accordance with techniques of this disclosure, a genetic algorithm may be used to optimize a data structure. In some examples, the data structure may be a data-represented chromosome (with an analogy to the container of genetic material in a living system). The genetic algorithm generates multiple chromosomes (either completely randomly or by making random variations on a seed design). The fitness of each chromosome is then determined. The chromosomes with poor fitness are deleted and replaced with copies of the highly fit chromosomes. The new copies are modified using mutation operators. A mutation operator applies stochastic changes to some of the values in the chromosome. The copies may be produced using an operation called crossover, whereby each child gets genetic material from multiple parents, though crossover is not always required.

Figure 13:
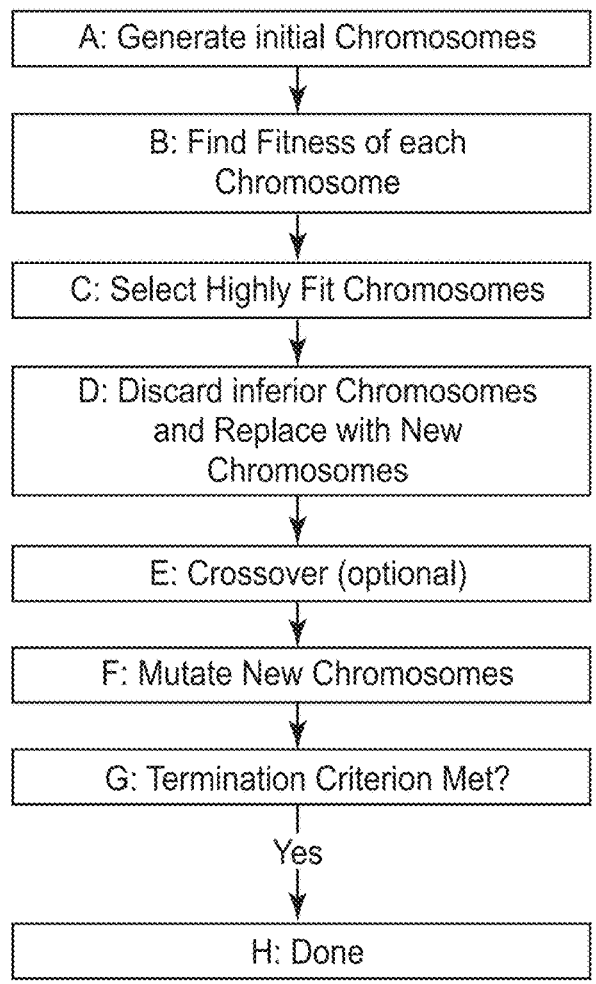
FIG. 13 depicts an exemplary genetic algorithm useful in some embodiments in the presently disclosed system.

In some embodiments, the chromosome is a list of points. Each point defines the vertex of a shape comprising the optical article having a plurality of retroreflective elements. The genetic algorithm favors geometries with high fitness (i.e. in this case, with fitness that is most nearly equal to 1.0). Geometries with high fitness tend to stay in the population, and geometries with low fitness tend to be excluded from the population due to the selection operation. FIG. 13 describes the genetic algorithm.

The population of chromosomes can be initialized randomly or initialized using pre-evolved chromosomes. The population may alternatively be initialized using the top N most-fit chromosomes from a set of thousands of randomly generated chromosomes. Similar to the numerical optimization algorithm, the genetic algorithm may use the saliency objective function. The objection function can be modified to impose either hard or soft constraints on the design. Hard constraints guarantee compliance by the design. Soft constraints are used by the GA to "nudge" designs toward desirable attributes, but do not entirely preclude outlier designs.

1) Height and Width
2) Area (minimum and/or maximum—to comply with ANSI standards)
3) Presence of retroreflective elements in certain areas (i.e. to enforce presence of material on the shoulders for ANSI standards compliance)
4) Apply a mask to the design, to define the region of vest The computing device may replace the chromosomes with the lowest fitness with copies of the chromosomes that have the highest fitness. See operations C and D in FIG. 13. This can be done in various ways. In some embodiments, Single Tournament Selection is used with a tournament size of 4. This approach requires random assignment of each chromosome to a group of 4. The two inferior chromosomes are replaced with copies of the two superior chromosomes in that group. These copies may be exact replicas of the two superior parents or each child may be created using some genetic material from each parent. This later approach is called crossover (see operation E in FIG. 13). The children are then mutated (see operation F in FIG. 13). In the case of our proof-of-concept implementation, mutation involves randomly perturbing one or more [x, y] vertices in our chromosome.

Figure 12:
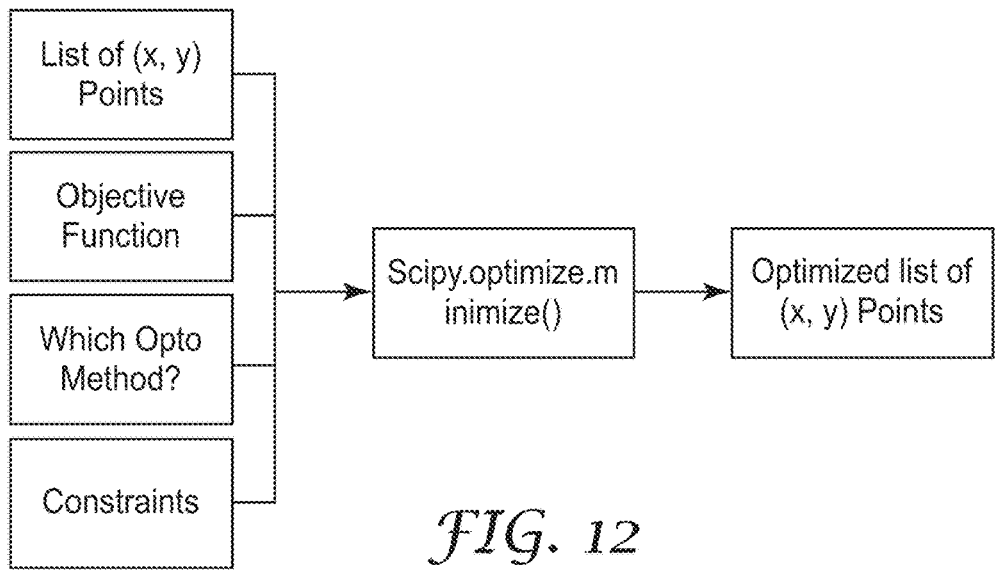
FIG. 12 illustrates an exemplary function that can be used for optimizing designs in the presently disclosed system.

Finally, determination is made as to whether the termination criterion has been met (see operation G in FIG. 13). Termination of the algorithm can be done after a predetermined number of generations. Alternatively, termination of evolution can be done after a chromosome appears with at least a minimum threshold of fitness. FIG. 12 illustrates an example input chromosome (left) and an example output chromosome (right).

Techniques of this disclosure may use or exploit retroreflection for training of an object part detector. Optical articles with retroreflective properties appear bright in images where a light source is projected on them. Therefore, when images of these optical articles are intensity-thresholded, the object may appear as a connected component in the resulting binary image. In the present disclosure, this property may be used to segment (if there are any) parts of an optical article. The sequence of operations to perform this methodology is described here and a sample workflow for a single instance of the optical article is depicted in FIG. 14.

Figure 14:
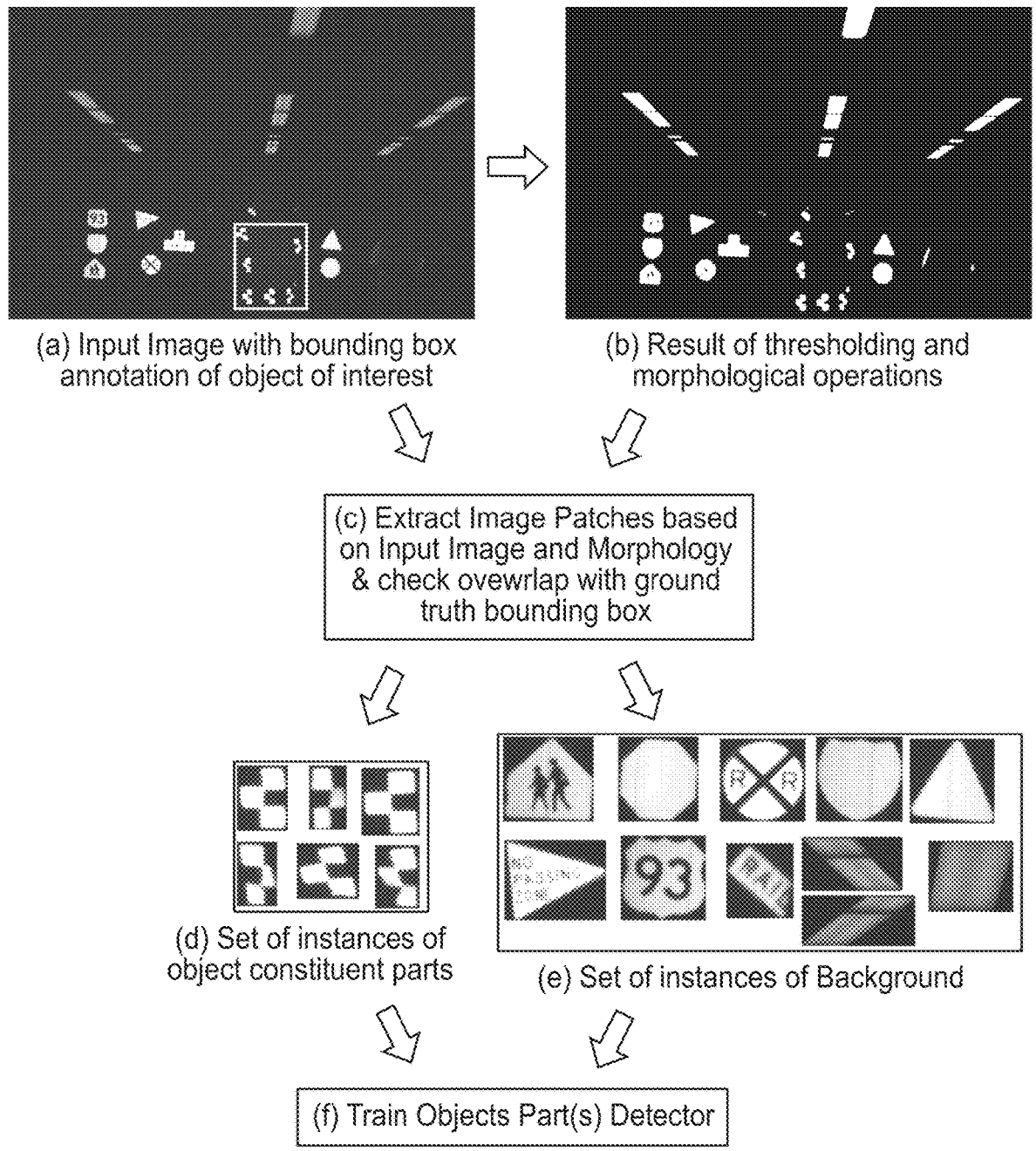
FIG. 14 depicts an embodiment for a workflow for a single image instance useful in some embodiments in the presently disclosed system.

In FIG. 14, a computing device may receive an input image generated by an input capture device. The image is annotated with the bounding box location of the entire object of interest (such as an optical article) (as shown in operation (a) in FIG. 14). In some examples, the annotation does not include any information e.g. count or location of the parts of the object.

The computing device may perform intensity thresholding and/or morphological operations on the image such as closing, in which dilation and erosion are carried on the image. These techniques may provide binary image (images if run for multiple thresholds) where connected components provide image patches. The set of image patches may be separated into two sets—all image patches which do not have any overlap with the bounding box annotation and constitute the background (as shown in operation (e) in FIG.

14). The other set includes patches with some overlap with the ground truth annotation (as shown in operation (d) in FIG. 14).

In some examples, a computing device may prune a set of patches with overlap by using a sizing heuristic to eliminate noisy patches left behind as an artifact of morphology. A set of constituent parts can include a pattern repeated across the object (as shown an example in step (a) in FIG. 14) or different parts. These can be discovered by a clustering algorithm which can determine the number of parts of the object. The number of constituent parts may be provided through human supervision also.

In some examples, a computing device trains a detector model for the discovered constituent part of the object (as shown in operation (f) in FIG. 14). This model is trained by the computing device to detect a specific part of the object of interest in a scene.

In some embodiments, a method of characterization of the presently disclosed optical articles having a plurality of retroreflective elements includes a distribution function. For example, an optical article may be characterized by a computing device in terms of retro-reflective elements or features (reflecting a given wavelength and/or polarization potentially with a particular intensity) with a certain distribution of sizes and a certain distribution of spacing and relative position of the component elements. In some examples, this type of characterization may be utilized to enable additional capabilities such as object classification (e.g., one characterization associated with one class of object and another characterization associate with a second class of object) or to enable product authentication. In some examples, an optical article could also be characterized by a distribution generated from a non-dimensional ratio determined from the constellation, for example, a size of a node divided by the distance to the next closest node.

In the present disclosure, only a portion of the optical article that is sufficient to accurately sample the distribution may be required by the computing device for categorization. For example, if an optical article contains many elements, X, that are part of a constellation, only a small number of visible elements, n, may be required for a statistically significant sample of the population (i.e. n<<X). This will improve the robustness of the categorization when the view of the article is partially occluded or distorted.

The presented disclosure also provides a system and method to use or exploit retroreflection for part based detection. The system may combine two properties of optical articles, particularly with retroreflective properties: (1) under certain morphological operations on an intensity-thresholded image of an optical article, the resulting connected components is likely to include the whole object (2) that certain optical articles are composed of constituent parts or may be modified to be a composition of repeating parts and some of these parts would be visible when the optical article is partially visible in its pose or occluded by other objects.

Figure 15:
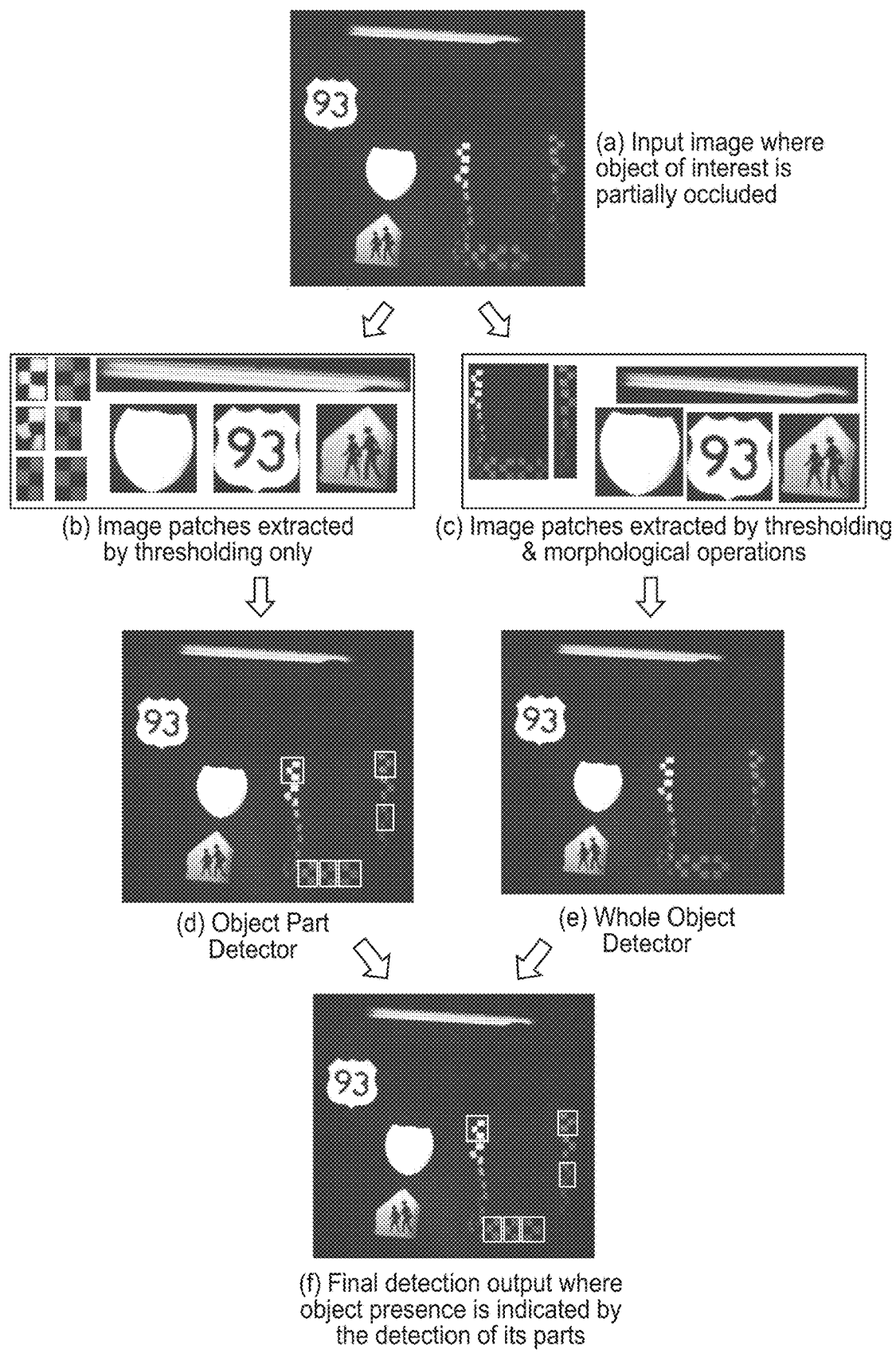
FIG. 15 depicts an embodiment for a workflow for an input image useful in some embodiments in the presently disclosed system.

These two properties can be used by a computing device executing a monolithic detector that searches for a complete object of interest (such as infrastructure, a garment, an accessory, or other objects on which the presently disclosed optical article is disposed) and combines it with a detector that looks for its constituent part(s). The set of operations to perform this technique is depicted in FIG. 15 and described herein.

The input to the system is an image of a scene where an object of interest (such as infrastructure, a garment, an accessory, or other objects on which the presently disclosed optical article is disposed) may be present along with detector models that are trained to find the whole optical article disposed on the object of interest and separately, its constituent parts. The optical article on the object may be completely visible or partially visible due to pose or occlusion.

Image patches, which can include the optical article, are generated in two ways: (1) by intensity thresholding that segment the constituent parts (as shown in operation (b) of FIG. 15) or (2) thresholding combined with morphological operations (as shown in operation (c) of FIG. 15). A part detector operation is run on the first pool of candidates as the computing device is trained to look for the smaller compositional parts of the optical article (as shown in operation (d) in FIG. 15), while the whole object detector is run on the image patches extracted after morphological operations (as shown in operation (e) in FIG. 15).

The outputs of running the two different detector frameworks may be combined by the computing device. Even if the entire optical article may not be detected by the monolithic detector, the part based detector will discover some of the optical article thereby indicating presence of the article in the scene.

While one particular implementation of a computing system is described herein, other configurations and embodiments of computing systems consistent with and within the scope of the present disclosure will be apparent to one of skill in the art upon reading the present disclosure. Various modifications and alterations of the present disclosure will become apparent to those skilled in the art without departing from the scope and spirit of the techniques of this disclosure.

The term "data coded" (or "data rich") as used herein may mean information that is machine interpretable or configured for machine interpretation or recognition.

The term "highly salient" as used herein may mean a visual feature or characteristic that stands out or is distinguishable (by human and/or machine) from other entities or features in an environment.

The term "object part detector" as used herein may mean a detector that can find individual parts of an object in image/video instead of finding the whole object itself.

The term "over glow" as used herein may mean the amount and/or position of detected retroreflective intensity in a retroreflective image outside of the actual boundaries of the retroreflective elements being viewed in the retroreflective image.

The present disclosure provides an optical article comprising a data-coded plurality of retroreflective elements that are configured in a spatially defined arrangement. The plurality of retroreflective elements includes retroreflective elements, where this plurality of retroreflective elements have at least two different retroreflective properties.

In some instances, the at least two different retroreflective properties are at least two different retroreflective intensity values. In some instances, the at least two different retroreflective properties are at least two different wavelengths. In some instances, the at least two different retroreflective properties have at least two different polarization states. In some instances, the at least two different retroreflective properties at least two different phase retardations.

In some embodiments, the data-coded plurality of retroreflective elements is configured in a repeating spatially defined arrangement such that the information is interpretable even when the portion of the retroreflective elements are occluded.

EXAMPLES

| Designation | Description |
|---|---|
| ORASOL BLACK X55 | commercially available from BASF Corporation, Florham Park, NJ, USA |
| RE 195 | commercially available from Nazdar, Ink Technologies, Shawnee, KS USA |
| PARALOID B66 | commercially available from Dow Chemicals, Auburn MI, USA |
| DOWANOL DPMA | Dipropylene glycol methyl ether acetate), commercially available from Dow Chemicals, Auburn MI, USA |

Test Methods

Retroreflectivity Intensity

Retroreflective images were taken using either a visible or near-infrared light source. Visible retroreflective photographs of samples were taken with a CMOSIS-based USB 3.0 color camera (Model acA2000-165uc from Basler AG, Ahrensburg Germany). The retrolight source was a 100-watt halogen lamp (Lowel Pro Light from Tiffen Inc, Hauppauge, N.Y.), combined with a ground glass light diffuser (Lowel ID-50H from Tiffen Inc, Hauppauge, N.Y.) and a beam splitter (Nerlite® DOAL®-100-LED from Microscan, Renton, Wash.). The bead splitter was operated with the LED module removed. The camera was positioned on the center of the beam splitter and parallel to the center of the sample, with an entrance angle (defined as the angle between the retrolight source and the normal to the surface of the sample) of either 5 or 30 degree. The observation angle (defined as the angle between the retrolight/sample vector and the camera/sample vector) was approximately 0 degrees. Before the images were captured, the color intensity was calibrated using a white balance taken with a blank piece of print paper. The camera was set to an aperture setting of f/16 and images were taken at a viewing distance of 1.5 meters. The camera exposure time was adjusted to 1.3 and 1.8 milliseconds for 5 and 30-degree entrance angles, respectively.

Retroreflective images in the near-infrared wavelength range (at 850 and 940 nm) were taken with a USB 3.0 CCD camera (Model acA1300-30 um from Basler AG, Ahrensburg Germany), using an 8.5 mm/f1.3 lens (Edmund Optics Barrington, N.J.) attached to either an 850 nm or a 940 nm band filter (BP850-30.5 and BN940-30.5 filter, respectively, from Mid Optic, Palatine, Ill.), with an aperture of f/8 at a distance of 1.5 meters. The retrolight source was an 83-millimeter diameter infrared LED ring light. The camera was positioned on the center of the ring light and parallel to the center of the sample, with an entrance angle of either 5 or 30-degree to the sample adhered to a vertical rotation stand. The observation angle is approximately 1.5 degrees. The camera exposure time for the 850 nm measurements was adjusted 10 milliseconds for all images. The camera exposure time for the 940 nm measurements was adjusted to 35 and 17 milliseconds for the 940 nm measurements for 5 and 30-degree entrance angles, respectively.

Retroreflective intensities were measured using pixel intensities from respective areas on the camera images. Commercially-available image processing software (ImageJ 1.48V freeware from the National Institutes of Health, Washington, D.C., obtainable through https://imagej.nih.gov/ij/) was used to calculate pixel intensities. An area of approximately 60×120 pixels was used for each region, and the minimum, maximum and mean pixel intensity were recorded.

Retroreflective intensities were measured using pixel intensities from respective areas on the camera images. Commercially-available image processing software (ImageJ 1.48V freeware from the National Institutes of Health, Washington, D.C., obtainable through https://imagej.nih.gov/ij/) was used to calculate pixel intensities. An area of approximately 60×120 pixels was used for each region, and the minimum, maximum and mean pixel intensity were recorded. The pixel intensity range from low to high is 0 to 255, respectively.

Transmission Measurements

Optical transmission spectra in both the visible and near-infrared wavelength ranges were measured using an optical spectrophotometer (UltrascanPro from Hunter Associates Laboratory Reston, Va.).

Coefficient of Retroreflectivity

Retroreflectivity was measured using the test criteria described in ASTM E810-03 (2013)—Standard Test Method for Coefficient of Retroreflective Sheeting (RA) using the Coplanar Geometry at 0.20 observation angle and 50 entrance-angle, i.e. 0.2/50 angle. Retroreflective units are reported in cd/lux/m2. 32-angle retroreflectivity measurement followed ANSI/ISEA 107-2010 standard.

Example 1

Commercially available retroreflective materials available from 3M Company, St. Paul, Minn., under the designation "SCOTCHLITE 8726" and "SCOTCHLITE 680-10" were used. A strip 10 cm×2 cm was obtained of each product. The strips were placed parallel on a horizontal surface with a 5-cm separation between the strips. The Coefficient of Retroreflectivity, $R_A$, was measured per ASTM D810-03 standard test method and are reported below for each material.

$R_A$ of SCOTCHLITE 8726=484
$R_A$ of SCOTCHLITE 680–10=114

A machine vision system, such as the presently disclosed optical system, will detect differences in the $R_A$ of the two samples. Such difference in measured values along with the size, shape and relative placement of the two strips can be used as input into an algorithm, where the output of the algorithm signifies specific information and action recommendations.

Comparative Example 1

Two strips: 10 cm×2 cm of SCOTCHLITE 8726 were obtained. The two strips were placed parallel on a horizontal surface with a 5 cm separation between the strips. The Coefficient of Retroreflectivity, $R_A$, was measured per ASTM D810-03 standard test method and is reported below for both strips.

$R_A$ of top strip: 514
$R_A$ of bottom strip: 493

The difference between the two measured values is statistically too small to trigger detection by an optical system.

Example 2

Coating formulations were developed to provide a combination of visible light attenuation and a range of optical density (absorption) in the near-IR wavelength range.

Coating Details

Coating Solution 1

4 grams of PARALOID B66 was dissolved in 10 grams of DOWANOL DPMA in a glass vial. 3 grams of ORASOL BLACK X55 was dissolved in 1 gram of MEK and 9 grams of RE195 in another glass vial. Both were mixed together to form Coating Solution 1.

Coating Solution 2

4 grams of PARALOID B66 was dissolved in 10 grams of DOWANOL DPMA in a glass vial. Next 3 grams of RE195 was added, then followed by 3-gram addition of YMF-02A. All the contents were mixed using a vortex mixer to form coating solution 1.

Coating Process

Samples were prepared by Coating Solution 1 on the primed side of PET with Meyer Rod #12, followed by drying in a convection oven at 70° C. for 10 minutes. Following this Coating Solution 2 was coated on the reverse side of the PET film. Different coating thicknesses were obtained by using different Meyer rods #16, #5 and #3 to obtain IR filters 3, 8 and 9, respectively. IR Filter 1 was coated only on the primed side. All the coatings were dried at 70° C. for another 10 min.

Coating for Example 2A: Coating 1 thickness corresponding to Meyer Rod 12 on top side of PET; Coating 2 thickness corresponding to Meyer Rod #16

Coating for Example 2B: Coating 1 thickness corresponding to Meyer Rod 12 on top side of PET; Coating 2 thickness corresponding to Meyer Rod #5

Coating for Example 2C: Coating 1 thickness corresponding to Meyer Rod 12 on top side of PET; Coating 2 thickness corresponding to Meyer Rod #5

Coating for Example 2D: Coating 1 thickness corresponding to Meyer Rod 12 on top side of PET; No coating on reverse side.

Figure 16:
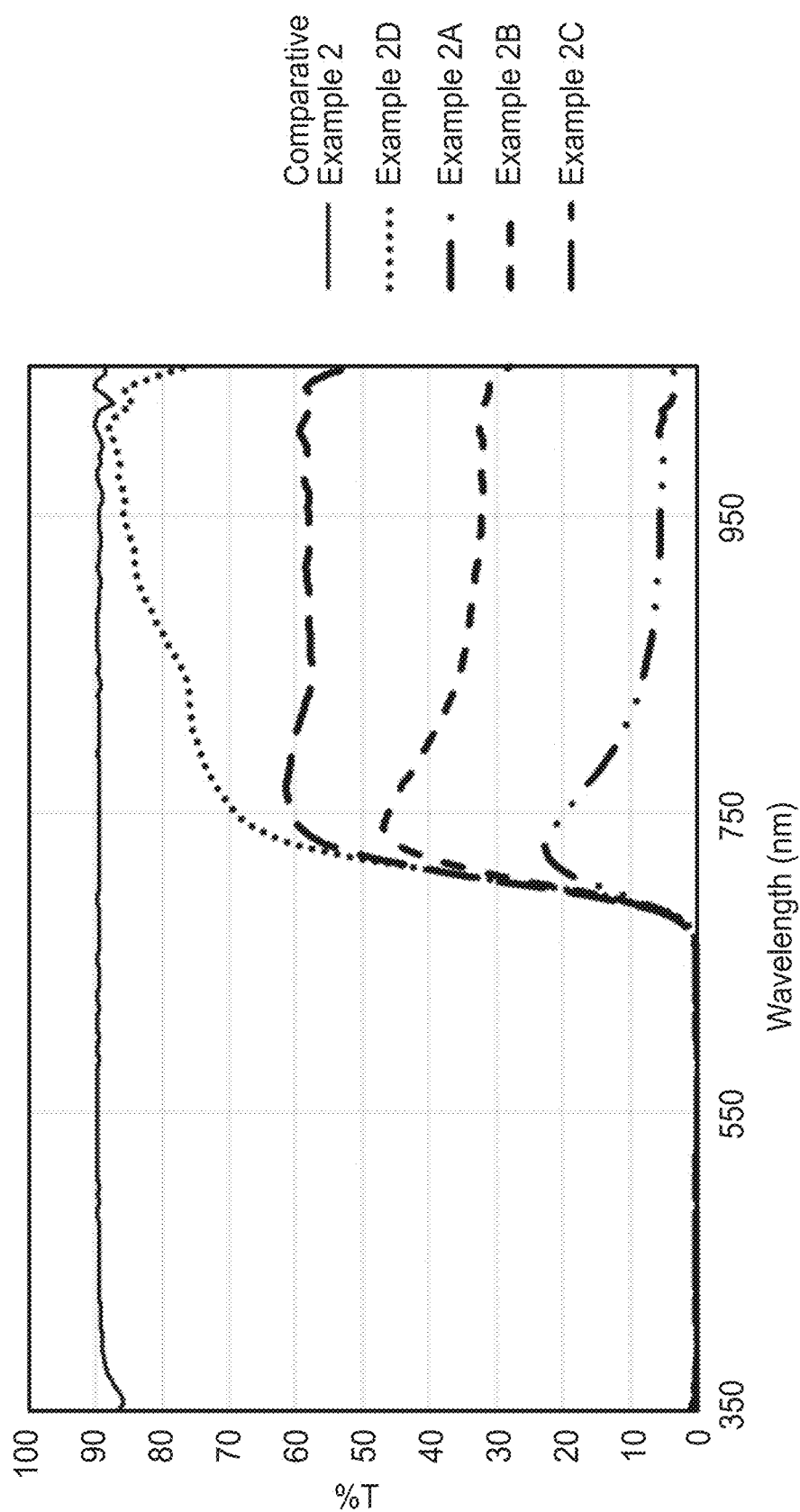
FIG. 16 illustrates transmission spectra for coated films related to Examples 2A-2D and Comparative Example 2.
Figure 17:
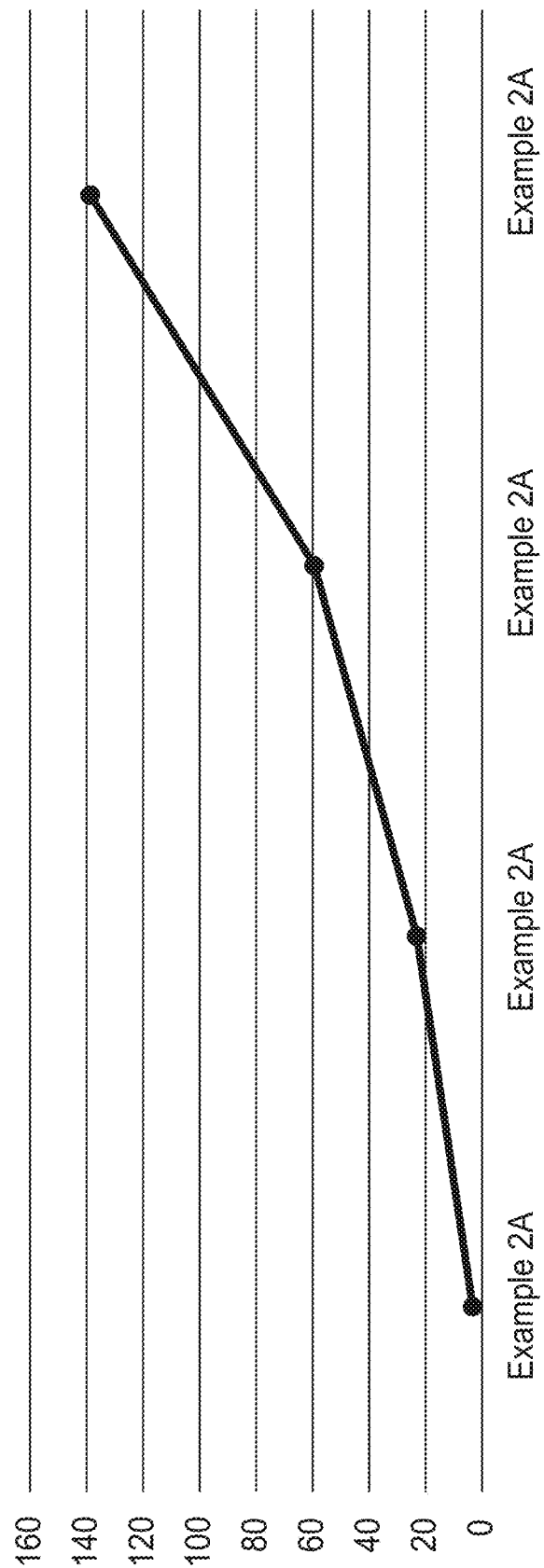
FIG. 17 illustrates retroreflected pixel intensity for Examples 2A-2D.

FIG. 16 illustrates the transmission spectra for coated films related to Examples 2A-2D and Comparative Example 2. FIG. 17 illustrates retroreflective pixel intensity for Examples 2A-2D. Arrays of retroreflective elements were prepared by using the respective coated PET films as an overlay film on top of segments of a commercially-available microprismatic retroreflective sheeting (3M PRXF2340 Gray Metallized Prismatic Reflective Sheeting) Conspicuity Marking Film. The relative retroreflective intensity was measured using image processing on digital retroreflective images of arrangements of Examples 2A through 2D. Table 1 illustrates the visible and near-infrared retroreflective intensity. The examples provide essentially no intensity in the visible range and demonstrate a wide intensity range in the near-IR (940 nm).

Comparative Example 2

An overlayer comprising a PET film with no coatings was also included in the testing. Arrays of retroreflective elements were prepared by using the PET film as an overlay film on top of segments of a commercially-available microprismatic retroreflective sheeting (3M PRXF2340 Gray Metallized Prismatic Reflective Sheeting) Conspicuity Marking Film. For all of the samples in the array, the retroreflective intensity showed essentially no variation from element to element. The retroreflected pixel intensity was constant, approximately 200 in the visible range, and approximately 190 at 940 nm.

Example 3

Coating formulations were developed to provide a combination of visible light attenuation and a range of optical density (absorption) at different wavelengths within the near-IR wavelength range.

Example 3A 4 grams of PARALOID B66 was dissolved in 10 grams of DOWANOL DPMA in a glass vial. 3 grams of ORASOL BLACK X55 was dissolved in 1 gram of MEK and then added to 9 grams of RE195 in another glass vial. The contents were combined and mixed by hand. 1.5 grams of this mixture was added to 40 milligrams of IR-14 and the contents were mixed by hand.

The suspension was then coated onto a tinted PET film with Meyer Rod #20. After coating, the film was dried at 70° C. for 10 min.

Example 3B 4 grams of PARALOID B66 was dissolved in 10 grams of DOWANOL DPMA in a glass vial. 3 grams of ORASOL BLACK X55 was dissolved in 1 gram of MEK and then added to 9 grams of RE195 in another glass vial. The contents were combined and mixed by hand The suspension was then coated onto a tinted PET film with Meyer Rod #20. After coating, the film was dried at 70° C. for 10 min.

Example 3C

LUMOGEN BLACK FK4281 was milled and dispersed with a polymeric dispersant in 2-butoxyethyl acetate. 5 grams of this dispersion was mixed with 9 grams of a 33 wt % solution of PARALOID B66 in DOWANOL DPMA and 5 grams of RE195. The suspension was then coated onto a tinted PET film with Meyer Rod #20. After coating, the film was dried at 70° C. for 10 min.

Figure 18:
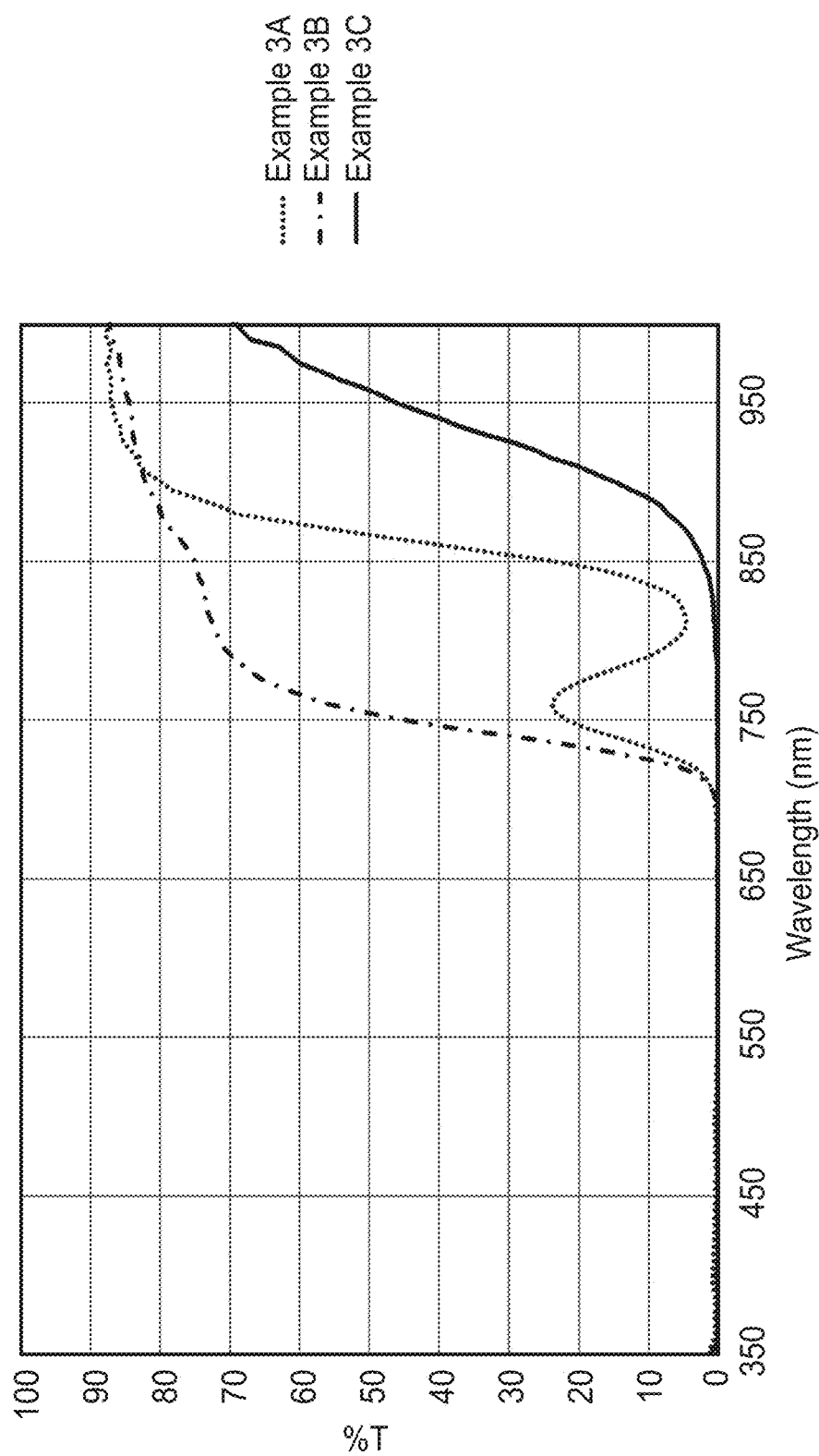
FIG. 18 illustrates transmission spectra for coated films related to Examples 3A-3C.

FIG. 18 illustrates the transmission spectra for coated films. Arrays of retroreflective elements were prepared by using the respective coated PET films as an overlay film on

TABLE 1

| | Wavelength range | Minimum Retroreflective Pixel Intensity | Maximum Retroreflective Pixel Intensity | Mean Retroreflective Pixel Intensity | Comment |
|---|---|---|---|---|---|
| Example 2A | Visible | 2 | 14 | 6.4 | Visible signal blocked |
| Example 2A | IR (940 nm) | 2 | 16 | 3.7 | IR (940 nm) signal blocked |
| Example 2B | Visible | 1 | 13 | 7.1 | Visible signal blocked |
| Example 2B | IR (940 nm) | 17 | 32 | 23.5 | IR (940 nm) partially transmitted |
| Example 2C | Visible | 2 | 12 | 7.1 | Visible signal blocked |
| Example 2C | IR (940 nm) | 20 | 87 | 59.8 | IR (940 nm) partially transmitted |
| Example 2D | Visible | 3 | 17 | 8.7 | Visible signal blocked |
| Example 2D | IR (940 nm) | 105 | 173 | 139.1 | IR (940 nm) signal transmitted | top of segments of a commercially-available microprismatic retroreflective sheeting (3M PRXF2340 Gray Metallized Prismatic Reflective Sheeting) Conspicuity Marking Film. Images of the retroreflective arrays were taken in the visible range and at two (850 and 940 nm) infrared wavelengths. The relative retroreflective intensity was measured using image processing on digital retroreflective images of arrangements of Examples 3A through 3C. Table 2 illustrates the visible and near-infrared retroreflective intensity. The examples provide essentially no intensity in the visible regime and demonstrate a wide intensity range with wavelength sensitivity in the near-IR.

TABLE 2

Retroreflective intensity for visible and IR wavelengths

| | Wavelength range | Minimum Retroreflective Pixel Intensity | Maximum Retroreflective Pixel Intensity | Mean Retroreflective Pixel Intensity | Comment |
|---|---|---|---|---|---|
| Example 3A | Visible | 3 | 15 | 8.5 | Visible signal blocked |
| Example 3A | IR (850 nm) | 13 | 60 | 21.6 | IR (850 nm) signal blocked |
| Example 3A | IR (940 nm) | 99 | 165 | 135.4 | IR (940 nm) signal transmitted |
| Example 3B | Visible | 3 | 19 | 9.6 | Visible signal blocked |
| Example 3B | IR (850 nm) | 79 | 138 | 108.9 | IR (850 nm) partially transmitted |
| Example 3B | IR (940 nm) | 103 | 159 | 132.5 | IR (940 nm) transmitted |
| Example 3C | Visible | 1 | 14 | 7.2 | Visible signal blocked |
| Example 3C | IR (850 nm) | 5 | 10 | 6.1 | IR (850 nm) blocked |
| Example 3C | IR (940 nm) | 25 | 56 | 36.2 | IR (940 nm) partially transmitted |

Comparative Example 3

An overlayer comprising a PET film was also included in the testing. Arrays of retroreflective elements were prepared by using the PET film as an overlay film on top of segments of a commercially-available microprismatic retroreflective sheeting (3M PRXF2340 Gray Metallized Prismatic Reflective Sheeting) Conspicuity Marking Film. For all of the samples in the array, the retroreflective intensity showed essentially no variation from element to element. The retroreflected pixel intensity was constant, approximately 192 in the visible range, 181 at 850 nm and 185 at 940 nm.

In the following examples, the techniques, systems, and optical codes described with respect to FIGS. 1-18 may be implemented using any of the computing devices and/or articles of PPE as described in the examples of FIGS. 19-22.

Figure 19:
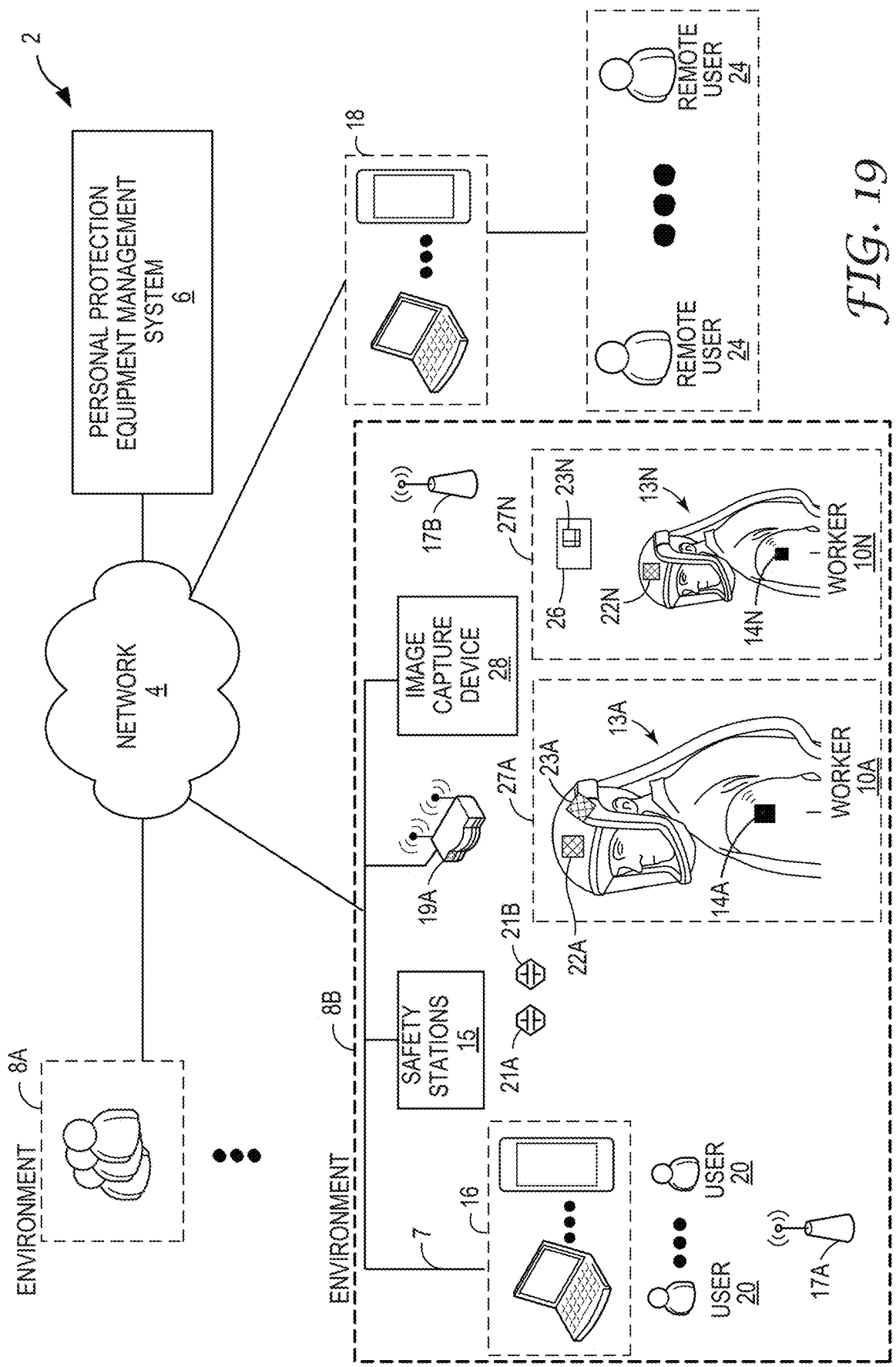
FIG. 19 is a block diagram illustrating an example computing system that includes a personal protective equipment management system (PPEMS) for managing personal protective equipment, according to techniques described in this disclosure.

FIG. 19 is a block diagram illustrating an example computing system 2 that includes a personal protective equipment management system (PPEMS) 6 for managing personal protective equipment, according to techniques described in this disclosure. In general, PPEMS 6 may provide data acquisition, monitoring, activity logging, reporting, predictive analytics, safety condition identification, and alert generation. For example, PPEMS 6 includes an underlying analytics and safety condition identification engine and alerting system in accordance with various examples described herein. In general, a safety event may refer to activities of a user of personal protective equipment (PPE), a safety condition of the PPE, or a hazardous environmental condition. For example, in the context of hearing, vision, or head protection equipment, a safety condition may be such protection equipment being in a standby configuration. In the context of hazardous equipment, a safety condition may be proximity of a worker to the hazardous equipment.

As further described below, PPEMS 6 may provide an integrated suite of personal safety protective equipment management tools and implements various techniques of this disclosure. That is, PPEMS 6 may provide an integrated, end-to-end system for managing personal protective equipment, e.g., safety equipment, used by workers 8 within one or more physical environments 10, which may be construction sites, mining or manufacturing sites or any physical environment. The techniques of this disclosure may be realized within various parts of computing environment 2.

As shown in the example of FIG. 19, system 2 represents a computing environment in which computing device(s) within a plurality of physical environments 8A, 8B (collectively, environments 8) electronically communicate with PPEMS 6 via one or more computer networks 4. Each of physical environments 8 represents a physical environment, such as a work environment, in which one or more individuals, such as workers 10, utilize personal protective equipment 13 while engaging in tasks or activities within the respective environment.

In this example, environment 8A is shown as generally as having workers 10, while environment 8B is shown in expanded form to provide a more detailed example. In the example of FIG. 19, a plurality of workers 10A-10N are shown as utilizing PPE 13A-13N. Although PPE 13 in the example of FIG. 19 are illustrated as respirators, the techniques described herein apply to other types of PPE, such as those for hearing protection, vision protection, and head protection, as well as protective clothing, trauma protection, other PPE for assisted/protective respiration, and so forth.

PPE 13 may include a number of components for which the physical spatial relationship between the components determines or otherwise indicates the operational status of the PPE for some types of PPE. For example, a face shield attached to a helmet or hardhat may be in an up or open (i.e., standby) position that provides no protection to the worker 10 or in a down or closed (i.e., active) position that provides protection to the worker 10. As another example, earmuffs attached to a helmet or hardhat may be positioned in an up (i.e., standby) position such that the earmuffs are not positioned over the worker 10 ears and provide no hearing protection to the worker 10, or the earmuffs may be positioned in a down position (i.e., active) such that the earmuffs are positioned over the worker 10 ears and provide hearing protection to the worker 10. A pair of components of PPE, such as those described above, may be referred to herein as an equipment pair, even if such components are typically used together as a single article of PPE. The operational status of a pair of PPE may be indicative of a safety condition.

A spatial relation between two or more PPE 13, for some types of PPE, may indicate the operational status of one or more of the PPE. For instance, a hardhat may be positioned on a worker's head in an active position according to a first orientation. Earmuffs may be positioned to enclose the worker's ears in an active position or positioned to not enclose the worker's ears in a standby position, according to a second orientation (typically vertical for over-the-head earmuffs). The difference between the first orientation of the helmet in the active position and the second orientation of the earmuffs may indicate whether the earmuffs are in an active position. The operational status of a pair of PPE may be indicative of a safety condition.

A spatial relation between an article, machine, signage or other items of a work environment 8 and a PPE for a worker 10 may indicate the operational status of the PPE. For example, a machine of environment 8A, when activated, may create various proximity hazards. The distance between a PPE positioned on the worker 10 and the machine indicates whether the worker is within a threshold distance for the proximity hazard, and the distance is thus indicative of a safety condition.

Each of PPE 13 may in some examples include embedded sensors or monitoring devices and processing electronics configured to capture data in real-time as a user (e.g., worker) engages in activities while wearing the respirators. PPE 13 may include a number of sensors for sensing or controlling the operation of such components. A head top may include, as examples, a head top visor position sensor, a head top temperature sensor, a head top motion sensor, a head top impact detection sensor, a head top position sensor, a head top battery level sensor, a head-top head detection sensor, an ambient noise sensor, or the like. A blower may include, as examples, a blower state sensor, a blower pressure sensor, a blower run time sensor, a blower temperature sensor, a blower battery sensor, a blower motion sensor, a blower impact detection sensor, a blower position sensor, or the like. A filter may include, as examples, a filter presence sensor, a filter type sensor, or the like. Each of the above-noted sensors may generate usage data, as described herein.

In addition, each of PPE 13 may include one or more output devices for outputting data that is indicative of operation of PPE 13 and/or generating and outputting communications to the respective worker 10. For example, PPE 13 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

In general, each of environments 8 include computing facilities (e.g., a local area network) by which PPE 13 are able to communicate with PPEMS 6. For examples, environments 8 may be configured with wireless technology, such as 802.11 wireless networks, 802.15 ZigBee networks, and the like. In the example of FIG. 19, environment 8B includes a local network 7 that provides a packet-based transport medium for communicating with PPEMS 6 via network 4. Environment 8B may include wireless access point 19 to provide support for wireless communications. In some examples, environment 8B may include a plurality of wireless access points 19 that may be geographically distributed throughout the environment to provide support for wireless communications throughout the work environment.

Each of PPE 13 may be configured to communicate data, such as sensed motions, events and conditions, via wireless communications, such as via 802.11 WiFi protocols, Bluetooth protocol or the like. PPE 13 may, for example, communicate directly with a wireless access point 19. As another example, each worker 10 may be equipped with a respective one of wearable communication hubs 14A-14N that enable and facilitate communication between PPE 13 and PPEMS 6. For example, PPE 13 for the respective workers 10 may communicate with a respective communication hub 14 via Bluetooth or other short-range protocol, and the communication hubs may communicate with PPEMS 6 via wireless communications processed by wireless access point 19. Although shown as wearable devices, hubs 14 may be implemented as stand-alone devices deployed within environment 8B. In some examples communication hubs 14 may be articles of PPE.

In general, each of hubs 14 operates as a wireless device for PPE 13 relaying communications to and from PPE 13, and may be capable of buffering usage data in case communication is lost with PPEMS 6. Moreover, each of hubs 14 is programmable via PPEMS 6 so that local alert rules may be installed and executed without requiring a connection to the cloud. As such, each of hubs 14 provides a relay of streams of usage data from PPE 13 and/or other PPEs within the respective environment, and provides a local computing environment for localized alerting based on streams of events in the event communication with PPEMS 6 is lost.

As shown in the example of FIG. 19, an environment, such as environment 8B, may also contain one or more wireless-enabled beacons, such as beacons 17A-17B, that provide accurate location information within the work environment. For example, beacons 17A-17B may be GPS-enabled such that a controller within the respective beacon may be able to precisely determine the position of the respective beacon. Based on wireless communications with one or more of beacons 17, a given PPE 13 or communication hub 14 worn by a worker 10 is configured to determine the location of the worker within work environment 8B. In this way, event data reported to PPEMS 6 may be stamped with positional information to aid analysis, reporting and analytics performed by the PPEMS.

In addition, an environment, such as environment 8B, may also include one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of environment 8B or otherwise interact with beacons 17 to determine respective positions and include such positional information when reporting environmental data to PPEMS 6. As such, PPEMS 6 may be configured to correlate the sensed environmental conditions with the particular regions and, therefore, may utilize the captured environmental data when processing event data received from PPE 13. For example, PPEMS 6 may utilize the environmental data to aid generating alerts or other instructions for PPE 13 and for performing predictive analytics, such as determining any correlations between certain environmental conditions (e.g., heat, humidity, visibility) with abnormal worker behavior or increased safety events. As such, PPEMS 6 may utilize current environmental conditions to aid prediction and avoidance of imminent safety events. Example environmental conditions that may be sensed by sensing stations 21 include but are not limited to temperature, humidity, presence of gas, pressure, visibility, wind and the like.

In example implementations, an environment, such as environment 8B, may also include one or more safety stations 15 distributed throughout the environment to provide viewing stations for accessing PPE 13. Safety stations 15 may allow one of workers 10 to check out PPE 13 and/or other safety equipment, verify that safety equipment is appropriate for a particular one of environments 8, and/or exchange data. For example, safety stations 15 may transmit alert rules, software updates, or firmware updates to PPE 13 or other equipment. Safety stations 15 may also receive data cached on PPE 13, hubs 14, and/or other safety equipment. That is, while PPE 13 (and/or data hubs 14) may typically transmit usage data from sensors of PPE 13 via network 4 in real time or near real time, PPE 13 (and/or data hubs 14) may not have connectivity to network 4 in some instances, situations, or conditions. In such cases, PPE 13 (and/or data hubs 14) may store usage data locally and transmit the usage data to safety stations 15 upon being in proximity with safety stations 15. Safety stations 15 may then obtain the data from sensors of PPE 13 and connect to network 4 to transmit the usage data.

In addition, each of environments 8 may include computing facilities that provide an operating environment for end-user computing devices 16 for interacting with PPEMS 6 via network 4. For example, each of environments 8 typically includes one or more safety managers responsible for overseeing safety compliance within the environment. In general, each user 20 interacts with computing devices 16 to access PPEMS 6. Each of environments 8 may include systems. Similarly, remote users may use computing devices 18 to interact with PPEMS via network 4. For purposes of example, the end-user computing devices 16 may be laptops, desktop computers, mobile devices such as tablets or so-called smart phones and the like.

Users 20, 24 interact with PPEMS 6 to control and actively manage many aspects of safely equipment utilized by workers 10, such as accessing and viewing usage records, analytics and reporting. For example, users 20, 24 may review usage information acquired and stored by PPEMS 6, where the usage information may include data specifying starting and ending times over a time duration (e.g., a day, a week, etc.), data collected during particular events, such as lifts of a PPE 13 visor, removal of PPE 13 from a worker 10, changes to operating parameters of PPE 13, status changes to components of PPE 13 (e.g., a low battery event), motion of workers 10, detected impacts to PPE 13 or hubs 14, sensed data acquired from the user, environment data, and the like. In addition, users 20, 24 may interact with PPEMS 6 to perform asset tracking and to schedule maintenance events for individual pieces of safety equipment, e.g., PPE 13, to ensure compliance with any procedures or regulations. PPEMS 6 may allow users 20, 24 to create and complete digital checklists with respect to the maintenance procedures and to synchronize any results of the procedures from computing devices 16, 18 to PPEMS 6.

Further, PPEMS 6 may integrate an event processing platform configured to process thousand or even millions of concurrent streams of events from digitally enabled PPEs, such as PPE 13. An underlying analytics engine of PPEMS 6 may apply historical data and models to the inbound streams to compute assertions, such as identified anomalies or predicted occurrences of safety events based on conditions or behavior patterns of workers 10. Further, PPEMS 6 may provide real-time alerting and reporting to notify workers 10 and/or users 20, 24 of any predicted events, anomalies, trends, and the like.

The analytics engine of PPEMS 6 may, in some examples, apply analytics to identify relationships or correlations between sensed worker data, environmental conditions, geographic regions and other factors and analyze the impact on safety events. PPEMS 6 may determine, based on the data acquired across populations of workers 10, which particular activities, possibly within certain geographic region, lead to, or are predicted to lead to, unusually high occurrences of safety events.

In this way, PPEMS 6 tightly integrates comprehensive tools for managing personal protective equipment with an underlying analytics engine and communication system to provide data acquisition, monitoring, activity logging, reporting, behavior analytics and alert generation. Moreover, PPEMS 6 provides a communication system for operation and utilization by and between the various elements of system 2. Users 20, 24 may access PPEMS to view results on any analytics performed by PPEMS 6 on data acquired from workers 10. In some examples, PPEMS 6 may present a web-based interface via a web server (e.g., an HTTP server) or client-side applications may be deployed for devices of computing devices 16, 18 used by users 20, 24, such as desktop computers, laptop computers, mobile devices such as smartphones and tablets, or the like.

In some examples, PPEMS 6 may provide a database query engine for directly querying PPEMS 6 to view acquired safety information, compliance information and any results of the analytic engine, e.g., by the way of dashboards, alert notifications, reports and the like. That is, users 20, 24 or software executing on computing devices 16, 18, may submit queries to PPEMS 6 and receive data corresponding to the queries for presentation in the form of one or more reports or dashboards. Such dashboards may provide various insights regarding system 2, such as baseline ("normal") operation across worker populations, identifications of any anomalous workers engaging in abnormal activities that may potentially expose the worker to risks, identifications of any geographic regions within environments 8 for which unusually anomalous (e.g., high) safety events have been or are predicted to occur, identifications of any of environments 8 exhibiting anomalous occurrences of safety events relative to other environments, and the like.

As illustrated in detail below, PPEMS 6 may simplify workflows for individuals charged with monitoring and ensure safety compliance for an entity or environment. That is, PPEMS 6 may enable active safety management and allow an organization to take preventative or correction actions with respect to certain regions within environments 8, particular pieces of safety equipment or individual workers 10, define and may further allow the entity to implement workflow procedures that are data-driven by an underlying analytical engine.

As one example, the underlying analytical engine of PPEMS 6 may be configured to compute and present customer-defined metrics for worker populations within a given environment 8 or across multiple environments for an organization as a whole. For example, PPEMS 6 may be configured to acquire data and provide aggregated performance metrics and predicted behavior analytics across a worker population (e.g., across workers 10 of either or both of environments 8A, 8B). Furthermore, users 20, 24 may set benchmarks for occurrence of any safety incidences, and PPEMS 6 may track actual performance metrics relative to the benchmarks for individuals or defined worker populations.

As another example, PPEMS 6 may further trigger an alert if certain combinations of conditions are present, e.g., to accelerate examination or service of a safety equipment, such as one of PPE 13. In this manner, PPEMS 6 may identify individual PPE 13 or workers 10 for which the metrics do not meet the benchmarks and prompt the users to intervene and/or perform procedures to improve the metrics relative to the benchmarks, thereby ensuring compliance and actively managing safety for workers 10.

Item 26 located in environment 8B may be a machine, wall, signage, safety device, station, or other item. Item 26 may be stationary, at least during worker operation within the environment 8B.

In accordance with techniques described herein, PPE 13 are embodied with at least one optical pattern visible on a surface of the PPE 13. In some examples, optical patterns may be patterns of retroreflective elements as described in this disclosure. In the example of FIG. 19, PPE 13A worn by worker 10A has embodied therein an optical pattern 22A and an optical pattern 23A. Optical pattern 22A and the optical pattern 23A may be associated with one another ("paired") in PPEMS 6. PPE 13N worn by worker 10N has embodied thereon an optical pattern 22N. An item 26 located in environment 8B has embodied therein an optical pattern 23N. Optical pattern 22N and the optical pattern 23N are associated with one another in PPEMS 6.

Each of optical patterns 22, 23 may be a machine-readable code. The machine-readable code may be a unique identifier within the scope of PPE managed by PPEMS 6. In some cases, pairs of optical patterns 22, 23 may have the same optical pattern and the machine-readable code to indicate that optical patterns should be paired by PPEMS 6. PPEMS 6 may use the machine-readable code to uniquely identify the corresponding PPE 13, component thereof, or item 26 on which the optical pattern is embodied. An optical pattern can be embodied on different types of PPE 13, such as protective eyewear, helmets, face shields, ear muffs, fall protection harness, coveralls, or respirators.

Optical patterns 22, 23 are embodied on a surface of a PPE 13 to be visible such that image capture device 28 may obtain images of the optical patterns 22, 23 when workers 10 are working in the environments 8. In other examples, a light capture device may be used that captures light retroreflected from a retroreflective element and generates a value associated with the captured light. Examples of light capture devices may include image capture device 28, a spectrometer, or a spectroscope to name only a few examples. A light capture device may be any suitable device that captures light and generates a corresponding value based on one or more properties of the light. In some examples, each of optical patterns 22, 23 may be embodied on a label or tag affixed to the corresponding PPE 13 or item 26 using an adhesive, clip, or other fastening means to be substantially immobile with respect to the PPE 13, item 26, or components thereof to which the optical pattern is affixed while workers 10 are working in environments 10. In such examples, optical patterns 22, 23 may be referred to as "optical tags" or "optical labels." Some examples of optical tags are approximately 4 cm×4 cm in dimension. Optical tags may be affixed to a variety of types of PPEs 13.

An optical tag having an optical pattern embodied thereon may be a retroreflective tag with a machine-readable code. The machine-readable code may be printed with infrared absorbing ink to enable an infrared camera to obtain images that can be readily processed to identify the machine-readable code. The optical tag may include an adhesive layer and a retroreflective sheeting layer printed with the machine-readable code. In some instances, the optical tag includes an additional mirror film layer that is laminated over the machine-readable code. The mirror film is infrared transparent such that the machine-readable code is not visible in ambient light but readily detectable within images obtained by an infrared camera (e.g., with some instances of image capture device 28). The machine-readable code may be a unique identifier within the scope of PPE managed by PPEMS 6. PPEMS 6 may use the machine-readable code to uniquely identify the optical tag 22, 23 and the corresponding PPE 13, component thereof, or item 26 to which the optical tag 22, 23 is affixed. An optical tag can be adhered to different types of PPE 13, such as protective eyewear, helmets, face shields, ear muffs, fall protection harness, coveralls, or respirators.

In some examples, a PPE 13, component thereof, or item 26 is manufactured with an optical pattern 22, 23 embodied thereon. In some examples, an optical pattern 22, 23 may be printed, stamped, engraved, or otherwise embodied directly on a surface of the PPE 13, component thereof, or item 26. In some examples, a mix of types of embodiments of the optical patterns may be present in the environments. For example, optical pattern 23N may be printed on item 26, while optical pattern 22N is printed on a tag affixed to PPE 13N. Optical patterns 22A, 23A may both be printed on tags affixed to components of PPE 13A.

Each of optical patterns 22, 23 has a relative orientation with respect to its corresponding PPE 13, component of PPE 13, or item 26. In the illustrated example, optical pattern 22A has a relative orientation with respect to a helmet/hardhat of PPE 13A, optical pattern 23A has a relative orientation with respect to a visor of PPE 13A, optical pattern 22N has a relative orientation with respect to a helmet/hardhat of PPE 13N, and optical pattern 23N has a relative orientation with respect to item 26. Each pair of optical patterns 22, 23 has a relative orientation to one another and, by extension, this relative orientation is indicative of the relative orientation of the pair of PPE 13, components, or items to which the respective patterns from the pair of optical patterns 22, 23 are affixed. Each of optical patterns 22, 23 may visually indicate an orientation of the optical pattern. For example, an optical pattern may be such that a top or other side of the optical pattern may be readily visually identifiable regardless of the orientation in which the optical pattern is positioned. In this way, PPEMS 6 may determine from an image of an optical pattern an orientation of the optical pattern with respect to a coordinate system, e.g., a local coordinate system defined at least in part by an orientation of image capture device 28, or a global coordinate system. Further, PPEMS 6 may determine from an image of a first optical pattern and a second optical pattern a difference in between the orientations of the first optical pattern and the second optical pattern, which is the relative orientation between the first optical pattern and the second optical pattern.

In the illustrated example, for instance, the relative orientation of optical patterns 22A, 23A indicates the relative orientation of the helmet/hardhat of PPE 13A (to which optical pattern 22A is affixed) and the visor of PPE 13A (to which optical pattern 23A is affixed). The relative orientation of optical patterns 22N, 23N indicates the relative orientation of PPE 13N and item 26.

If an orientation of any of PPE 13, components thereof, or item 26 changes, the relative orientation of the corresponding pair of optical patterns 22, 23 changes. For example, a visor for PPE 13A raised in standby position results in a relative orientation for the pair of optical patterns 22A, 23A that is different than when the visor for PPE 13A is down in active position. Accordingly, the relative orientation of optical patterns 22A, 23A indicates whether the visor is in active or standby position.

Each pair of optical patterns 22, 23 also has a positional relation to one another. For example, each optical pattern for pair of optical patterns 22, 23 is positioned at any given time at a location in an environment 8. The positional relation defines a distance between the pair of optical patterns 22, 23. If a position of any of PPE 13, components thereof, or item 26 changes, the position relation of the corresponding pair of optical patterns 22, 23 changes. For example, if worker 10N wearing PPE 13N moves, the positional relation between pair of optical patterns 22N, 23N changes. The pair of optical patterns 22N, 23N may become closer or farther apart, for instance.

The relative orientation and positional relation between a pair of optical patterns 22, 23 are aspects of an overall spatial relation between the pair of optical patterns 22, 23. As explained above, the spatial relation between the pair of optical patterns 22, 23 indicates the spatial relation between the corresponding PPE 13, components thereof, or item on which the pair of optical patterns 22, 23 are embodied.

Image capture device 28 obtains and stores, at least temporarily, images 27A-27N of environment 8B. PPEMS 6 obtains images 27 from image capture device 28, e.g., via network 4, in near real-time for near real-time processing. Image capture device 28 may obtain multiple images 27A at a frequency at a position and orientation of image capture device 28. For instance, image capture device 28 may obtain an instance of image 27A once every second.

Image capture device 28 may be an optical camera, video camera, infrared or other non-human-visible spectrum camera, or a combination thereof. Image capture device 28 may be stationary or mobile with respect to environment 8B. For example, image capture device 28 may be a head-top camera worn by a worker or supervisor. An orientation of image capture device 28 may be fixed or moveable along one or more degrees of freedom. Image capture device 28 includes a wired or wireless communication link with PPEMS 6. For instance, image capture device 28 may transmit images 27 to PPEMS 6 or to a storage system (not shown in FIG. 19) via network 6. Alternatively, PPEMS 6 may read images 27 from a storage device for image capture device 28, or from the storage system (again, not shown in FIG. 19). Although only a single image capture device 28 is depicted, environment 8B may include multiple image capture devices 28 positioned about the environment 8B and oriented in different orientation in order to capture images of environment 8B from different positions and orientations, which results images that provide a more comprehensive view of the environment. As described herein, images generated by an image capture device 28 may refer to images generated by multiple image capture devices 28. The multiple image capture devices 28 may have known spatial inter-relations among them to permit determination of spatial relations between optical tags in respective images generated by respective image capture devices 28.

Images 27 may be optical images or infrared or other non-human-visible spectrum images. Images 27 include images of optical patterns 22, 23.

PPEMS 6 processes images 27 to identify optical patterns 22, 23. PPEMS 6 may process images 27 to identify the machine-readable codes of the optical patterns 22, 23. PPEMS 6 may process images 27 to determine a spatial relation between pairs of optical patterns 22, 23. To determine the spatial relation between pairs of optical patterns 22, 23, PPEMS 6 may determine, from one or more of the images, a position of each optical pattern and/or an orientation of each optical pattern with respect to a coordinate system. PPEMS 6 may also or alternative determine, from an image, a relative position of the pair of optical patterns 22, 23 and/or a relative orientation of the pair of optical patterns 22, 23.

For example, PPEMS 6 may process image 27A to determine the spatial relation between optical patterns 22A, 23A to identify a corresponding safety condition. The spatial relation, more particularly the relative orientation, may indicate that a visor of PPE 13A is in a closed, active position (as illustrated). Alternatively, the spatial relation may indicate that the visor is in an open, standby position such there exists a safety condition and, more specifically, a visor event.

As another example, PPEMS 6 may process image 27N to determine the spatial relation between optical patterns 22N, 23N to identify a corresponding safety condition. The spatial relation may indicate that PPE 13N (and by extension worker 10N) is a distance from item 26, e.g., 3 meters. The spatial relation may indicate the PPE 13N has a relative orientation to item 26, e.g., 90 degrees. The relative orientation between optical patterns 22N, 23N may indicate that worker 10N is prone and has experienced a fall, a trauma, and/or has swooned such that the worker 10N has had a worker-down event. The relative orientation may alternatively indicate that a helmet/hardhat PPE 13N is not positioned on the head of worker 10N, which may be a safety condition.

As another example, PPEMS 6 may process an image 27 to determine a spatial relation between a pair of optical patterns 22, 23 embodied on components of a hearing protection apparatus-type PPE 13 to identify a corresponding safety condition. The relative orientation of the pair of optical patterns may indicate that the ear muffs are positioned in a standby position, i.e., not positioned over the ears of a worker in environment 8 and thus incapable of attenuating sound for the worker wearing the PPE 13, indicative of a safety condition and, more specifically, a hearing protection event.

As another example, PPEMS 6 may process an image 27 to determine a spatial relation between a pair of optical patterns 22, 23 embodied on components of a respirator or other breathing protection apparatus-type PPE 13 to identify a corresponding safety condition. The relative orientation of the pair of optical patterns may indicate that the respirator is positioned in a standby position, i.e., not positioned over the nose of a worker in environment 8 and thus incapable of providing safe breathable air for the worker wearing the PPE 13, indicative of a safety condition and, more specifically, a respirator protection event.

Other examples involving other types of PPE 13 are contemplated.

In some examples, PPEMS 6 may use a spatial relation between one pair of optical patterns 22, 23 for a PPE 13 and a spatial relation between another pair of optical patterns 22, 23 to determine whether a safety condition exists for a worker. For example, PPEMS 6 may process images 27A, 27N (or a single image 27 having images of optical patterns 22A, 23A, and 23N) to determine a spatial relation between optical pattern 22A and 23N. The spatial relation may indicate that worker 10A wearing PPE 13A is positioned within a threshold distance for a proximity hazard associated with item 26. For instance, item 26 may be a welding station and workers within the threshold distance may experience eye damage if not protected by appropriate PPE. If PPE 13A is a welding mask, PPEMS 6 may process images of optical patterns 22A, 23A to determine (1) from a machine-readable code of one of optical patterns 22A, 23A that PPE 13A is a welding mask, and (2) a spatial relation between optical patterns 22A, 23A. If the spatial relation indicates the welding mask in an open, standby position, this may indicate a safety condition and PPEMS 6 may output a visor event or perform another operation in response to the safety condition.

Other spatial relation combinations of optical patterns 22, 23 are contemplated, such as proximity hazards associated with force-induced trauma, lacerations, heat, noxious gases, falls, noise, and so forth, and the corresponding types of PPEs 13 intended to mitigate the dangers from such hazards.

In response to identifying the presence or absence of a safety condition, PPEMS 6 may output an event to notify a worker 10 or supervisor, shutdown a machine, or perform another operation. By identifying safety conditions using optical patterns in captured images 27 of PPEs 13, the techniques may be more versatile and widely applicable than using devices tied to the PPEs 13, such as sensors, locks, barriers, or other devices for indicating or ensuring an operational status of the PPE 13 (e.g., open vs. closed) or for indicating an unsafe spatial relationship between a PPE 13 and another apparatus. As another example, workers 10 may be less able to defeat the safety techniques described herein. As a still further example, the PPEMS 6 applying techniques described herein may be able to determine a safety condition for a PPE 13 without requiring a communication session or channel with the PPE 13, unlike other systems that may rely on receiving a communication signal from a PPE 13 indicating an operational status of the PPE 13. This may reduce a cost and/or improve a reliability of system 2 over other systems that rely on explicit communication. Furthermore, in some instances, the PPEMS 6 may be able to process a captured image that includes images of multiple PPEs 13 and respective optical patterns, which allows the PPEMS 6 to concurrently process and identify potential safety for the multiple PPEs 13 without having to process communication signals from each of the PPEs 13.

As shown in FIG. 19, an article of personal protective equipment (PPE) (e.g., 13A) may include a plurality of retroreflective elements embodied on a surface of the article of PPE in a spatially defined arrangement, each retroreflective element of the plurality of retroreflective elements having at least two different retroreflective properties. A computing device (e.g., PPEMS 6, hub 14A, and/or devices 16) may be communicatively coupled to at least one image capture device 27A, wherein the computing device is configured to: receive, from the at least one image capture device, retroreflected light that indicates at least two different retroreflective properties of at least one retroreflective element of the plurality of retroreflective elements. The computing device may determine, based at least in part on each of the at least two different retroreflective properties, a safety event. In some examples, the computing device may perform at least one operation based at least in part on the safety event.

In some examples, the computing device is configured to store a set of associations between pre-defined properties and values, wherein each respective pre-defined property of the set of pre-defined properties corresponds to at least one respective value of the values. The computing device may determine one or more of the values based on the at least two different retroreflective properties of the at least one retroreflective element. In some examples, the one or more values are at least one of a binary value, decimal value, hexadecimal value, or alphanumeric value.

In some examples, to determine, based at least in part on each of the at least two different retroreflective properties, the safety event, the computing device is configured to: determine that at least one of the at least two different retroreflective properties indicates a type of personal protective equipment; determine that the type of the article of PPE is incorrect for at least one characteristic of the article of PPE; and generate an indication based at least in part on the type of the article of PPE being incorrect for the at least one characteristic of the article of PPE. In some examples, the at least one characteristic is at least one of a fit test or an environment of a worker assigned to the article of PPE. In some examples, the computing device may perform a compliance check based on one or more retroreflective properties of one or more retroreflectors that are associated with one or more of a person (e.g., worker), environment, hazard, article of PPE, and/or event.

In some examples, to determine, based at least in part on each of the at least two different retroreflective properties, the safety event, the computing device is configured to: determine that at least one of the at least two different retroreflective properties indicates a presence of a type of first object. The computing device may determine that a distance between the first object and a second object is less than a threshold distance. In some examples, the computing device generates an indication that the distance is less than a threshold distance. In some examples, a type of the first object is a living being and the second object is a vehicle. In some examples, the computing device may send a message, based at least in part on the indication, to the vehicle that causes a change in an operation of the vehicle. In some examples, the computing device may send a message, based at least in part on the indication, to the vehicle that causes a change in an operation of the vehicle. In some examples, a pattern on a retroreflector may be a distance-modulated pattern, such that the retroreflective properties and/or appearance of the pattern appear different to an image capture device based at least in part on different distances between the image capture device and the retroreflector. In some examples, a computing device may configure rules that determine a speed and/or distance of at least one object based on resolution of a pattern of a retroreflector at different distances. In some examples, a retroreflector may be placed in a location of a hazard or other object to indicate the presence of the hazard or object, and in some examples, one or more business rules may be associated with values that correspond to retroreflective properties of the retroreflector.

In some examples, the computing device is configured to determine, based at least in part on at least one of the at least two different retroreflective properties of the at least one retroreflective element of the plurality of retroreflective elements, an orientation of a worker assigned to the article of PPE. In some examples, the orientation of the worker may be used by a computing device to determine ergonomic information about the worker, where the ergonomic information may be further processed to perform one or more operations. In some examples, retroreflective properties may be used to indicate location information about an object, such as a worker, article of PPE, environment, or any other object. In some examples, the computing device is configured to determine, based at least in part on at least one of the at least two different retroreflective properties of the at least one retroreflective element of the plurality of retroreflective elements, whether a worker assigned to the article of PPE is in the presence of a particular hazard. In some examples, a worker is in the presence of a particular hazard, if the worker is within a threshold distance of the hazard. In some examples, the computing device is configured to determine, based at least in part on at least one of the at least two different retroreflective properties of the at least one retroreflective element of the plurality of retroreflective elements, whether a worker assigned to the article of PPE is located in a particular environment.

In some examples, a safety event comprises at least one of: a worker-down event, wherein a worker has fallen; a visor event, wherein a visor position of a respirator or welding mask does not shield a face of a worker wearing the article of PPE; a respirator protection event, wherein a respirator is not worn over the nose of a worker wearing the article of PPE; or a hearing protection event, wherein hearing protection is not positioned to attenuate sound for the worker wearing the article of PPE. In some examples, to perform at least one operation based at least in part on the safety event, the computing device is configured to at least: generate a notification; send a message; or store an indication of the of the safety event.

Figure 20:
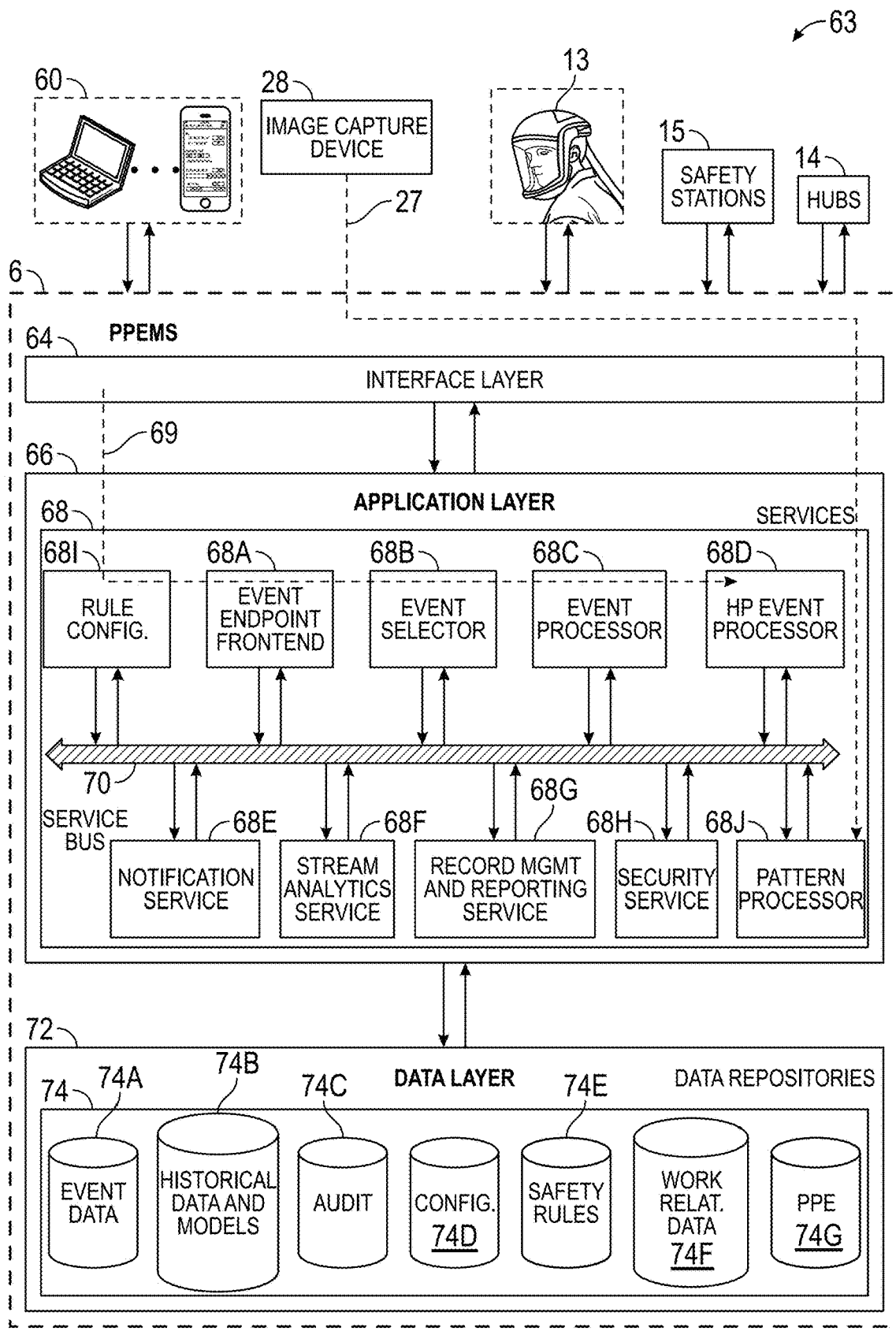
FIG. 20 is a block diagram providing an operating perspective of a PPEMS when hosted as cloud-based platform capable of supporting multiple, distinct work environments having an overall population of workers that have a variety of communication enabled personal protective equipment (PPE), in accordance with techniques described herein.

FIG. 20 is a block diagram providing an operating perspective of PPEMS 6 when hosted as cloud-based platform capable of supporting multiple, distinct work environments 8 having an overall population of workers 10 that have a variety of communication enabled personal protective equipment (PPE) 13, in accordance with techniques described herein. In the example of FIG. 20, the components of PPEMS 6 are arranged according to multiple logical layers that implement the techniques of the disclosure. Each layer may be implemented by one or more modules comprised of hardware, software, or a combination of hardware and software.

In FIG. 20, personal protective equipment (PPEs) 13 and/or other equipment, either directly or by way of HUBs 14, safety stations 15, as well as computing devices 60, operate as clients 63 that communicate with PPEMS 6 via interface layer 64. Computing devices 60 typically execute client software applications, such as desktop applications, mobile applications, and web applications. Computing devices 60 may represent any of computing devices 16, 18 of FIG. 1. Examples of computing devices 60 may include, but are not limited to a portable or mobile computing device (e.g., smartphone, wearable computing device, tablet), laptop computers, desktop computers, smart television platforms, and servers, to name only a few examples.

Some types or instances of PPEs 13 may communicate with PPEMS 6 (directly or via hubs 14) to provide streams of data acquired from embedded sensors and other monitoring circuitry and receive from PPEMS 6 alerts, configuration and other communications. However, a PPE 13 need not be able to communicate with PPEMS 6 to have one or more optical patterns embodied thereon and usable by PPEMS 6 to identify a safety condition associated with the PPE.

Client applications executing on computing devices 60 may communicate with PPEMS 6 to send and receive information that is retrieved, stored, generated, and/or otherwise processed by services 68. For instance, the client applications may request and edit safety event information including analytical data stored at and/or managed by PPEMS 6. In some examples, client applications may request and display aggregate safety event information that summarizes or otherwise aggregates numerous individual instances of safety events and corresponding data obtained from PPEs 13 and/or generated by PPEMS 6. The client applications may interact with PPEMS 6 to query for analytics information about past and predicted safety events, behavior trends of workers 10, to name only a few examples. In some examples, the client applications may output for display information received from PPEMS 6 to visualize such information for users of clients 63. As further illustrated and described in below, PPEMS 6 may provide information to the client applications, which the client applications output for display in user interfaces. Additional information is found in U.S. application Ser. No. 15/109,564, filed Jun. 23, 3026, entitled "Indicating Hazardous Exposure in a Supplied Air Respirator System," which is incorporated herein by reference in its entirety.

Clients applications executing on computing devices 60 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPEMS 6. In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 20, PPEMS 6 includes an interface layer 64 that represents a set of application programming interfaces (API) or protocol interface presented and supported by PPEMS 6. Interface layer 64 initially receives messages from any of clients 63 for further processing at PPEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward information from the requests to services 68, and provide one or more responses, based on information received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of PPEMS 6. In such examples, services 68 may generate JavaScript Object Notation (JSON) messages that interface layer 64 sends back to the client application 61 that submitted the initial request. In some examples, interface layer 64 provides web services using Simple Object Access Protocol (SOAP) to process requests from client applications 61. In still other examples, interface layer 64 may use Remote Procedure Calls (RPC) to process requests from clients 63. Upon receiving a request from a client application to use one or more services 68, interface layer 64 sends the information to application layer 66, which includes services 68.

As shown in FIG. 20, PPEMS 6 also includes an application layer 66 that represents a collection of services for implementing much of the underlying operations of PPEMS 6. Application layer 66 receives information included in requests received from client applications 61 and further processes the information according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate information to one another. As another example, services 68 may communicate in point-to-point fashion using sockets or other communication mechanism. Before describing the functionality of each of services 68, the layers are briefly described herein.

Data layer 72 of PPEMS 6 represents a data repository that provides persistence for information in PPEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage information in data repositories 74. The RDBMS software may manage one or more data repositories 74, which may be accessed using Structured Query Language (SQL). Information in the one or more databases may be stored, retrieved, and modified using the RDBMS software. In some examples, data layer 72 may be implemented using an Object Database Management System (ODBMS), Online Analytical Processing (OLAP) database or other suitable data management system.

As shown in FIG. 20, each of services 68A-68J ("services 68") is implemented in a modular form within PPEMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors.

In some examples, one or more of services 68 may each provide one or more interfaces that are exposed through interface layer 64. Accordingly, client applications of computing devices 60 may call one or more interfaces of one or more of services 68 to perform techniques of this disclosure.

In accordance with techniques of the disclosure, services 68 may include an event processing platform including a pattern service 68J and an event endpoint frontend 68A, event selector 68B, event processor 68C and high priority (HP) event processor 68D.

Pattern service 68J obtains images 27 generated by image capture device 28 and processes images 27 to identify safety conditions and, in some cases, to generate events based on the safety conditions. Pattern service 69J may add generated events to event streams 29 for processing by other services, as described below.

Event endpoint frontend 68A operates as a frontend interface for exchanging communications with hubs 14 and in some cases with one or more of PPEs 13. In other words, event endpoint frontend 68A operates to as a frontline interface to safety equipment deployed within environments 8 and utilized by workers 10. In some instances, event endpoint frontend 68A may be implemented as a plurality of tasks or jobs spawned to receive individual inbound communications of event streams 69 from the PPEs 13 carrying data sensed and captured by the safety equipment. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry data recently captured data representing sensed conditions, motions, temperatures, actions or other data, generally referred to as events. Communications exchanged between the event endpoint frontend 68A and the PPEs 13/hubs 14 may be real-time or pseudo real-time depending on communication delays and continuity.

Event selector 68B operates on the stream of events 69 received from PPEs 13 and/or hubs 14 via frontend 68A and determines, based on rules or classifications, priorities associated with the incoming events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as incorrect usage of PPEs, use of incorrect filters and/or respirators based on geographic locations and conditions, failure to properly secure SRLs 11 and the like. Responsive to processing high priority events, HP event processor 68D may immediately invoke notification service 68E to generate alerts, instructions, warnings or other similar messages to be output to PPEs 13, hubs 14, or devices used by users 20, 24. Events not classified as high priority are consumed and processed by event processor 68C.

In general, event processor 68C or high priority (HP) event processor 68D operate on the incoming streams of events to update event data 74A within data repositories 74. In general, event data 74A may include all or a subset of usage data generated by pattern service 68J or by PPEs 13. For example, in some instances, event data 74A may include entire streams of samples of data obtained from electronic sensors of PPEs 13. In other instances, event data 74A may include a subset of such data, e.g., associated with a particular time period or activity of PPEs 13. Event data 74 generated by pattern service 68J may include a description of a safety condition identified by pattern service. Alternatively, such event data may include a stream of data describing spatial relations between pairs of optical patterns over time for further processing by event processors 68C, 68D, as well as stream analytics service 68F in some cases.

Event processors 68C, 68D may create, read, update, and delete event information stored in event data 74A. Event information for may be stored in a respective database record as a structure that includes name/value pairs of information, such as data tables specified in row/column format. For instance, a name (e.g., column) may be "worker ID" and a value may be an employee identification number. An event record may include information such as, but not limited to: worker identification, PPE identification, acquisition timestamp(s) and data indicative of one or more sensed parameters.

In addition, event selector 68B directs the incoming stream of events to stream analytics service 68F, which is configured to perform in depth processing of the incoming stream of events to perform real-time analytics. Stream analytics service 68F may, for example, be configured to process and compare multiple streams of event data 74A with historical data and models 74B in real-time as event data 74A is received. In this way, stream analytic service 68D may be configured to detect anomalies, transform incoming event data values, trigger alerts upon detecting safety concerns based on conditions or worker behaviors. Historical data and models 74B may include, for example, specified safety rules, business rules and the like. In addition, stream analytic service 68D may generate output for communicating to PPEs 13 by notification service 68F or computing devices 60 by way of record management and reporting service 68D.

In this way, analytics service 68F may process inbound streams of events, potentially hundreds or thousands of streams of events to apply historical data and models 74B to compute assertions, such as identified anomalies or predicted occurrences of imminent safety events based on conditions or behavior patterns of the workers. Analytics service may 68D publish the assertions to notification service 68F and/or record management by service bus 70 for output to any of clients 63.

In this way, analytics service 68F may be configured as an active safety management system that predicts imminent safety concerns and provides real-time alerting and reporting. In addition, analytics service 68F may be a decision support system that provides techniques for processing inbound streams of event data to generate assertions in the form of statistics, conclusions, and/or recommendations on an aggregate or individualized worker and/or PPE basis for enterprises, safety officers and other remote users. For instance, analytics service 68F may apply historical data and models 74B to determine, for a particular worker, the likelihood that a safety event is imminent for the worker based on detected behavior or activity patterns, environmental conditions and geographic locations. In some examples, analytics service 68F may determine whether a worker is currently impaired, e.g., due to exhaustion, sickness or alcohol/drug use, and may require intervention to prevent safety events. As yet another example, analytics service 68F may provide comparative ratings of workers or type of safety equipment in a particular environment 8.

Hence, analytics service 68F may maintain or otherwise use one or more models that provide risk metrics to predict safety events. Analytics service 68F may also generate order sets, recommendations, and quality measures. In some examples, analytics service 68F may generate user interfaces based on processing information stored by PPEMS 6 to provide actionable information to any of clients 63. For example, analytics service 68F may generate dashboards, alert notifications, reports and the like for output at any of clients 63. Such information may provide various insights regarding baseline ("normal") operation across worker populations, identifications of any anomalous workers engaging in abnormal activities that may potentially expose the worker to risks, identifications of any geographic regions within environments for which unusually anomalous (e.g., high) safety events have been or are predicted to occur, identifications of any of environments exhibiting anomalous occurrences of safety events relative to other environments, and the like.

Although other technologies can be used, in one example implementation, analytics service 68F utilizes machine learning when operating on streams of safety events so as to perform real-time analytics. That is, analytics service 68F includes executable code generated by application of machine learning to training data of event streams and known safety events to detect patterns. The executable code may take the form of software instructions or rule sets and is generally referred to as a model that can subsequently be applied to event streams 69 for detecting similar patterns and predicting upcoming events.

Analytics service 68F may, in some example, generate separate models for a particular worker, a particular population of workers, a particular environment, or combinations thereof. Analytics service 68F may update the models based on usage data received from PPEs 13. For example, analytics service 68F may update the models for a particular worker, a particular population of workers, a particular environment, or combinations thereof based on data received from PPEs 13.

Alternatively, or in addition, analytics service 68F may communicate all or portions of the generated code and/or the machine learning models to hubs 16 (or PPEs 13) for execution thereon so as to provide local alerting in near-real time to PPEs. Example machine learning techniques that may be employed to generate models 74B can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LUQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

Record management and reporting service 68G processes and responds to messages and queries received from computing devices 60 via interface layer 64. For example, record management and reporting service 68G may receive requests from client computing devices for event data related to individual workers, populations or sample sets of workers, geographic regions of environments 8 or environments 8 as a whole, or individual or groups/types of PPEs 13. In response, record management and reporting service 68G accesses event information based on the request. Upon retrieving the event data, record management and reporting service 68G constructs an output response to the client application that initially requested the information. In some examples, the data may be included in a document, such as an HTML document, or the data may be encoded in a JSON format or presented by a dashboard application executing on the requesting client computing device. For instance, as further described in this disclosure, example user interfaces that include the event information are depicted in the figures.

As additional examples, record management and reporting service 68G may receive requests to find, analyze, and correlate PPE event information. For instance, record management and reporting service 68G may receive a query request from a client application for event data 74A over a historical time frame, such as a user can view PPE event information over a period of time and/or a computing device can analyze the PPE event information over the period of time.

In example implementations, services 68 may also include security service 68H that authenticate and authorize users and requests with PPEMS 6. Specifically, security service 68H may receive authentication requests from client applications and/or other services 68 to access data in data layer 72 and/or perform processing in application layer 66. An authentication request may include credentials, such as a username and password. Security service 68H may query security data 74A to determine whether the username and password combination is valid. Configuration data 74D may include security data in the form of authorization credentials, policies, and any other information for controlling access to PPEMS 6. As described above, security data 74A may include authorization credentials, such as combinations of valid usernames and passwords for authorized users of PPEMS 6. Other credentials may include device identifiers or device profiles that are allowed to access PPEMS 6.

Security service 68H may provide audit and logging functionality for operations performed at PPEMS 6. For instance, security service 68H may log operations performed by services 68 and/or data accessed by services 68 in data layer 72. Security service 68H may store audit information such as logged operations, accessed data, and rule processing results in audit data 74C. In some examples, security service 68H may generate events in response to one or more rules being satisfied. Security service 68H may store data indicating the events in audit data 74C.

In the example of FIG. 20, a safety manager may initially configure one or more safety rules. As such, remote user 24 may provide one or more user inputs at computing device 18 that configure a set of safety rules for work environment 8A and 8B. For instance, a computing device 60 of the safety manager may send a message that defines or specifies the safety rules. Such message may include data to select or create conditions and actions of the safety rules. PPEMS 6 may receive the message at interface layer 64 which forwards the message to rule configuration component 681. Rule configuration component 681 may be combination of hardware and/or software that provides for rule configuration including, but not limited to: providing a user interface to specify conditions and actions of rules, receive, organize, store, and update rules included in safety rules data store 74E.

Safety rules data store 75E may be a data store that includes data representing one or more safety rules. Safety rules data store 74E may be any suitable data store such as a relational database system, online analytical processing database, object-oriented database, or any other type of data store. When rule configuration component 681 receives data defining safety rules from computing device 60 of the safety manager, rule configuration component 681 may store the safety rules in safety rules data store 75E.

In some examples, storing the safety rules may include associating a safety rule with context data, such that rule configuration component 681 may perform a lookup to select safety rules associated with matching context data. Context data may include any data describing or characterizing the properties or operation of a worker, worker environment, article of PPE, or any other entity. Context data may include any data describing an optical pattern, optical tag, or optical label, or associating the optical pattern with (1) a specific PPE, (2) a type of PPE, (3) another optical pattern, and/or (4) a specific worker. Context data of a worker may include, but is not limited to: a unique identifier of a worker, type of worker, role of worker, physiological or biometric properties of a worker, experience of a worker, training of a worker, time worked by a worker over a particular time interval, location of the worker, or any other data that describes or characterizes a worker. Context data of an article of PPE may include, but is not limited to: a unique identifier of the article of PPE; a type of PPE of the article of PPE; a usage time of the article of PPE over a particular time interval; a lifetime of the PPE; a component included within the article of PPE; a usage history across multiple users of the article of PPE; contaminants, hazards, or other physical conditions detected by the PPE, expiration date of the article of PPE; operating metrics of the article of PPE; one or more optical patterns embodied on the article of PPE. Context data for a work environment may include, but is not limited to: a location of a work environment, a boundary or perimeter of a work environment, an area of a work environment, hazards within a work environment, physical conditions of a work environment, permits for a work environment, equipment within a work environment, owner of a work environment, responsible supervisor and/or safety manager for a work environment.

Table 1, shown below, includes a non-limiting set of rules that may be stored to safety rules data store 74E:

TABLE 1

SAFETY RULES

Hub shall immediately assert an "Attention Initial" Alert if Visor Position Status is OPEN in current location requiring Visor Open Allow = NO
Hub shall immediately assert a "Critical Initial" Alert if Filter Type Status is not equal to Filter Type or no filter found required by current location
Hub shall store all alerts in a queue.
Critical Alerts shall be highest priority in alert queue
Attention Alerts shall have secondary priority in alert queue
Hub shall immediately remove an alert from the queue if its conditions causing the alert have been corrected
A newly added alert to the alert queue shall be flagged as "Active", if it is higher priority than any other alarms in the queue.
A newly added alert to the alert queue shall be flagged as "Active", if all other alarms in the queue are Acknowledged or Notify

TABLE 1-continued

SAFETY RULES

A newly added alert to the alert queue shall be flagged as "Pending" if an Active alert already exists in the queue and the newly added alert is lower in priority than the currently Active alert
If an Active alert in the queue is replaced by a new Active alert because of priority, the replaced alert shall be flagged as "Pending"
An active alert shall enable its respective haptic feedback and LED pattern
Hub shall assert an Acknowledge event when user presses and releases button within <3 seconds. (Button_Tap)
Upon an Acknowledge event the Hub shall immediately flag the currently Active alert as Acknowledged, if any Active alerts are in the queue.
An Acknowledged alert shall disable its respective haptic feedback and LED pattern
Upon an Acknowledge event the Hub shall immediately flag the highest priority Pending alert as Active, if any Pending alerts exist in the queue.
Upon an Acknowledge event the Hub shall immediately flag the highest priority Acknowledged alert as Notify, if no Active alerts or Pending exist in the queue.
A Notify alert shall disable its respective haptic feedback and enable its LED pattern
Immediate Cloud Updates - Hub shall send safety violation asserted message via Wi-Fi to cloud service immediately upon assertion of alert
Immediate Worker Interface Updates - Hub shall send safety rule violation alerts asserted message via BLE to Worker Interface immediately upon assertion of alert
Immediate Cloud Updates - Hub shall send safety violation deasserted message via Wi-Fi to cloud service immediately upon deassertion of alert
Immediate Worker Interface Updates - Hub shall send safety violation deasserted message via BLE to Worker Interface immediately upon deassertion of alert It should be understood that the above examples of table 1 are provided for purposes of illustration only, and that other rules may be developed.

According to aspects of this disclosure, the rules may be used for purposes of reporting, to generate alerts, or the like. In an example for purposes of illustration, worker 10A may be equipped with PPE 13A and data hub 14A. Data hub 14A may be initially configured with and store a unique identifier of worker 10A. When initially assigning the PPE 13A and data hub to worker 10A, a computing device operated by worker 10A and/or a safety manager may cause RMRS 68G to store a mapping in work relation data 74F. Work relation data 74F may include mappings between data that corresponds to PPE, workers, and work environments. Work relation data 74F may be any suitable datastore for storing, retrieving, updating and deleting data. RMRS 69G may store a mapping between the unique identifier of worker 10A and a unique device identifier of data hub 14A. Work relation data store 74F may also map a worker to an environment.

Worker 10A may initially put on PPE 13A and data hub 14A prior to entering environment 8A. As worker 10A approaches environment 8A and/or has entered environment 8A, data hub 14A may determine that worker 10A is within a threshold distance of entering environment 8A or has entered environment 8A. Data hub 14A may determine that it is within a threshold distance of entering environment 8A or has entered environment 8A and send a message that includes context data to PPEMS 6 that indicates data hub 14A is within a threshold distance of entering environment 8A.

PPEMS 6 may additionally or alternatively apply analytics to predict the likelihood of a safety event. As noted above, a safety event may refer to activities of a worker 10 using PPE 13, a condition of PPE 13, or a hazardous environmental condition (e.g., that the likelihood of a safety event is relatively high, that the environment is dangerous, that a PPE 13 is malfunctioning, that one or more components of the PPE should be repaired or replaced, or the like). For example, PPEMS 6 may determine the likelihood of a safety event based on application of usage data from PPE 13 to historical data and models 74B. That is, PPEMS 6 may apply historical data and models 74B to usage data from PPE 13 in order to compute assertions, such as anomalies or predicted occurrences of imminent safety events based on environmental conditions or behavior patterns of a worker using a PPE 13.

PPEMS 6 may apply analytics to identify relationships or correlations between sensed data from PPE 13, environmental conditions of environment in which PPE 13 is located, a geographic region in which PPE 13 are located, and/or other factors. PPEMS 6 may determine, based on the data acquired across populations of workers 10, which particular activities, possibly within certain environment or geographic region, lead to, or are predicted to lead to, unusually high occurrences of safety events. PPEMS 6 may generate alert data based on the analysis of the usage data and transmit the alert data to PPEs 13 and/or hubs 14. Hence, according to aspects of this disclosure, PPEMS 6 may determine usage data of respirator 13, generate status indications, determine performance analytics, and/or perform prospective/preemptive actions based on a likelihood of a safety event.

For example, according to aspects of this disclosure, pattern service 68J may generate usage data for PPE 13 using the optical pattern identification and spatial relation techniques described herein. For example, PPEMS 6 may determine, based on streams of spatial relation data for one or more optical patterns associated with a PPE 13, a length of time that one or more components have been in use, an instantaneous velocity or acceleration of worker 10 (e.g., based on an accelerometer included in PPE 13 or hubs 14), location(s) of worker 10, a number of times or frequency with which a worker 10 has performed a self-check of PPE 13 or other PPE, a number of times and lengths of times a visor or other component of PPE 13 has been placed into active or standby position, or the like.

According to aspects of this disclosure, PPEMS 6 may use the usage data to characterize activity of worker 10. For example, PPEMS 6 may establish patterns of productive and nonproductive time (e.g., based on operation of PPE 13 and/or movement of worker 10), categorize worker movements, identify key motions, and/or infer occurrence of key events. That is, PPEMS 6 may obtain the usage data, analyze the usage data using services 68 (e.g., by comparing the usage data to data from known activities/events), and generate an output based on the analysis.

The usage statistics may be used to provide an understanding how PPE 13 are used by workers 10 to product developers in order to improve product designs and performance. In still other examples, the usage statistics may be used to gather human performance metadata to develop product specifications. In still other examples, the usage statistics may be used as a competitive benchmarking tool. For example, usage data may be compared between customers of PPE 13 to evaluate metrics (e.g. productivity, compliance, or the like) between entire populations of workers outfitted with PPE 13.

Additionally or alternatively, according to aspects of this disclosure, spatial relation data may be used to assess performance of worker 10 wearing a PPE 13. For example, PPEMS 6 may, based on spatial relation data, recognize motion that may indicate a pending fall by worker 10 (e.g., by determining a movement between an optical pattern embodied on the PPE 13 and another optical pattern in environment 8). In some instances, PPEMS 6 may, based on spatial relation data, infer that a fall has occurred or that worker 10 is incapacitated. PPEMS 6 may also perform fall data analysis after a fall has occurred and/or determine temperature, humidity and other environmental conditions as they relate to the likelihood of safety events.

As another example, PPEMS 6 may, based on spatial relation data, recognize motion that may indicate fatigue or impairment of worker 10. For example, PPEMS 6 may apply spatial relation data from PPE 13 to a safety model that characterizes a motion of a worker 10. In this example, PPEMS 6 may determine that the motion of a worker 10 over a time period is anomalous for the worker 10 or a population of workers 10 using a PPE 13.

Additionally or alternatively, according to aspects of this disclosure, usage data from PPE 13 may be used to determine alerts and/or actively control operation of PPE 13. For example, PPEMS 6 may determine that a safety condition is present. PPEMS 6 may send data to PPE 13 to change an operating condition of PPE 13. In an example for purposes of illustration, PPEMS 6 may apply usage data to a safety model that characterizes an expenditure of a filter of one of PPE 13. In this example, PPEMS 6 may determine that the expenditure is higher than an expected expenditure for an environment, e.g., based on conditions sensed in the environment, usage data gathered from other workers 10 in the environment, or the like. PPEMS 6 may generate and transmit an alert to worker 10 that indicates that worker 10 should leave the environment.

PPEMS 6 may generate, in some examples, a warning when worker 10 is near a hazard in one of environments 8 (e.g., based on spatial relation data).

Again, PPEMS 6 may determine the above-described performance characteristics and/or generate the alert data based on application of the spatial relation data to one or more safety models that characterizes activity of a user of a type of PPE 13. The safety models may be trained based on historical data or known safety events. However, while the determinations are described with respect to PPEMS 6, as described in greater detail herein, one or more other computing devices, such as hubs 14 or PPE 13 may be configured to perform all or a subset of such functionality.

In some instances, PPEMS 6 may apply analytics for combinations of PPE. For example, PPEMS 6 may draw correlations between users of PPE 13 and/or the other PPE (such as fall protective equipment, head protective equipment, hearing protective equipment, or the like) that is used with PPE 13. That is, in some instances, PPEMS 6 may determine the likelihood of a safety event based not only on spatial relation and or usage data from PPE 13, but also from data for other PPE being used with PPE 13. In such instances, PPEMS 6 may include one or more safety models that are constructed from data of known safety events from one or more devices other than PPE 13 that are in use with PPE 13.

In general, while certain techniques or functions are described herein as being performed by certain components, e.g., PPEMS 6, PPE 13, or hubs 14, it should be understood that the techniques of this disclosure are not limited in this way. That is, certain techniques described herein may be performed by one or more of the components of the described systems. For example, in some instances, PPE 13 may have a limited or no sensor set and/or processing power. In such instances, one or more of hubs 14 and/or PPEMS 6 may responsible for most or all of the processing of usage data, determining the likelihood of a safety event, and the like. In other examples, PPE 13 and/or hubs 14 may have additional sensors, additional processing power, and/or additional memory, allowing for PPE 13 and/or hubs 14 to perform additional techniques. Determinations regarding which components are responsible for performing techniques may be based, for example, on processing costs, financial costs, power consumption, or the like.

Figure 21:
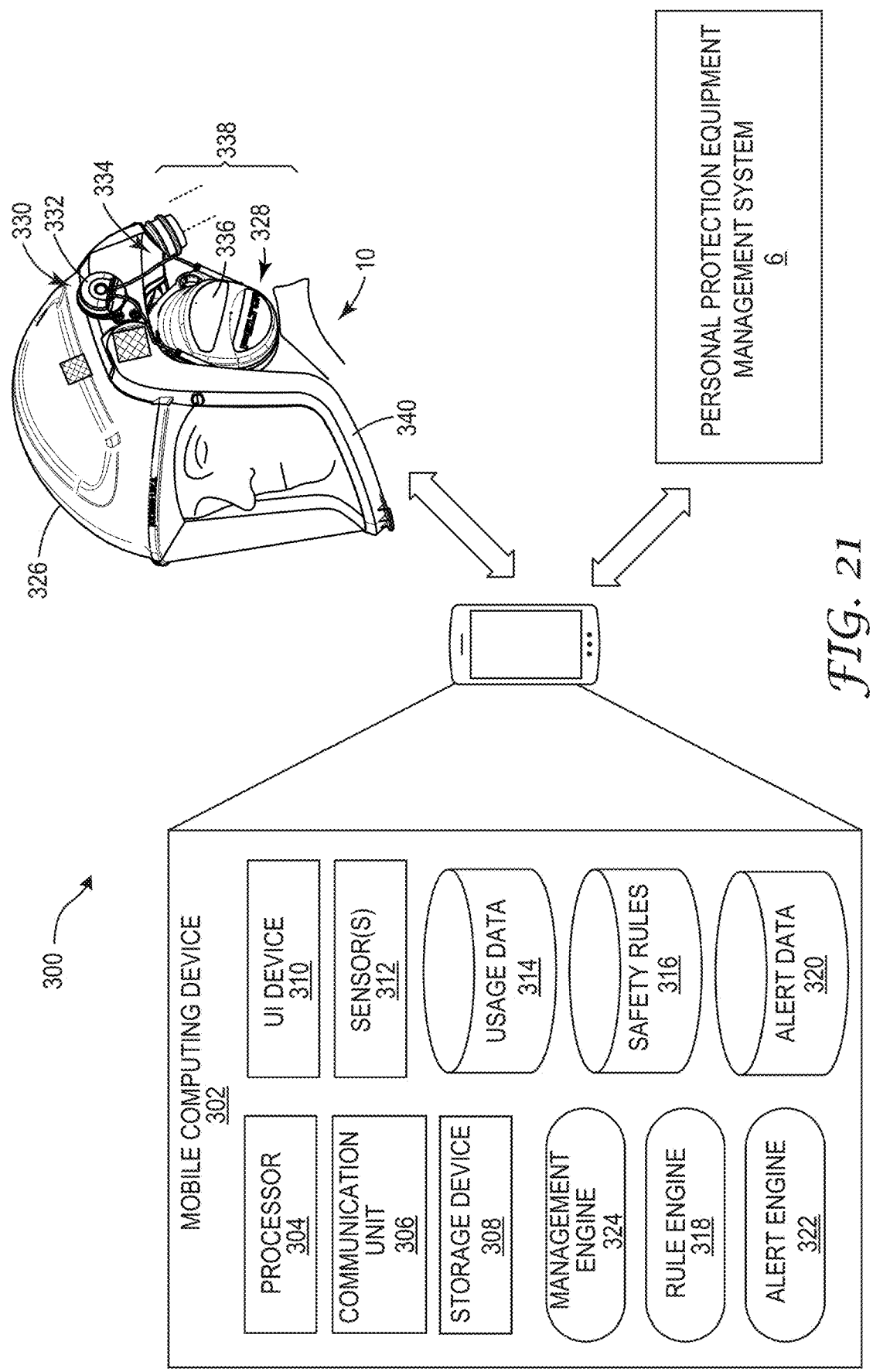
FIG. 21 illustrates components of mobile computing device 302, in accordance with techniques of this disclosure.

FIG. 21 illustrates components of mobile computing device 302, in accordance with techniques of this disclosure. In FIG. 21, computing device 302 includes processor 304, communication unit 306, storage device 308, user-interface (UI) device 310, sensors 312, usage data 314, safety rules 316, rule engine 318, alert data 320, alert engine 322, and management engine 324. As noted above, mobile computing device 302 represents one example of hubs 14 shown in FIG. 19. Many other examples of mobile computing device 302 may be used in other instances and may include a subset of the components included in example mobile computing device 302 or may include additional components not shown example mobile computing device 302 in FIG. 21.

In some examples, mobile computing device 302 may be an intrinsically safe computing device, smartphone, wrist- or head-wearable computing device, or any other computing device that may include a set, subset, or superset of functionality or components as shown in mobile computing device 302. Communication channels may interconnect each of the components in mobile computing device 302 for inter-component communications (physically, communicatively, and/or operatively). In some examples, communication channels may include a hardware bus, a network connection, one or more inter-process communication data structures, or any other components for communicating data between hardware and/or software.

Mobile computing device 302 may also include a power source, such as a battery, to provide power to components shown in mobile computing device 302. A rechargeable battery, such as a Lithium Ion battery, can provide a compact and long-life source of power. Mobile computing device 302 may be adapted to have electrical contacts exposed or accessible from the exterior of the hub to allow recharging the mobile computing device 302. As noted above, mobile computing device 302 may be portable such that it can be carried or worn by a user. Mobile computing device 302 can also be personal, such that it is used by an individual and communicates with personal protective equipment (PPE) assigned to that individual. In FIG. 21, mobile computing device 302 may be secured to a user by a strap. However, communication hub may be carried by a user or secured to a user in other ways, such as being secured to PPE being worn by the user, to other garments being worn to a user, being attached to a belt, band, buckle, clip or other attachment mechanism as will be apparent to one of skill in the art upon reading the present disclosure.

One or more processors 304 may implement functionality and/or execute instructions within mobile computing device 302. For example, processor 304 may receive and execute instructions stored by storage device 308. These instructions executed by processor 304 may cause mobile computing device 302 to store and/or modify information, within storage devices 308 during program execution. Processors 304 may execute instructions of components, such as rule engine 318 and alert engine 322 to perform one or more operations in accordance with techniques of this disclosure. That is, rule engine 318 and alert engine 322 may be operable by processor 304 to perform various functions described herein.

One or more communication units 306 of mobile computing device 302 may communicate with external devices by transmitting and/or receiving data. For example, mobile computing device 302 may use communication units 306 to transmit and/or receive radio signals on a radio network such as a cellular radio network. In some examples, communication units 306 may transmit and/or receive satellite signals on a satellite network such as a Global Positioning System (GPS) network. Examples of communication units 306 include a network interface card (e.g. such as an Ethernet card), an optical transceiver, a radio frequency transceiver, a GPS receiver, or any other type of device that can send and/or receive information. Other examples of communication units 306 may include Bluetooth®, GPS, 3G, 4G, and Wi-Fi® radios found in mobile devices as well as Universal Serial Bus (USB) controllers and the like.

One or more storage devices 308 within mobile computing device 302 may store information for processing during operation of mobile computing device 302. In some examples, storage device 308 is a temporary memory, meaning that a primary purpose of storage device 308 is not long-term storage. Storage device 308 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage device 308 may, in some examples, also include one or more computer-readable storage media. Storage device 308 may be configured to store larger amounts of information than volatile memory. Storage device 308 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage device 308 may store program instructions and/or data associated with components such as rule engine 318 and alert engine 322.

UI device 310 may be configured to receive user input and/or output information to a user. One or more input components of UI device 310 may receive input. Examples of input are tactile, audio, kinetic, and optical input, to name only a few examples. UI device 310 of mobile computing device 302, in one example, include a mouse, keyboard, voice responsive system, video camera, buttons, control pad, microphone or any other type of device for detecting input from a human or machine. In some examples, UI device 310 may be a presence-sensitive input component, which may include a presence-sensitive screen, touch-sensitive screen, etc.

One or more output components of UI device 310 may generate output. Examples of output are data, tactile, audio, and video output. Output components of UI device 310, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components may be integrated with mobile computing device 302 in some examples.

UI device 310 may include a display, lights, buttons, keys (such as arrow or other indicator keys), and may be able to provide alerts to the user in a variety of ways, such as by sounding an alarm or vibrating. The user interface can be used for a variety of functions. For example, a user may be able to acknowledge or snooze an alert through the user interface. The user interface may also be used to control settings for the head top and/or turbo peripherals that are not immediately within the reach of the user. For example, the turbo may be worn on the lower back where the wearer cannot access the controls without significant difficulty.

Sensors 312 may include one or more sensors that generate data indicative of an activity of a worker 10 associated with mobile computing device 302 and/or data indicative of an environment in which mobile computing device 302 is located. Sensors 312 may include, as examples, one or more accelerometers, one or more sensors to detect conditions present in a particular environment (e.g., sensors for measuring temperature, humidity, particulate content, noise levels, air quality, or any variety of other characteristics of environments in which respirator 13 may be used), or a variety of other sensors.

Mobile computing device 302 may store usage data 314 from components of air respirator system 100. For example, as described herein, components of air respirator system 100 (or any other examples of respirators 13) may generate data regarding operation of system 100 that is indicative of activities of worker 10 and transmit the data in real-time or near real-time to mobile computing device 302.

In some examples, mobile computing device 302 may immediately relay usage data 314 to another computing device, such as PPEMS 6, via communication unit 306. In other examples, storage device 308 may store usage data 314 for some time prior to uploading the data to another device. For example, in some instances, communication unit 306 may be able to communicate with system 100 but may not have network connectivity, e.g., due to an environment in which system 100 is located and/or network outages. In such instances, mobile computing device 302 may store usage data 314 to storage device 308, which may allow the usage data to be uploaded to another device upon a network connection becoming available. Mobile computing device 302 may store safety rules 316 as described in this disclosure. Safety rules 316 may be stored in any suitable data store as described in this disclosure.

System 300 may include head top 326 and hearing protector 328, in accordance with this disclosure. As shown in FIG. 21, head top 326 may include structure and functionality that is similar to or the same as respirator 13A as described in FIG. 1 and other embodiments of this disclosures. Head top 326 (or other headworn device, such as a head band) may include hearing protector 328 that includes, ear muff attachment assembly 330. Ear muff attachment assembly 330 may include housing 332, an arm set 334, and ear muffs 336. Hearing protector 328 may include two separate ear muff cups 336, one of which is visible in FIG. 21 and the other on the opposite side of the user's head and similarly configured to the visible ear muff cup in FIG. 21. Arm set 334 is rotatable between one or more different positions, such that hearing protector 328 may be adjusted and/or toggled, for example, between "active" and "standby" positions (or one or more additional intermediate positions). In an active position, hearing protector 328 is configured to at least partially cover a user's ear. In a standby mode, hearing protector 328 is in a raised position away from and/or out of contact with a user's head. A user is able to switch between active and standby positions when entering or leaving an area necessitating hearing protection, for example, or as may be desired by the user. Adjustment to a standby position allows hearing protector 328 to be readily available for the user to move hearing protector 328 into an active position in which hearing protection is provided without the need to carry or store ear muffs.

Ear muff attachment assembly 330 may be attached directly or indirectly to a helmet, hard hat, strap, head band, or other head support, such as a head top 326. Head top 326 may be worn simultaneously with, and provide a support for, ear muff attachment assembly 330. Ear muff attachment assembly 330 is attached to an outer surface of head top 326, and arm set 334 extends generally downwardly around an edge of head top 326 such that ear muffs of hearing protector 328 may be desirably positioned to cover a user's ear.

In various examples, head top 326 and ear muff attachment assembly 330 may be joined using various suitable attachment components, such as snap-fit components, rivets, mechanical fasteners, adhesive, or other suitable attachment components as known in the art. Ear muffs of hearing protector 328 are configured to cover at least a portion of a user's ear and/or head. In FIG. 21, ear muffs exhibit a cup shape and include a cushion and a sound absorber (not shown). Cushions are configured to contact a user's head and/or ear when ear muffs are in an active position forming an appropriate seal to prevent sound waves from entering. Arm set 334 extends outwardly from head top 326 and is configured to carry ear muffs of hearing protector 328.

In the example of FIG. 21, ear muff attachment assembly 330 may have positional or motion sensors to detect whether the ear muffs are in the standby or active position. The positional or motion sensor may generate one or more signals that indicate a particular position from a set of one or more positions. The signals may indicate one or more position values (e.g., discrete "active"/"standby" values, numeric position representations, or any other suitable encoding or measurement values). If, for example, the standby condition is detected by the one or more positional or motion sensors and if an environmental sound detector detects unsafe sound levels, then a computing device may generate an indication of output, such as a notification, log entry, or other type of output. In some examples, the indication of output may be audible, visual, haptic, or any other physical sensory output.

In high noise environment workers may be required to use hearing protection in the form of ear plugs or ear muffs. Ear muffs typically comprise cup shaped shell with a sound absorbing liner that seals against the ear of the user. Many workers also use head and/or face protection while wearing ear muffs. Therefore, many ear muff models are designed to attach to a helmet, hard hat or other headgear, such as shown in FIG. 21. The ear muffs may be affixed to the headgear via an arm that attaches to the headgear and is adjustable between various positions over or away from the worker's ear.

As described above, headgear mounted ear muffs rotate between two positions: the active position where the ear muffs cover the worker's ears providing hearing protection, and the standby position where the ear muffs are rotated up and away from the ears. While in the standby position the ear muff does not provide hearing protection to the worker. In some types of headgear attached ear muffs, the muffs can be pivoted outward away from the ear of the user in the standby position. In this case, the ear muffs rest at a small distance away from the head of the user. In the active position, the muffs are pivoted toward the head where it is sealed around the ears of the user providing hearing protection.

Returning to mobile computing device 302, safety rules 316 may include threshold information both for a length of time visor 340 is allowed to be in an open position before an alert is generated, and the level or type of contaminants that will trigger an alert. For example, when mobile computing device 302 receives information from an environmental beacon that there are no hazards present in the environment, the threshold for the visor 340 being in the open position may be infinite. If a hazard is present in the environment, then the threshold may be determined based upon the concern of the threat to the user. Radiation, dangerous gases, or toxic fumes would all require assignment of the threshold to be on the order of one second or less.

Thresholds for head top temperature can be used to predict, e.g., by PPEMS 6, heat related illness and more frequent hydration and/or rest periods can be recommended to the user. Thresholds can be used for predicted battery run time. As the battery nears selectable remaining run time, the user can be notified/warned to complete their current task and seek a fresh battery. When a threshold is exceeded for a specific environmental hazard, an urgent alert can be given to the user to evacuate the immediate area. Thresholds can be customized to various levels of openness for the visor. In other words, a threshold for the amount of a time the visor may be open without triggering an alarm may be longer if the visor is in the partially open position as compared to the open position.

Reaching different thresholds set forth in safety rules 316 may result in triggering different types of alerts or alarms. For example, alarms may be informational (not requiring a user response), urgent (repeated and requiring a response or acknowledgement from a user), or emergency (requiring immediate action from a user.) The type of alert or alarm can be tailored to the environment. Different types of alerts and alarms can be coupled together to get user attention. In some instances, a user may be able to "snooze" an alert or alarm.

Rule engine 318 may be a combination of hardware and software that executes one or more safety rules, such as safety rules 316. For instance, rule engine 318 may determine which safety rules to execute based on context data, information included in the safety rule set, other information received from PPEMS 6 or other computing devices, user input from the worker, or any other source of data that indicates which safety rules to execute. In some examples, safety rules 316 may be installed prior to a worker entering a work environment, while in other examples, safety rules 316 be dynamically retrieved by mobile computing device 302 based on context data generated at first particular point in time.

Rule engine 318 may execute safety rules periodically, continuously, or asynchronously. For instance, rule engine 318 may execute safety rules periodically by evaluating the conditions of such rules each time a particular time interval passes or expires (e.g., every second, every minute, etc.). In some examples, rule engine 318 may execute safety rules continuously by checking such conditions using one or more scheduling techniques that continuously evaluate the conditions of such rules. In some examples, rule engine 318 may execute safety rules asynchronously, such as in response to detecting an event. An event may be any detectable occurrence, such as moving to a new location, detecting a worker, coming within a threshold distance of another object, or any other detectable occurrence.

Rule engine 318, upon determining that a condition of a safety rule has or has not been satisfied may perform one or more actions associated with the safety rule by executing one or more operations that define the actions. For instance, rule engine 318 may execute a condition that determines if a worker is approaching or has entered a work environment, (a) whether a PAPR is being worn by the worker and (b) whether the filter in the PAPR of a particular type of filter, e.g., a filter that removes contaminants of a particular type. This safety rule may specify actions if the condition is not satisfied which cause rule engine 318 to generate an alert at mobile computing device 302 using UI device 310 and send a message using communication unit 306 to PPEMS 6, which may cause PPEMS 6 to send a notification to a remote user (e.g., the safety manager).

Alert data 320 may be used for generating alerts for output by UI device 310. For example, mobile computing device 302 may receive alert data from PPEMS 6, end-user computing devices 16, remote users using computing devices 18, safety stations 15, or other computing devices as illustrated in FIG. 1. In some examples, alert data 320 may be based on operation of system 300. For example, mobile computing device 302 may receive alert data 320 that indicates a status of system 300, that system 300 is appropriate for the environment in which system 300 is located, that the environment in which system 300 is located is unsafe, or the like.

In some examples, additionally or alternatively, mobile computing device 302 may receive alert data 320 associated with a likelihood of a safety event. For example, as noted above, PPEMS 6 may, in some examples, apply historical data and models to usage data from system 300 in order to compute assertions, such as anomalies or predicted occurrences of imminent safety events based on environmental conditions or behavior patterns of a worker using system 300. That is, PPEMS 6 may apply analytics to identify relationships or correlations between sensed data from system 300, environmental conditions of environment in which system 300 is located, a geographic region in which system 300 is located, and/or other factors. PPEMS 6 may determine, based on the data acquired across populations of workers 10, which particular activities, possibly within certain environment or geographic region, lead to, or are predicted to lead to, unusually high occurrences of safety events. Mobile computing device 302 may receive alert data 320 from PPEMS 6 that indicates a relatively high likelihood of a safety event.

Alert engine 322 may be a combination of hardware and software that interprets alert data 320 and generate an output at UI device 310 (e.g., an audible, visual, or tactile output) to notify worker 10 of the alert condition (e.g., that the likelihood of a safety event is relatively high, that the environment is dangerous, that system 300 is malfunctioning, that one or more components of system 300 need to be repaired or replaced, or the like). In some instances, alert engine 322 may also interpret alert data 320 and issue one or more commands to system 300 to modify operation or enforce rules of system 300 in order to bring operation of system 300 into compliance with desired/less risky behavior. For example, alert engine 322 may issue commands that control the operation of head top 326 or a clean air supply source.

Figure 22A:
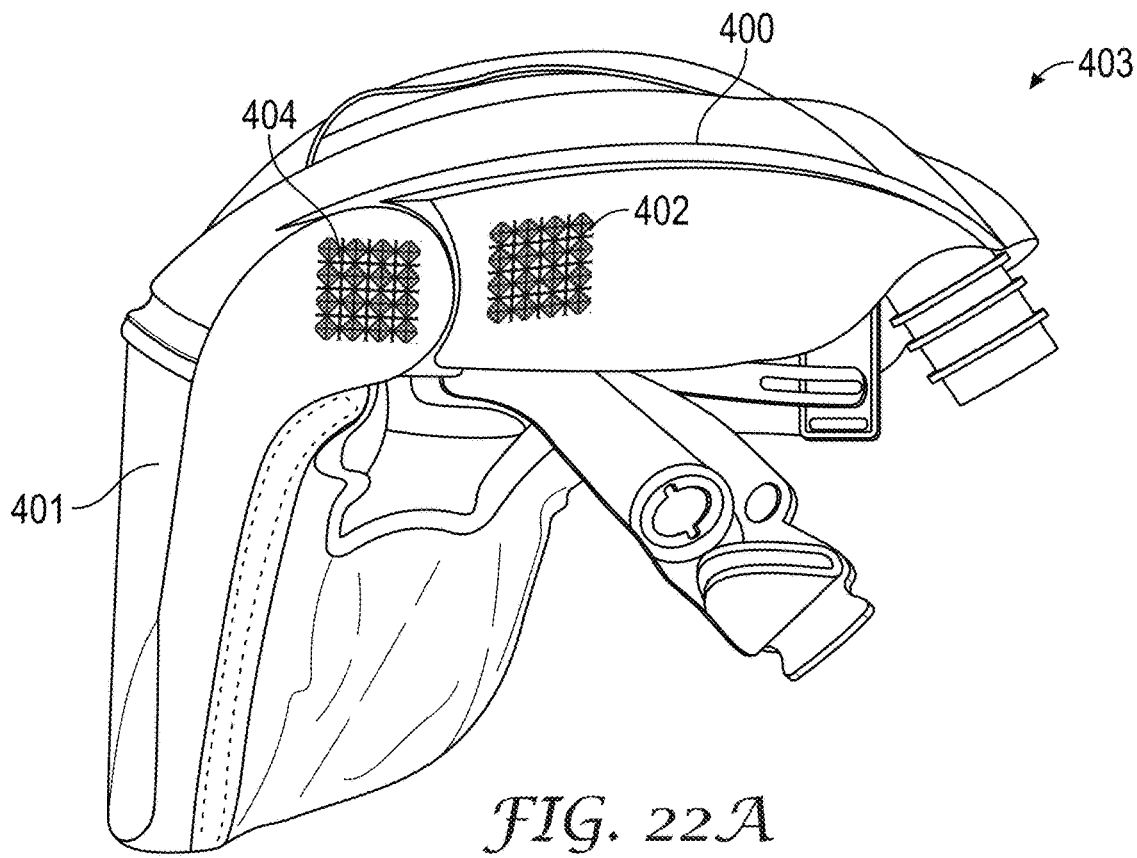
FIGS. 22A-22B depict an example of PPE in an active and standby position, the PPE having optical patterns embodied thereon, according to techniques of this disclosure.
Figure 22B:
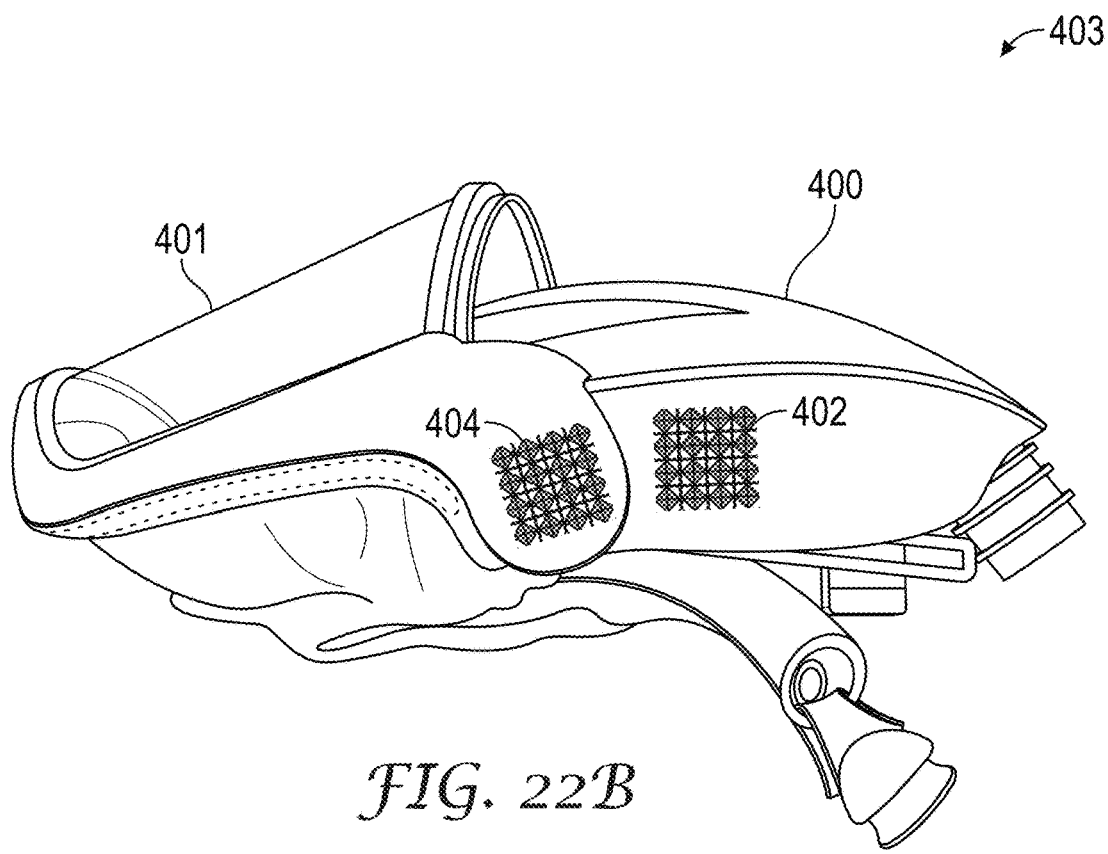

FIGS. 22A-22B depict an example of a PPE in an active and standby position, the PPE having optical patterns embodied thereon, according to techniques of this disclosure. More specifically, FIGS. 22A-22B depict a filtered air respirator system, which may also be referred to as a supplied air system generally. The system represents one example of PPE 13 shown in FIGS. 1-2. The system includes a head top 403 having a helmet 400 and a visor 401. Head top 403 is connectable to a clean air supply source by a hose. Clean air supply source can be any type of air supply source, such as a blower assembly for a powered air purifying respirator (PAPR), an air tank for a self-contained breathing apparatus (SCBA) or any other device that provides air to head top 403.

Visor 401 is sized to fit over at least a user's nose and mouth. Visor 401 includes a lens which is rotatable attached to helmet 400 at a pivot point. A rotation position of visor 401 about the pivot point determines whether the visor 401 is open, partially open, or closed. A closed visor 401 provides eye and face protection for hazards as well as respiratory protection to a user (provided the air supply to head top 403 is satisfactory). A partially open visor 401 provides at least some eye and face protection for hazards as well as at least some amount of respiratory protection. This "partially open" visor state, if kept to short durations, can assist the user in face to face communications with other workers. An open visor 401 provides little or no protection.

Helmet 400 has an optical pattern 402 embodied thereon. Visor 401 has an optical pattern 404 embodied thereon. In some examples, each side of the visor 401 has an optical pattern embodied thereon, which may be the same optical pattern. In this way, at least one of these optical patterns may be visible to an image capture device in more orientations of the worker wearing the head top 403. Optical patterns 402, 404 may be printed on respective optical tags affixed to helmet 400 and visor 401, respectively.

FIG. 22A depicts visor 401 in a closed position that is the active position for the head top 403. When worn by a worker in a work environment, an image capture device 28 may obtain an image showing the head top 403 having visor 401 in the closed position. PPEMS 6 may obtain and process the image to determine a spatial relation between optical patterns 402, 404. More particularly, in this example of a PPE, PPEMS 6 may determine an orientation of optical pattern 402, an orientation of optical pattern 404, and a relative orientation between optical patterns 402, 404 that corresponds to a difference between the two orientations thereof. The relative orientation determined by PPEMS 6 indicates the head top 403 has visor 401 in a closed position. The closed position is the active position for head top 403 and may not correspond to a safety condition. However, PPEMS 6 may store event data having (1) the image, (2) a description of the head top 403 or full respirator system, (3) an identification of the worker, (4) a description of the spatial relation between optical patterns 402, 404, (5) a time of the image capture of the image, and/or (6) an indication that no safety condition was present, for instance.

FIG. 22B depicts visor 401 in an open position that is the standby position for head top 403. When worn by a worker in a work environment, visor 401 may be rotated about the pivot by the worker, and an image capture device 28 may contemporaneously obtain an image showing head top 403 having visor 401 in the open position. PPEMS 6 may obtain and process the image to determine a spatial relation between optical patterns 402, 404. More particularly, in this example of a PPE, PPEMS 6 may determine an orientation of optical pattern 402, an orientation of optical pattern 404, and a relative orientation between optical patterns 402, 404 that corresponds to a difference between the two orientations thereof. The relative orientation determined by PPEMS 6 indicates the head top 403 has visor 401 in an open position. The relative orientation is different than then relative orientation as in the closed position depicted in FIG. 22A. The open position is the standby position for head top 403 and may correspond to a safety condition for head top 403 operating in the work environment. PPEMS 6 may therefore perform an operation based at least in part on the safety condition. PPEMS 6 may also store event data having (1) the image, (2) a description of the head top 403 or full respirator system, (3) an identification of the worker, (4) a description of the spatial relation between optical patterns 402, 404, (5) a time of the image capture of the image, and/or (6) an indication that the safety condition occurred, for instance.

In some instances, computer vision systems have taken numerous approaches to detecting object of interest like pedestrians. Some approaches to object detection include visible, near infrared, or thermal infrared cameras. The problem of object detection may be complicated due to the complexity and variety of the environments in which the optical articles and systems can be located in (e.g., daytime or nighttime; urban or city; construction, etc.), the variety of the poses that they can take, and the variety of their appearance based on size, clothing, etc., as well as due to potential partial occlusion.

Some of the pedestrian detection approaches employ exhaustive scanning over the entire image, or template based silhouette matching, body part matching. However, due to variety in the forms that humans can take in images, these approaches may be very difficult, time consuming, and have less than ideal performance.

Similarly, a difficult task of detecting and identifying pedestrians at night by human observers resulted in the introduction and regulation of high visibility garments. High visibility garments (i.e., garments with retro-reflective materials) are designed to make the wearer more visible or conspicuous by returning more of the incident light back to the light source and in patterns that can be readily recognized by human viewers as other human forms. Current optical systems are based on collecting a large amount of training data, having human experts annotate it and then training a model to detect the specific object of interest. This collection and annotation of data may be time consuming and cost prohibitive. In some instances, there is a need for a system that can detect optical articles used on various substrates worn by humans, even when such optical articles are deformed or partially occluded.

FIGS. 23-29 illustrate an optical signature retroreflector and associated techniques for using the retroreflector, in accordance with techniques of this disclosure. In some examples, the retroreflectors and associated techniques of FIGS. 23-29 may be implemented with the articles, systems, and operations described in this disclosure.

In some examples, the optical patterns and/or retroreflective elements of such patterns may be implemented as an optical signature film that retroreflects encoded polarization or wavelength information to a detector capable of detecting it. The retroreflector may often be a phase reversing retroreflector capable of modifying or returning circularly polarized light. The optical detection system (e.g., an image capture device and computing device, as described in this disclosure) may be configured to emit and/or receive polarized light. The optical detection system may include information relating the optical signatures to the classification of vehicles, personal protective equipment, environments, hazards, workers or people, or other information. In some instances, a computing device may determine information from a retroreflector using a 2D or 3D lookup table (or other associative array) that maps retroreflective properties to values, such as shown in FIG. 23.

In some examples, a film may be used to embody the optical pattern and/or retroreflective elements. The film may be configured for downstream optical modification, for example by printing to customize the optical signature. The film can further comprise a spatially variant optical element. The spatially variant optical element may comprise at least one of a retarder and a wavelength selective element. The spatial variance can be below the spatial resolution of the detector system at least one observation position. The spatially variant optical element can take the form of subpixels that form a repeat pattern of a mastersheet.

In some examples, the optical signature of the film may be detected by an on board automotive sensor system at some distance away from a location. The encoded information can be used by the onboard computer/software in advance of the vehicle being at the intersection or within a distance for spatial recognition of patterns or shapes. This provides extra calculation time to make ADAS (advanced driver assistance system) decisions, or to direct solid state Lidar point cloud aiming once the vehicle gets closer to the location.

In some examples, a characteristic of the optical film maybe to receive or create circularly polarized light. Circular polarization may be useful in safety contexts because it is more angularly robust compared to the various helicities that can be created with non-circular polarized light. Also, circularly polarized light can be rare in nature, so as a detector system surveys a complicated scene, an object that is returning for example left hand circularly polarized 940 nm light can be more easily recognized by a computing device. Characteristics of circularly polarized light may be preserved for longer distances in foggy environments than linearly polarized light.

In some examples, a system may use a transceiver capable of emitting and detecting polarized light. In some examples, the system may also include a retroreflector capable of modifying the incident light and returning it to the transceiver. In some examples, this system may not require a polarizer to be integrated with a retroreflector. Rather, the polarized light may be generated at the light source, and the retroreflector may modify the light before returning it to the transceiver.

FIG. 23 illustrates an example optical signature language or encoding between retroreflective properties and values. FIG. 23 indicates only one example encoding and many other examples are possible. The left side of the matrix in FIG. 23 represents characteristics of light emitted toward the retroreflector by the transceiver. Two cases represented: (1) an emitter emits one or two wavelengths designated as $\lambda 1$ or both $\lambda 1$ and $\lambda 2$. The top part of the chart designates what the retroreflector will return to the detector. The retroreflector can retroreflects light that was sent to it. If a transceiver only receives $\lambda 1$ then it only has the option to return $\lambda 1$. If the transceiver receives both $\lambda 1$ and $\lambda 2$, then it has the option to act on and return both. Wavelength can be in the visible or near or mid infrared.

In some examples, an emitter may send out a particular polarization state for a specific emission wavelength. In the example of FIG. 23, there are three categories listed by the emitter λ: L (linearly polarized light, assume this is vertically polarized), LC (left hand circular polarized light), and RC (right hand circularly polarized light).

In FIG. 23, by retroreflector λ, there are six categories representing the polarization state of light returned to the sensor: L (linearly polarized light, assume this is vertically polarized), XL (linear light 90 degrees to the vertical), LC (left hand circular polarized light), RC (right hand circularly polarized light), DP (depolarized light), Abs (the wavelength is absorbed and not returned to the detector).

In some examples, a useful property of this language or encoding is the unique signatures that can be achieved by unique combinations. For example, an emitter may emit λ1 and λ2 linearly polarized and the retroreflector could return λ1 RC and λ2 LC, corresponding to cells 35 and 76. Another scenario is that λ2 is absorbed and doesn't return to the detector thus employing cells 35 and 67. Numerous other combinations are possible. If one were to add a third wavelength λ3 to the matrix, the language or encoding space becomes even larger, and any number of light properties (e.g., wavelength, polarization direction, etc.) may be used to expand the encoding space beyond the size of the example encoding space of this disclosure. Each cell may correspond to a particular value, which may be binary, decimal, hexadecimal, alphanumeric, or any other suitable value.

FIG. 24 illustrates an example of mappings between retroreflective properties and values, in accordance with techniques of this disclosure. FIG. 24 illustrates emitted light (e.g., "Transceiver"), light returned by the retroreflector (e.g., "Retroreflector") which indicates a retroreflective property, and a value associated with the retroreflective property (e.g., "Assigned Meaning") In the example of FIG. 24, the values correspond to respirator models (e.g., "TR-300", "TR-600", "TR-800") and environment types (e.g., "Mining Environment", "Pharmaceutical Environment", "Confined Space Environment"). In some examples, a retroreflector may be embodied on or associated with each type of respirator or environment. A computing device may determine the value based on the retroreflected light and perform one or more operations, such as determining a safety event and/or performing one or more operations based on a safety event. For example, the computing device may determine based on one or more rules that a confined space environment and a TR-600 respirator are detected although an intrinsically safe TR-800 respirator is required for the confined space. As such, the computing device may detect a safety event (e.g., incompatible PPE and environment, although many other safety events are possible) and perform one or more operations, such as generating an alert, prohibiting access to the environment, or any other suitable operations. Although the example of FIG. 24 illustrates examples of respirator types and environments, any rules can be configured for any types of events wherein a computing device performs one or more operations based on the event occurring for a rule. In some examples, a lookup table or other associative data structure, such as illustrated in FIG. 24, for a language or encoding could be implemented in PPEMS 6, an article of PPE, a data hub, or any other computing device described in this disclosure.

Figure 25:
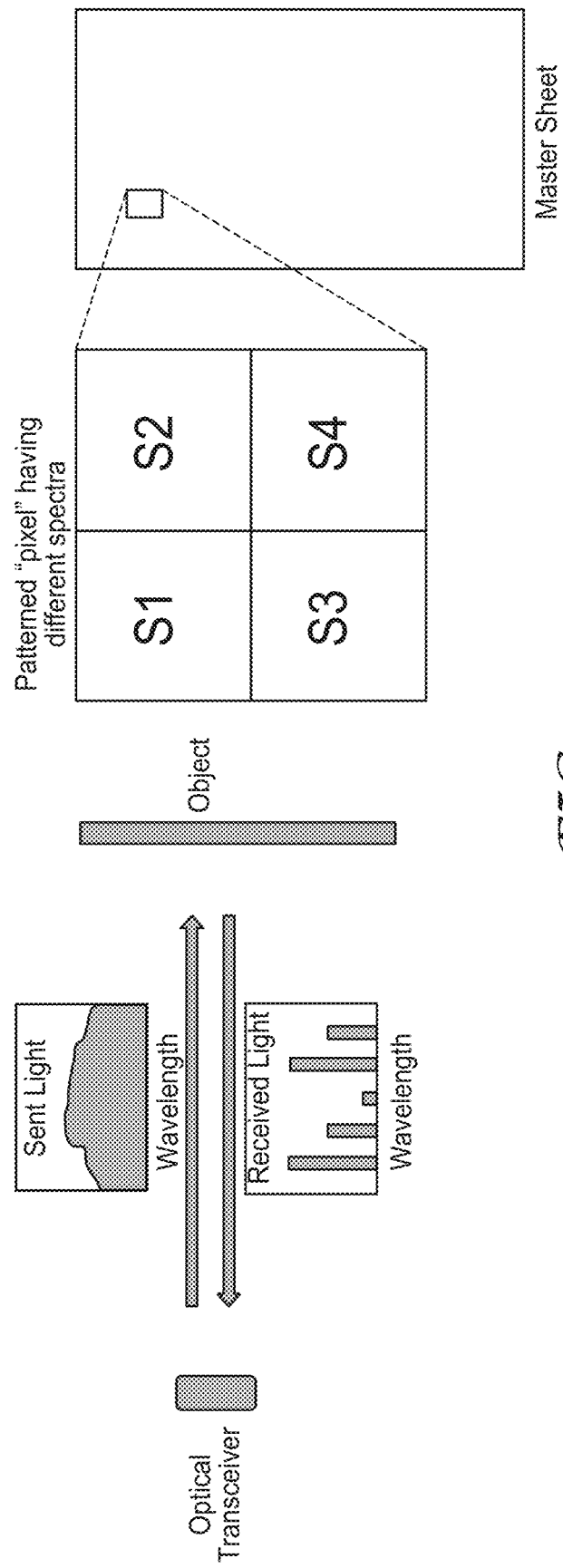

FIG. 25 illustrates a mastersheet approach for creating optical signatures, in accordance with techniques of this disclosure. A mastersheet comprising an array of repeat cells can be tuned to provide various encoded optical signatures to a detector that can detect the signal and compare to a library of assigned meanings. The tuning of the mastersheet can be accomplished altering the subpixels by printing or other suitable methods. For example, in the case of the subpixels varying by wavelength, Pixel 1, 2, 3, 4 returns λ1, λ2, λ3, λ4 respectively. The signal detected by a detector summing the output of the film will be 4 wavelengths. If, however, the 3$^{rd}$ subpixel is printed with an absorbing dye that absorbs λ3, then the summed signal detected by the detector will be λ1, λ2, λ3, and thus a different optical signature.

Next consider the case where the subpixels, rather than differing by wavelength, differ by retardation. When the subpixels receive, for example, vertically oriented linearly polarized light, P1 returns vertical linear light, P2 returns horizontal linear light, P3 returns left hand circularly polarized light, and P4 returns right hand circularly polarized light. In this example a visible blocking dye may be printed on P1, P2, P3 but not P4. In such example, the sheet returns right hand circularly polarized light. In other examples, a high pass absorber is printed over P3 that transmits green, and a different high pass absorber that transmits red is printed over the P4 subpixel. P1 and P2 may be blocked with a broad band dye. This example accordingly includes a film that returns green left hand circular light, and returns red light that is right hand circular.

In some examples, subpixels differ in the observation angle of retroreflection, that is they have different angular properties for different spatial regions. In some examples, the angular output of light and/or the angular output of different wavelengths of light could be selectively tuned to provide localization function for a retroreflector.

Figure 26:
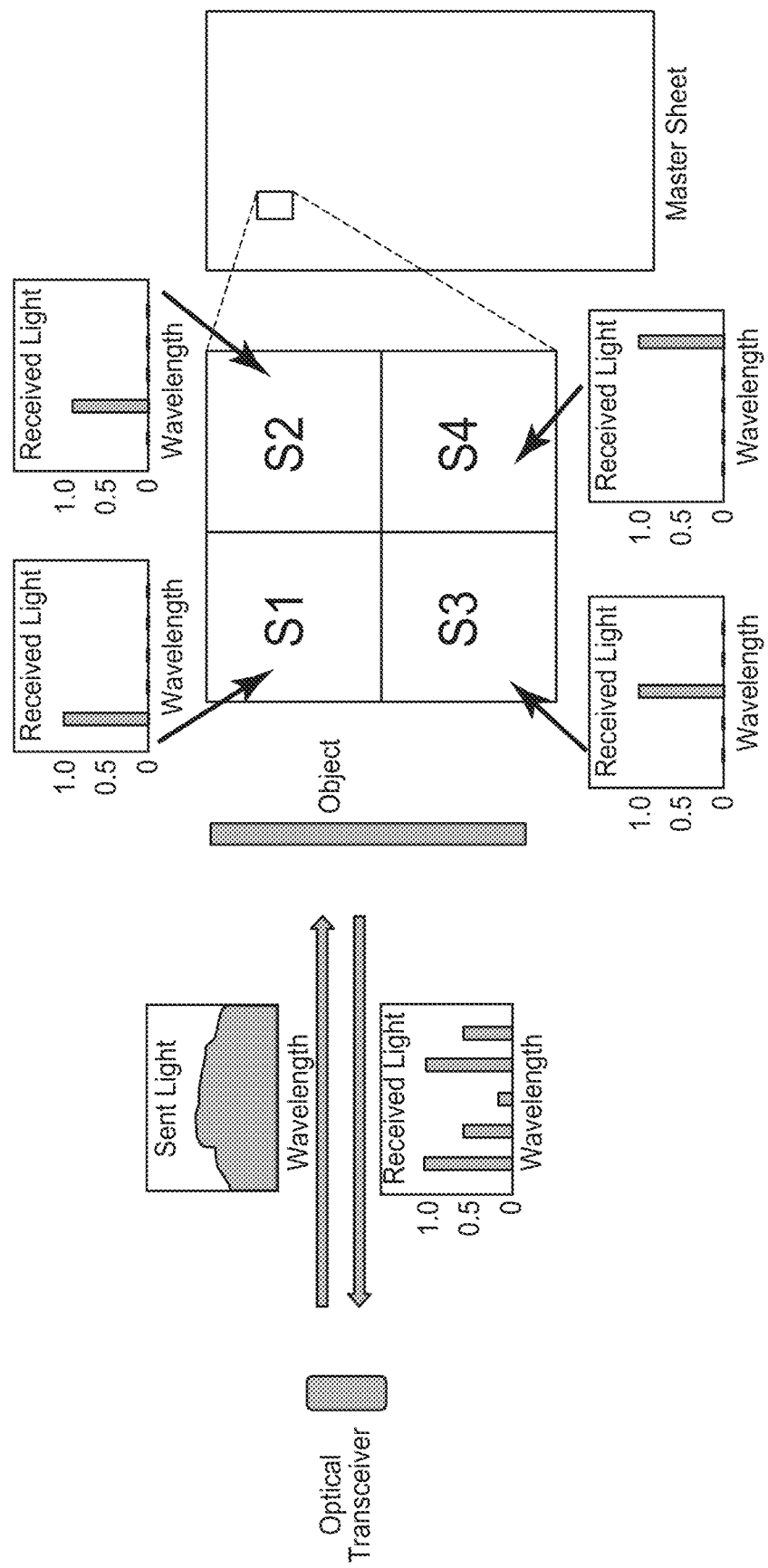

FIG. 26 illustrates an example of wavelength patterning of light, in accordance with techniques of this disclosure. In FIG. 26, each pixel or sub-pixel is configured to retroreflect a different wavelength of light based on emitted light. For example, each sub-pixel S1, S2, S3, S4 retroreflects a different wavelength of light based on the emitted (or sent) light from the optical transceiver. In some examples, the optical transceiver may receive light that represents an aggregation of the different wavelengths. The aggregation may represent one or more encoded values.

Figure 27:
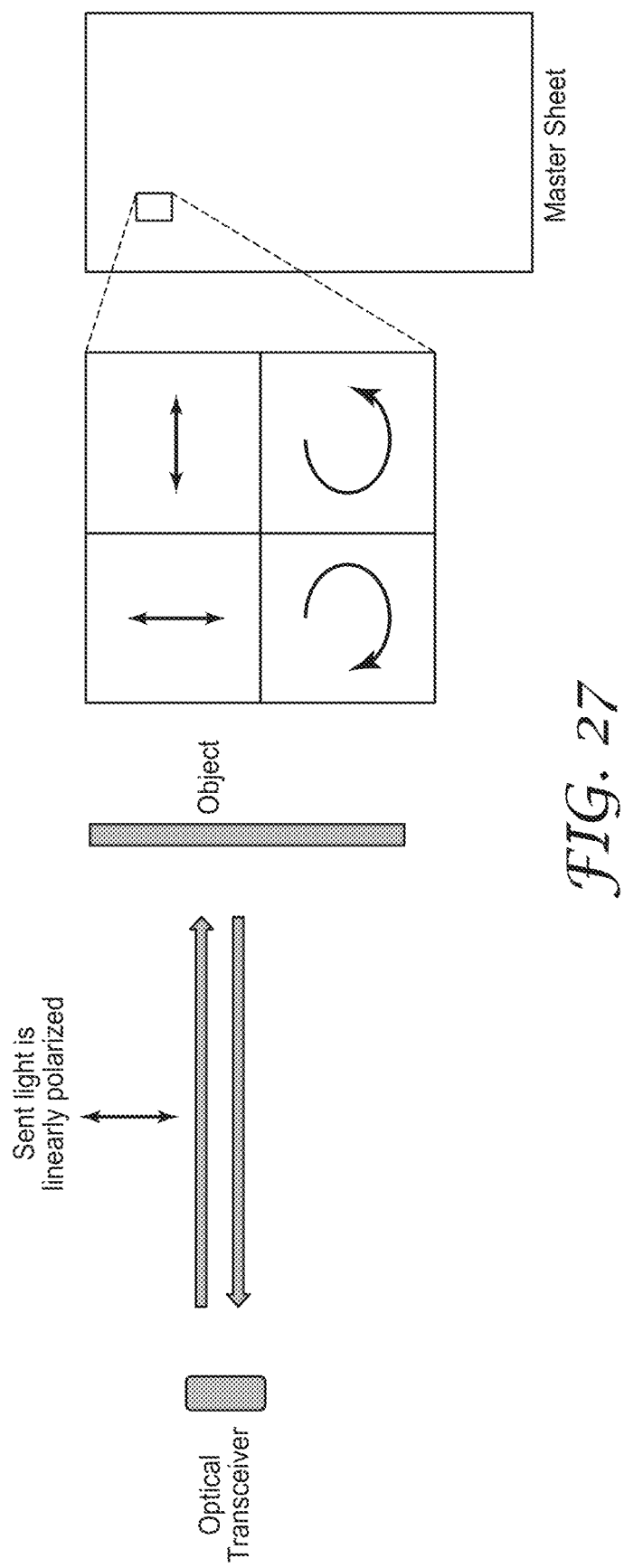

FIG. 27 illustrates an example of polarization patterning of light, in accordance with techniques of this disclosure. In FIG. 27, each pixel or sub-pixel is configured to retroreflect a different polarization state based on emitted light. For example, each sub-pixel from the master sheet retroreflects a different polarization state of light based on the emitted (or sent) light from the optical transceiver. In some examples, the optical transceiver may receive light that represents an aggregation of different polarization states. The aggregation may represent one or more encoded values.

Figure 28A:
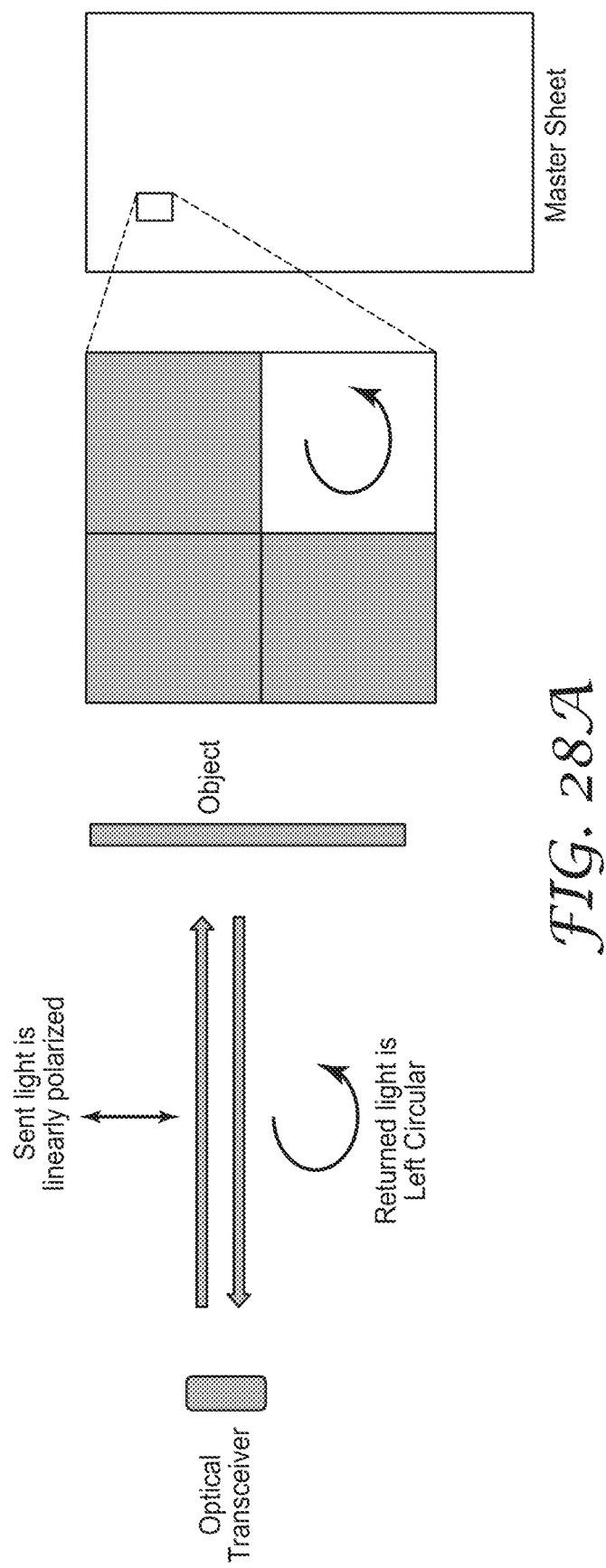
Figure 28B:
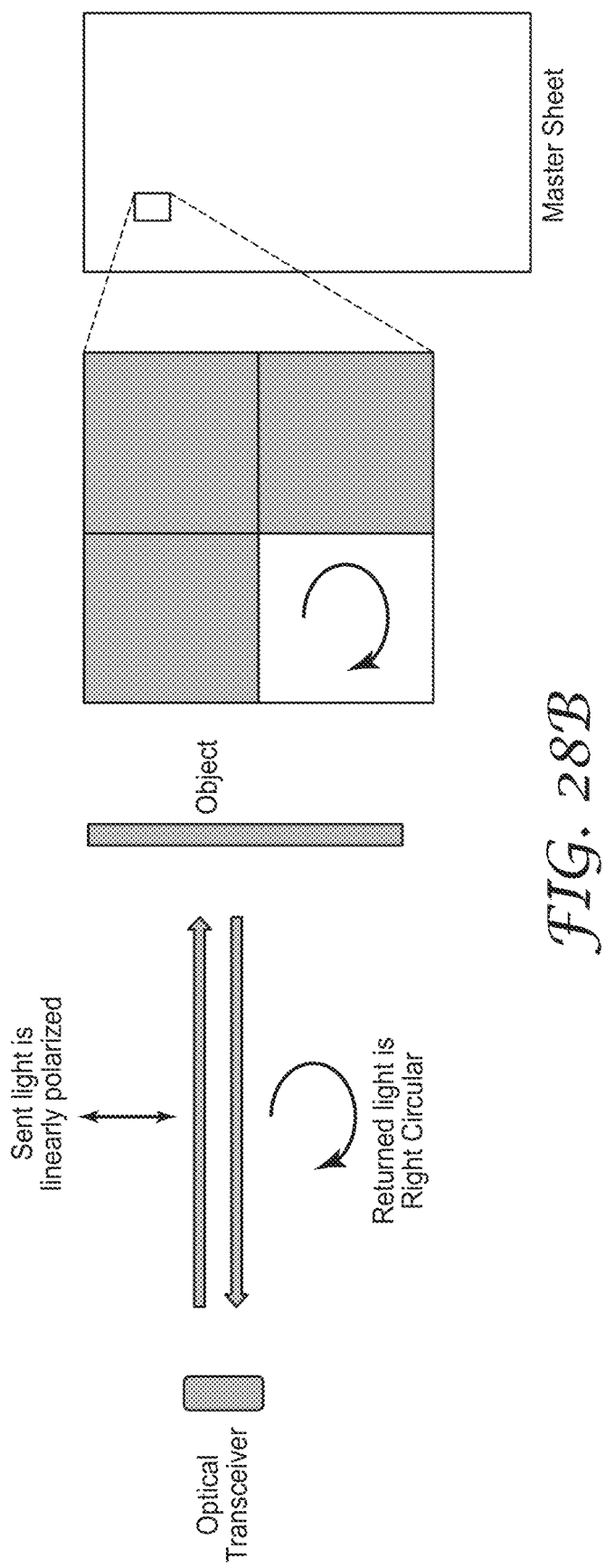
Figure 28C:
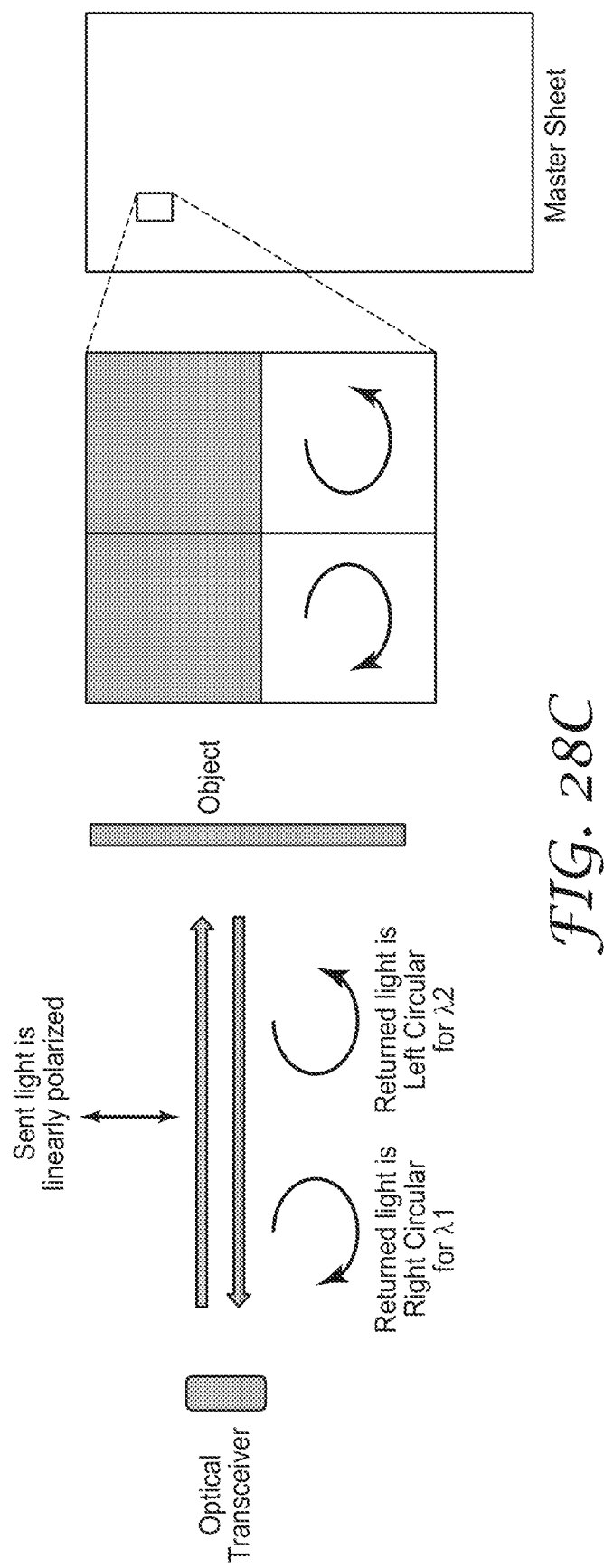

FIGS. 28A-28C illustrates an example of polarization patterning of light, in accordance with techniques of this disclosure. In FIG. 28C, each pixel or sub-pixel is configured to retroreflect a different polarization states, where each state may include multiple properties. For example, a polarization state may indicate a color (e.g., red) and a direction of light (e.g., right circular).

Figure 29:
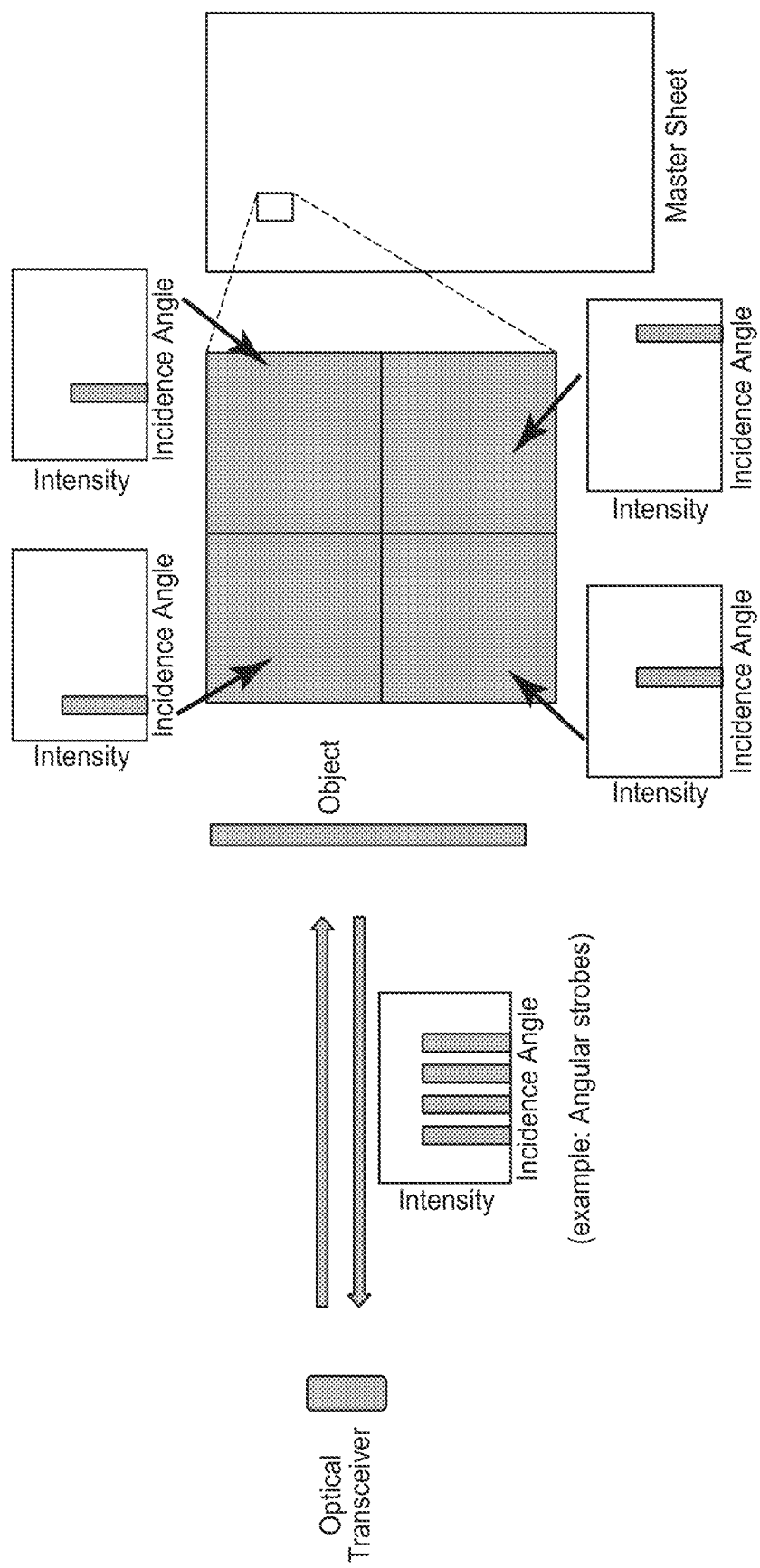

FIG. 29 illustrates an example of patterning based on angular characteristics of light, in accordance with techniques of this disclosure. In FIG. 29, each pixel or sub-pixel is configured to retroreflect a different light intensity based on an incidence angle. As such, in some examples, the retroreflector may only retroreflect light at certain incidence angles. In some examples, the retroreflect may retroreflect different light at different incidence angles. As such, different encoded values may be detected by the optical transceiver at different angles.

The examples of FIG. 26-29 illustrate different retroreflective properties that are possible in a system and which may be mapped to values. In such examples, the values may be used to perform one or more operations as described in various examples of this disclosure.

Additional example implementations of a retroreflective article for embodying an optical pattern are described in U.S. patent application Ser. No. 14/388,082, filed Mar. 29, 2013, which is incorporated by reference herein in its entirety. Additional description is found in U.S. Provisional Appl. Nos. 62/400,865, filed Sep. 28, 2016; 62/485,449, filed Apr. 14, 2017; 62/400,874, filed Sep. 28, 2016; 62/485,426, filed Apr. 14, 2017; 62/400,879, filed Sep. 28, 2016; 62/485,471, filed Apr. 14, 2017; and 62/461,177, filed Feb. 20, 2017; each of which is incorporated herein by reference in its entirety.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A system comprising:
   at least one light capture device;
   an article of personal protective equipment (PPE) that includes a plurality of retroreflective elements embodied on a surface of the article of PPE in a spatially defined arrangement, each retroreflective element of the plurality of retroreflective elements having at least two different retroreflective properties;
   a computing device communicatively coupled to the at least one light capture device, wherein the computing device is configured to:
      receive, from the at least one light capture device, retroreflected light that indicates at least two different retroreflective properties of at least one retroreflective element of the plurality of retroreflective elements;
      determine, based at least in part on each of the at least two different retroreflective properties, a safety event, wherein to determine the safety event, the computing device is configured to:
      determined that at least one of the at least two different retroreflective properties indicates a presence of a type of first object, the first object being a living being;
      determining that a distance between the first object and a second object being a vehicle, which is less that a threshold distance; and
   generate an indication to the vehicle that causes a change in the operation of the vehicle.

2. The system of claim 1, wherein the computing device is configured to:
   store a set of associations between pre-defined properties and values, wherein each respective pre-defined property of the set of pre-defined properties corresponds to at least one respective value of the values; and
   determine one or more of the values based on the at least two different retroreflective properties of the at least one retroreflective element.

3. The system of claim 2, wherein the one or more values are at least one of a binary value, decimal value, hexadecimal value, or alphanumeric value.

4. The system of claim 1, wherein to determine, based at least in part on each of the at least two different retroreflective properties, the safety event, the computing device is configured to:
   determine that at least one of the at least two different retroreflective properties indicates a type of personal protective equipment;
   determine that the type of the article of PPE is incorrect for at least one characteristic of the article of PPE; and
   generate an indication based at least in part on the type of the article of PPE being incorrect for the at least one characteristic of the article of PPE.

5. The system of claim 1, wherein the at least one characteristic is at least one of a fit test or an environment of a worker assigned to the article of PPE.

6. The system of claim 1, wherein the computing device is configured to determine, based at least in part on at least one of the at least two different retroreflective properties of the at least one retroreflective element of the plurality of retroreflective elements, an orientation of a worker assigned to the article of PPE.

7. The system of claim 1, wherein the computing device is configured to determine, based at least in part on at least one of the at least two different retroreflective properties of the at least one retroreflective element of the plurality of retroreflective elements, whether a worker assigned to the article of PPE is in the presence of a particular hazard.

8. The system of claim 1, wherein the computing device is configured to determine, based at least in part on at least one of the at least two different retroreflective properties of the at least one retroreflective element of the plurality of retroreflective elements, whether a worker assigned to the article of PPE is located in a particular environment.

9. The system of claim 1, wherein the safety event comprises at least one of:
- a worker-down event, wherein a worker has fallen;
- a visor event, wherein a visor position of a respirator or welding mask does not shield a face of a worker wearing the article of PPE;
- a respirator protection event, wherein a respirator is not worn over the nose of a worker wearing the article of PPE; or
- a hearing protection event, wherein hearing protection is not positioned to attenuate sound for the worker wearing the article of PPE.

10. The system of claim 1, wherein to perform at least one operation based at least in part on the safety event, the computing device is configured to at least:
- generate a notification;
- send a message; or
- store an indication of the safety event.

11. The system of claim 1, wherein the at least two different retroreflective properties comprise at least two different polarization states.

12. The system of claim 1, wherein the at least two different retroreflective properties comprise at least two different phase retardations.

13. The system of claim 1, wherein the retroreflective property changes in response to a change in condition.

14. The system of claim 8, wherein the change in condition is at least one of a change in thermal, moisture, mechanical deformation, or radiation.

15. The system of claim 1, wherein the plurality of retroreflective elements are individually sized and separated from one another such that each individual retroreflective element is resolvable at desired distances from the optical article.

16. The system of claim 1,
wherein the spatially defined arrangement comprises a geometric arrangement in which each respective retroreflective element of the plurality of retroreflective elements are positioned within a distance from neighboring retroreflective elements of the plurality of retroreflective elements, and
wherein the plurality of retroreflective elements have a periodicity from one element to another within the spatially defined arrangement.

* * * * *

UNITED STATES PATENT AND TRADEMARK OFFICE
CERTIFICATE OF CORRECTION

PATENT NO. : 11,291,255 B2
APPLICATION NO. : 16/346763
DATED : April 5, 2022
INVENTOR(S) : Kiran Sudhindra Kanukurthy Page 1 of 1

It is certified that error appears in the above-identified patent and that said Letters Patent is hereby corrected as shown below:

In the Claims

<u>Column 54</u>

Line 33, In Claim 1, delete "determined" and insert -- determine --, therefor.

Line 37, In Claim 1, delete "less that" and insert -- less than --, therefor.

Signed and Sealed this
Eighth Day of November, 2022

Katherine Kelly Vidal
*Director of the United States Patent and Trademark Office*